United States Patent
Shapira

(10) Patent No.: US 6,640,111 B1
(45) Date of Patent: Oct. 28, 2003

(54) CELLULAR COMMUNICATIONS SYSTEMS

(75) Inventor: Joseph Shapira, Haifa (IL)

(73) Assignee: Celletra Ltd.

( * ) Notice: Subject to any disclaimer, the term of this patent is extended or adjusted under 35 U.S.C. 154(b) by 0 days.

(21) Appl. No.: 09/389,053

(22) Filed: Sep. 2, 1999

Related U.S. Application Data

(63) Continuation of application No. PCT/IL98/00103, filed on Mar. 3, 1998.

(30) Foreign Application Priority Data

| Mar. 3, 1997 | (IL) | ................................. | 120364 |
| Apr. 20, 1997 | (IL) | ................................. | 120706 |
| Jun. 30, 1997 | (IL) | ................................. | 121201 |

(51) Int. Cl.$^7$ ................................. H01Q 3/02
(52) U.S. Cl. .................. 455/562; 455/14; 455/561; 455/523
(58) Field of Search ................ 455/10, 25, 561, 455/422, 424, 562, 14, 523

(56) References Cited

U.S. PATENT DOCUMENTS

| 3,436,691 | A | 4/1969 | Hoffman et al. |
| 3,491,314 | A | 1/1970 | White |
| 4,647,880 | A | 3/1987 | Argaman |
| 5,017,927 | A | 5/1991 | Agrawal et al. |
| 5,280,472 | A | 1/1994 | Gilhousen et al. |
| 5,455,537 | A | 10/1995 | Larkin et al. |
| 5,485,120 | A | 1/1996 | Anvari |
| 5,489,875 | A | 2/1996 | Cavers |
| 5,499,395 | A | 3/1996 | Doi et al. |
| 5,513,176 | A | 4/1996 | Dean et al. |
| 5,533,011 | A | 7/1996 | Dean et al. |
| 5,563,610 | A | 10/1996 | Reudink |
| 5,565,873 | A | 10/1996 | Dean |
| 5,576,659 | A | 11/1996 | Kenington et al. |
| 5,579,016 | A | 11/1996 | Wolcott et al. |
| 5,584,049 | A | 12/1996 | Weaver, Jr. et al. |
| 5,588,020 | A | 12/1996 | Schilling |
| 5,592,471 | A | 1/1997 | Briskman |
| 5,596,329 | A | 1/1997 | Searle et al. |
| 5,602,555 | A | 2/1997 | Searle et al. |
| 5,602,834 | A | 2/1997 | Dean et al. |
| 5,612,703 | A | 3/1997 | Mallinckrodt |
| 5,621,752 | A | * 4/1997 | Antonio et al. ............. 375/200 |
| 5,642,353 | A | 6/1997 | Roy, III et al. |
| 5,649,293 | A | 7/1997 | Reed |
| 5,666,123 | A | 9/1997 | Chrystie |
| 5,675,629 | A | 10/1997 | Raffel et al. |
| 5,697,053 | A | 12/1997 | Hanly |
| 5,703,874 | A | 12/1997 | Schilling |
| 5,714,957 | A | 2/1998 | Searle et al. |
| 5,715,516 | A | 2/1998 | Howard et al. |
| 5,721,757 | A | 2/1998 | Banh et al. |
| 5,731,790 | A | * 3/1998 | Riza ........................... 342/368 |
| 5,758,090 | A | 5/1998 | Doner |
| 5,777,579 | A | 7/1998 | Goetz et al. |
| 5,784,031 | A | 7/1998 | Weiss et al. |
| 5,798,675 | A | 8/1998 | Drach |
| 5,815,116 | A | 9/1998 | Dunbridge et al. |

(List continued on next page.)

FOREIGN PATENT DOCUMENTS

| EP | 722 227 | 7/1996 |
| WO | 96/00991 | 1/1996 |

*Primary Examiner*—Thanh Cong Le
*Assistant Examiner*—Thuan T. Nguyen
(74) *Attorney, Agent, or Firm*—Pillsbury Winthrop LLP

(57) ABSTRACT

A novel base station for cellular wireless communications based on a modular structure is provided. The modular cellular wireless communication base station includes a plurality of active radiator modules (ARM's) located at a desired antenna location, a beam forming network controlling relative amplitudes and phases of each of the modules and an RF front end. Each module (100) includes at least one antenna (ant) for transmitting and receiving, a transmitter having a power amplifier, and receiver.

53 Claims, 62 Drawing Sheets

U.S. PATENT DOCUMENTS

| | | |
|---|---|---|
| 5,841,395 A | 11/1998 | Simone |
| 5,848,358 A | 12/1998 | Forssen et al. |
| 5,856,810 A | 1/1999 | Lopez |
| 5,861,844 A | 1/1999 | Gilmore et al. |
| 5,872,548 A | 2/1999 | Lopez |
| 5,889,494 A | 3/1999 | Reudink et al. |
| 5,907,304 A | 5/1999 | Wilson et al. |
| 6,101,399 A * | 8/2000 | Raleigh et al. .............. 455/561 |
| 6,175,737 B1 * | 1/2001 | Kao ........................... 455/447 |

* cited by examiner

| ITEM | PA(dBw) | FILTER | DIPLEXER | CABLE+BFN | ARRAY GAIN | ERP |
|---|---|---|---|---|---|---|
| 2nd gen. BTS | 20 | -0.5 | -2 | -5 | 10 LogN | 12.5+10 LogN |
| ARM ARRAY | 3+10 LogN | -0.5 | 0 | 0 | 10 LogN | 2.5+20 LogN |

FIG.7

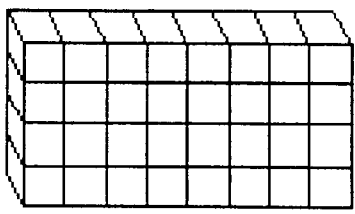
FIG. 22C
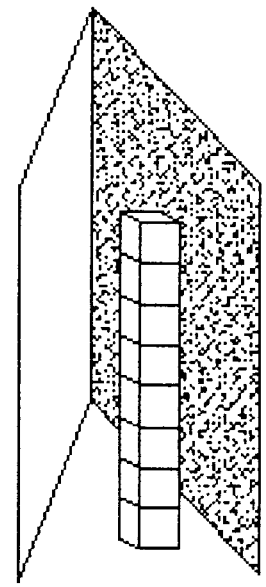
FIG. 22E
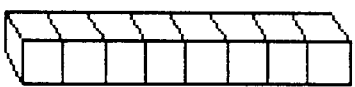
FIG. 22B
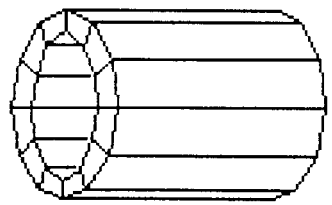
FIG. 22D
FIG. 22A

DELAY DIVERSITY UNIT = DDU

CELLULAR COMMUNICATIONS SYSTEMS

This application is a continuation of the co-pending PCT International Application No. PCT/IL98/00103, filed Mar. 3, 1998, which claimed the benefit of (and accordingly, this application also claims the benefit of) each of Israeli Application Nos. 120364, filed Mar. 3, 1997, 120706, filed Apr. 20, 1997, and No. 121201, filed Jun. 30, 1997. The contents of each and every one of the aforementioned applications are hereby expressly incorporated by reference herein in their entireties.

FIELD OF THE INVENTION

The present invention relates to cellular wireless communications systems generally and more particularly to apparatus and methods for cellular communications with base stations.

BACKGROUND OF THE INVENTION

Cellular multiple access communications date back to the early eighties. The nineties witnessed an outburst of this type of service throughout the world and the introduction of digital technologies. The market is expected to soar and expand into Personal Communication Services (PCS), offering personal service, a host of value added features, and total personal mobility, indoors and outdoors. Broadband services are expected to emerge at the beginning of the next century. These may require a partial renewal of the network infrastructure.

Cellular mobile communication attempts to provide mobility, multi-user capacity (many independent users access the system), coverage (service is offered over a large contiguous area) and grade and quality of service.

Cellular communications are generally limited by local codes to a range of frequencies. A widely used technique of cellular communications employs spatial isolation in order to be able to reuse the same frequencies beyond a given range called a guard zone. The communications of each user is maintained with a base station, whose antenna is elevated above the scenery in order to achieve a well defined and controlled coverage are. Sectorization is achieved by directive antennas that illuminate only one sector, thereby reducing interference, enhancing performance and reducing a pattern of frequency reuse.

Each sector of cellular communications is characterized by a number of calls per unit area, also called area capacity. Area capacity may be increased by reducing the cell size. Small cells that are positioned below roof tops in urban areas are called microcells. These use lower and smaller antennas. The cell hardware is more compact, and in some cases has less circuits. Another technique for microcells involves the antenna and RF circuitry only, remote from the cell equipment and connected via RF, fiber or microwave link, to the cell. Such an arrangement is especially attractive for operators in possession of RF or fiber trunking, like CATV companies.

A future trend to increase the capacity of large cells involves smart antennas. These are multibeam array antennas at the base stations, controlled to form narrow beams that are matched to the disposition of the desired user and the sources of interference. These are expected to enhance the coverage and the capacity. The complexity involved in this technology is expected to be relieved with new cell architectures, including, among others, active antenna modules.

The network infrastructure of a typical modern cellular communications system includes a number of base stations, the actual number being related to the capacity required (measured in Erlangs, which is the number of fully occupied circuits), and to the coverage area. The base stations generally constitute about 80% of the network cost. A typical cost for a full capacity large cell base station is $500,000–$1,000,000. The infrastructure also includes interconnect trunking, which depends mainly on the total length of interconnect lines, and switching fabric, which depends on the number of cells and calling load (measured in BHCA—Busy Hour Call Attempts). The cost of the basic service of providing airtime depends mainly on the number of base stations and on their cost.

One of the problems of cellular communications systems is transmission losses. The transmit chain of a first generation base station consists of single carrier HPA's, filtered, combined and relayed by a high power cable to the mast. The losses involved in the chain amount to 8–10 dB. The carrier spacing is restricted by the combiner to at least 600 KHz.

In an effort to cut down losses, second generation base stations were developed. A second generation base station includes a MCLPA—Multi Carrier Linear Power Amplifier. This reduces the losses and adds flexibility to the design of the carriers (frequency allocations). A low noise amplifier (LNA) is used in the receive chain in the base station. The LNA reduces cable losses which degrade the system noise figure. An additional receive antenna is typically used for diversity. Recent installations place the LNA on the mast.

However, the MCLPA is an expensive part, running from $10,000 for a minicell to over $100,000 for a full capacity cell. Furthermore, MCLPA's are currently supplied to the whole market by a limited number of vendors. The MCLPA's from these vendors are available only in a power range of about 25 to 500 W.

SUMMARY OF THE INVENTION

The present invention seeks to provide a novel base station for cellular wireless communications based on a modular structure.

The present invention includes an active radiator module (ARM) that serves as a basic transmit/receive module in a variety of cellular base station configurations. The active radiator modules follow the trend of cellular architecture development and are designed to meet both current and future needs. It is a novel approach that may reduce the cost of the base station while providing desired flexibility.

In the active radiator module system, a combined signal is transmitted in low power through a cable to a mast, where it redistributes to the active radiator modules. The number of active radiator modules needed is a function of both the total effective radiated power (ERP) and gain required. The receive chain includes an LNA in each element, which reduces the noise figure of the system. The same active radiator module can serve in microcells that require small power and low gain antennas.

A remote RF unit is the least expensive solution for microcells. Its applicability is limited by the cost of RF trunking. It is the preferred solution for operators that have an access to the CATV or to fiber trunking already laid. This unit includes an amplifier, an LNA, and a transformer to the trunking band. This same module may be a part of a microcell or a picocell, but the RF is included inside the package, while the antenna is typically separate. The modular structure of the base station of the present invention provides readily upgradable base station performance at relatively low cost.

By way of example only, the present invention is described herein for certain commonly-used frequency ranges, such as for cellular telephones or PCS. However, it is appreciated that the present invention is not limited to these frequency ranges and may be applied to any set of frequencies.

There is thus provided in accordance with a preferred embodiment of the present invention, a modular cellular wireless communication base station including a plurality of active radiator modules located at a desired antenna location, each module including at least one antenna for transmitting and receiving, a transmitter including a power amplifier, and a receiver, a beam forming network controlling the relative amplitudes and phases of each of the modules, and an RF front end transmitting over a low power link with the plurality of active radiator modules via the beam forming network and receiving over a lower power link via a low noise amplifier.

In accordance with a preferred embodiment of the present invention, the RF front end is located remote from the plurality of modules. Preferably each module is self-enclosed.

Additionally in accordance with a preferred embodiment of the present invention at least one of the active radiator modules comprise two separate transmit and receive antenna elements. Preferably the transmit and receive antenna elements are isolated from each other by about 15–30 dB, most preferably by about 20 dB.

Further in accordance with a preferred embodiment of the present invention the beam forming network is located adjacent the plurality of active radiator modules, one for transmit and one for receive.

Still further in accordance with a preferred embodiment of the present invention, the modular cellular wireless communication base station includes a CATV up/down converter module. Preferably the CATV up/down converter module comprises a coaxial cable connected to a CATV network, the cable carrying a CATV forward link and reverse link. A CATV diplexer is preferably provided that separates transmit and receive signals. The converter module preferably comprises a mixer, a phased locked oscillator and a band pass filter, thereby to eliminate image and low frequencies.

In accordance with a preferred embodiment of the present invention the RF front end communicates with the beam forming network via a fiber optic link. In one embodiment, at least two separate fibers separately carry transmitter and receiver signals. Alternatively, one fiber carries both transmitter and receiver signals, and a splitter and a filter are provided to split and filter the signals.

Additionally in accordance with a preferred embodiment of the present invention, the transmitter amplifier comprises a first stage comprising a monolithic silicon gain stage and a second stage comprising a hybrid packaged power amplifier.

Further in accordance with a preferred embodiment of the present invention a transmitter filter is provided that reduces transmitter wide band noise in a receiver band. Additionally or attentively, a transmitter filter reduces spurious signals that interfere with a receiver channel of a cell.

Still further in accordance with a preferred embodiment of the present invention, there are provided a receiver amplifier and a receiver filter, wherein the receiver filter reduces a transmitter signal to a level wherein interfering intermod products are not generated in the receive chain, and the receive-amplifier is not desensitized by saturation. The other purpose of the receiver filter is to reduce interfering signals from other base stations and other systems.

Yet further in accordance with a preferred embodiment of the present invention, a receiver filter is provided that reduces interfering signals from sources external to the wireless communication base station.

In accordance with a preferred embodiment of the present invention, the plurality of active radiator modules are stacked to form an active antenna having desired gain and beam shape determined by the beam forming network. The modules may be stacked in a vertical array, a planar array or a circular array, for example.

Furthermore, in accordance with a preferred embodiment of the present invention, the active radiator modules include one transmit antenna and first and second receive antenna elements. The single transmit antenna is a vertically polarized antenna, the first receive antenna is polarized at +45° and the second receive antenna is polarized at −45°.

Furthermore, in accordance with a preferred embodiment of the present invention, the plurality of active radiator modules are configured for a width less than 0.7 wavelengths, for forming a multitude of beams in the horizontal plane. The active radiator modules are configured for a height less than 1 wavelength, for forming a broad side radiation from a vertically stacked column of the plurality of active radiator modules.

Furthermore, In an alternative embodiment, in accordance with a preferred embodiment of the present invention, the active radiator modules include two transmit antennas and one receive antenna element. The receive antenna is a vertically polarized antenna and the first transmit antenna is polarized at +45° and the second transmit antenna is polarized at −45°.

Additionally, in accordance with a preferred embodiment of the present invention, the modular cellular wireless communication base station further includes a transmit amplifier coupled to the transmit antenna and a receive amplifier coupled to receive antenna elements.

There is also provided in accordance with a preferred embodiment of the present invention, a method for mitigating a fading of signals on a forward link of a CDMA wireless system, the method including splitting a transmission signal to a plurality of transmitter antennas, introducing a delay that is longer than a CDMA chip in a transmit chain of the antennas relative to a first of the antennas, transmitting the signals by all the antennas, receiving the signals with different correlators, and combining the signals, thereby mitigating a fading of the signals.

Preferably each the antenna transmits with approximately equal coverage.

In accordance with a preferred embodiment of the present invention, the step of transmitting comprises transmitting from a plurality of spaced antennas.

Additionally in accordance with a preferred embodiment of the present invention the step of transmitting comprises transmitting from a plurality of antennas that transmit at different polarization.

Further in accordance with a preferred embodiment of the present invention the step of combining comprises combining with natural multipath signals.

There is also provided in accordance with a preferred embodiment of the present invention, a modular dual polarized base station antenna system including a plurality of pairs of orthogonal polarization antennas, wherein one of the pairs is polarized at ±45° and another of the pairs is H-V polarized. Preferably a pair of transmit antennas are polarized at ±45°, and a pair of receive antennas are H-V polarized. Alternatively all pairs of antennas may be H-V polarized. Preferably each antenna is fed by a separate amplifier.

In accordance with a preferred embodiment of the present invention at least one isolation structure is provided for increasing isolation between the antenna pairs.

There is also provided in accordance with a preferred embodiment of the present invention, a method for modular dual polarized base station transmission and reception, the method including transmitting with a pair of transmit antennas polarized at ±45°, and receiving with a pair of receive antennas that are H-V polarized. Alternatively all pairs of antennas may be H-V polarized.

In accordance with a preferred embodiment of the present invention the transmit signals are split and weights of polarization are applied at a base station. Alternatively, weights of polarization are applied by control of amplifier gain. The weights may be applied at RF, IF or baseband frequencies.

BRIEF DESCRIPTION OF THE DRAWINGS

The present invention will be understood and appreciated from the following detailed description, taken in conjunction with the drawings in which:

FIG. 7 is a table comparing the transmission path power budget of a second generation prior art BTS and that of an active radiator module array, constructed and operative in accordance with a preferred embodiment of the present invention;

FIGS. 20, 21A, 21B, 22A, 22B, 22C, 22D, 22E and 23 illustrate a high gain antenna array utilizing the active radiator module.

FIGS. 22A–22E illustrate examples of various ARM arrays.

FIG. 22A shows a 4 element column.

FIG. 22B shows an 8 element column.

FIG. 22C shows a 8×4 planar/multibeam array.

FIG. 22D shows a circular array.

FIG. 22E shows a horizontal array backed by a corner reflector.

FIG. 40 illustrates redundancy in the performance of each element.

FIG. 41 shows the deterioration of the ERP of a 8 elements ARM array due to a failure of one element.

Appendix A is a description of active radiator modules, constructed and operative in accordance with other preferred embodiments of the present invention.

Appendix B is a description of various components used with the active radiator modules of the present invention.

DETAILED DESCRIPTION OF PREFERRED EMBODIMENTS

Figure 1:
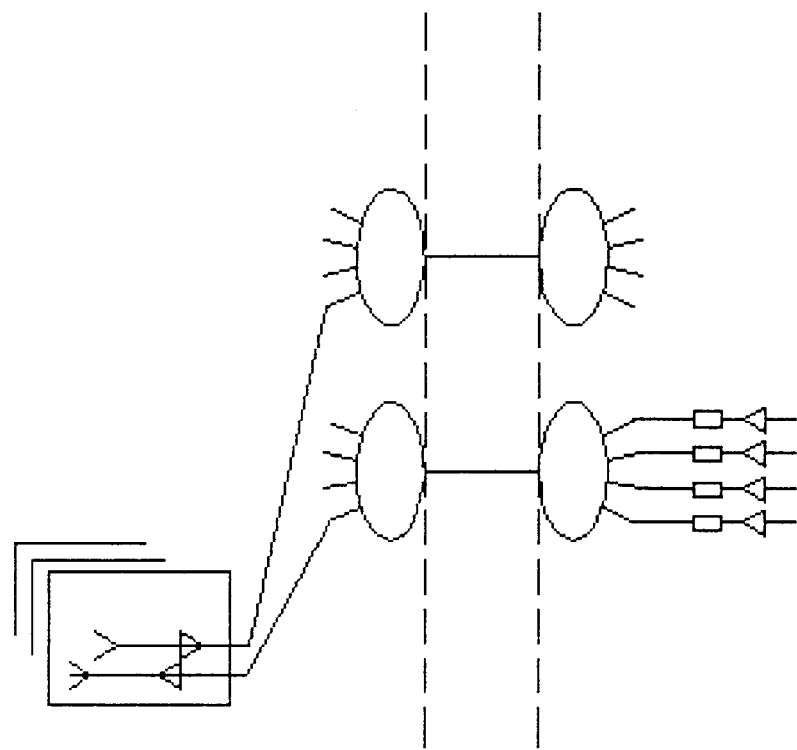
FIG. 1 is a simplified schematic illustration of a modular base station, constructed and operative in accordance with a preferred embodiment of the present invention.

Reference is now made to FIG. 1 which illustrates a modular base station, constructed and operative in accordance with a preferred embodiment of the present invention. A combined signal is transmitted in low power through a cable to a mast, where it redistributes to a plurality of active radiator modules. The number of active radiator modules needed is a function of both the total effective radiated power (ERP) and gain required. The receive chain includes an LNA in each element, which reduces the noise figure of the system. The same active radiator module can serve in microcells that need small power and low gain antennas.

Figure 2:
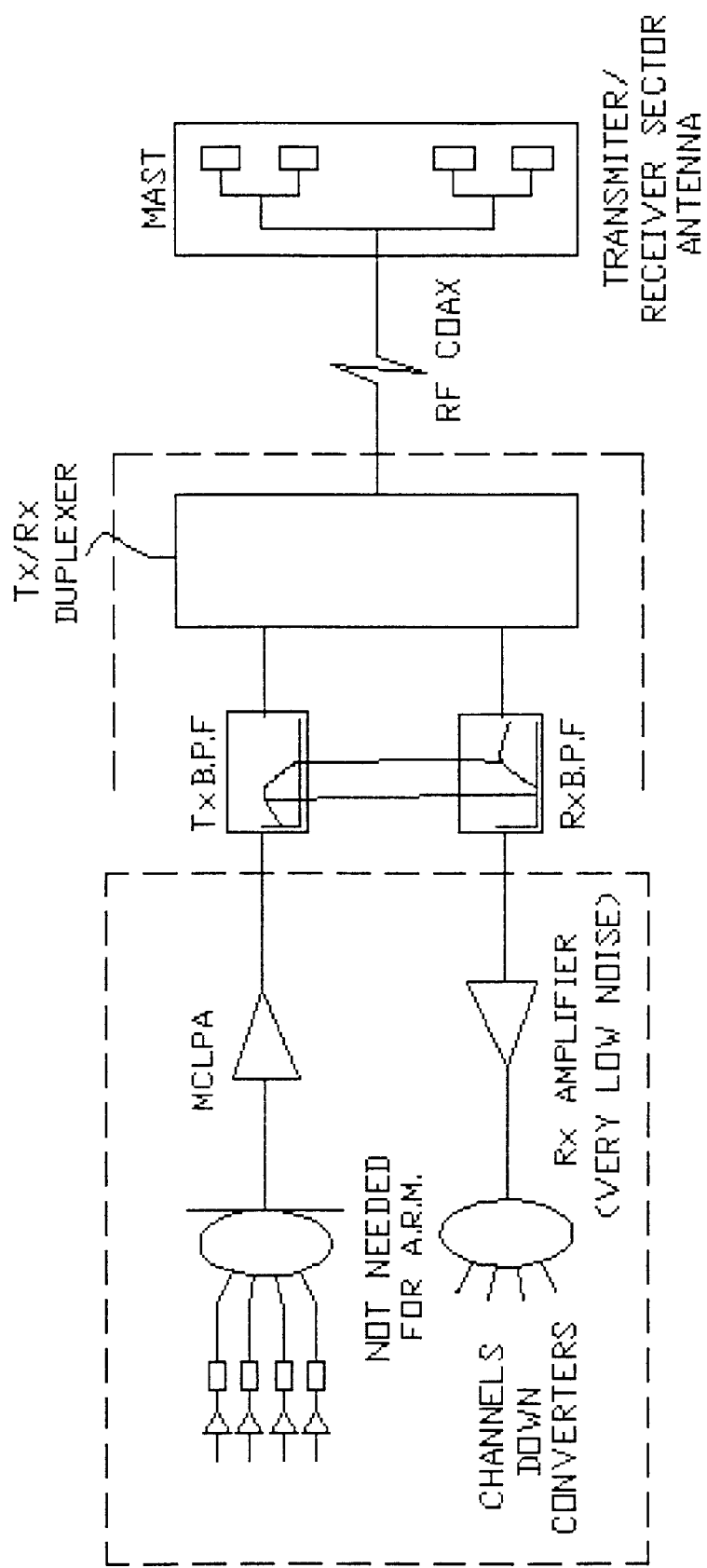
FIG. 2 is a simplified schematic illustration of a base station with an RF section of a second generation base transceiver subsystem (BTS)

Reference is now made to FIG. 2 which illustrates a base station with an RF section of a second generation base transceiver subsystem (BTS) and an active radiator module constructed and operative in accordance with a preferred embodiment of the present invention. The single channels are combined, after pre-amplification and channel filtering, and then feed a Multi Carrier Linear Power Amplifier (MCLPA). The combined signal is then band-pass filtered, diplexed and run through a high power, low loss cable, to the antenna array.

A disadvantage of prior art second generation BTS is, inter alia, that the complex comprising the cable and antenna array, serving both transmit and receive signal, is required to be extremely linear and not to generate IMD (Intermod products) higher than about −135 dBc, which puts a high stress on the antenna and the cable connections. The diplexer and band pass filters need about 100 dB of isolation between transmitter and receiver frequencies. The cost of this architecture is a power loss of 3 to 5 dB in the filters, diplexer and cable, that has to be compensated by a high power MCLPA and all its supporting equipment. The cable loss degrades the noise figure on the receive side.

In the present invention, the MCLPA, high power cable, diplexer and broadband superlinear antennas, and LNA are all replaced by an active radiator module. The active radiator module is mounted on the mast and comprises a low power PA, an elemental radiator (dipole or a patch) and a corresponding receive element. The active radiator module performs amplification at low level and combines the power in the air, uses two narrow band antennas for transmit and receive, thus reducing the linearization and structural requirements of the antennas, and amplifies the received signal at the antenna terminal with no additional loss. The cables connecting the active radiator module and the BTS are simple and not sensitive to loss, and may be extended as needed.

Figure 3:
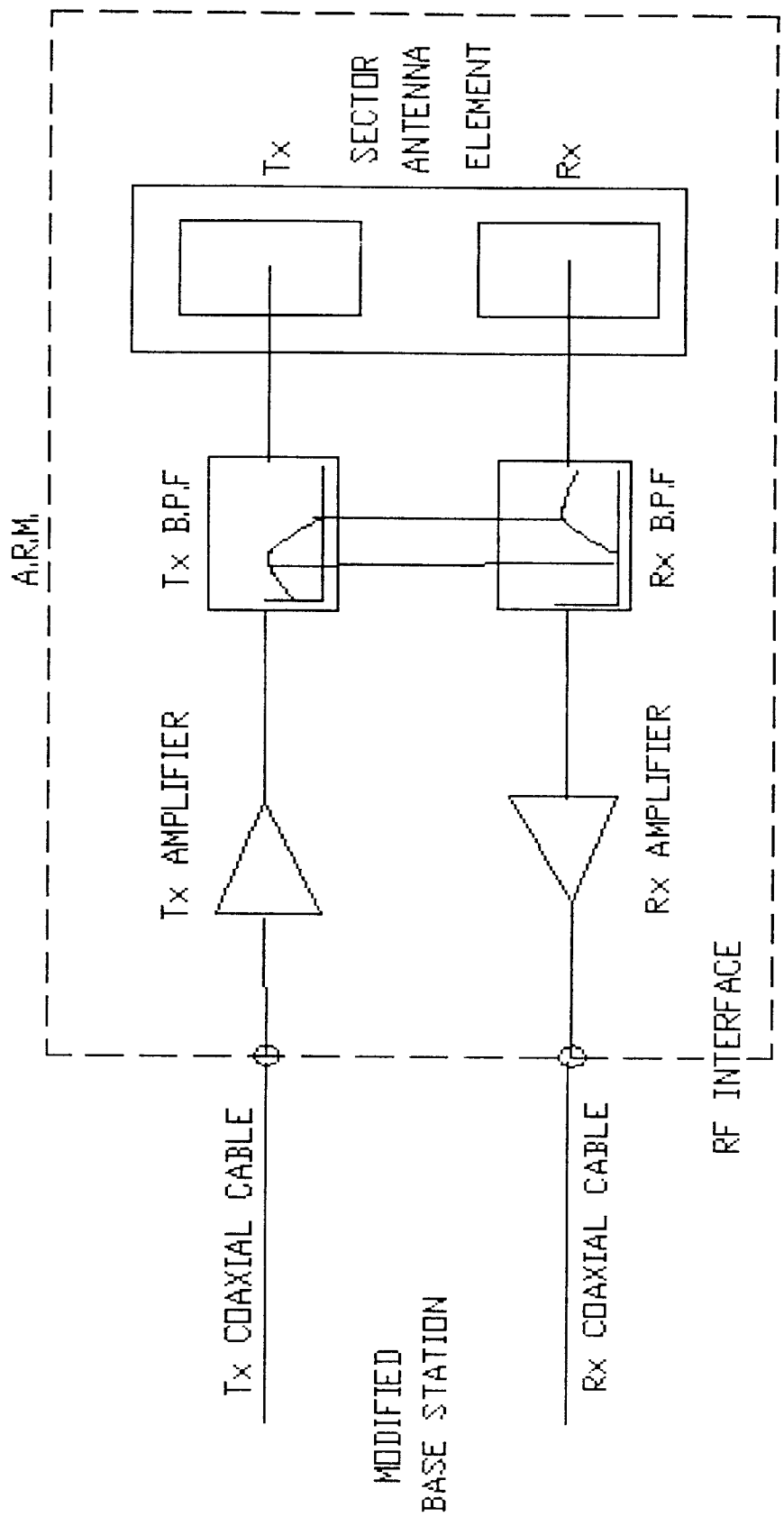
FIG. 3 is a simplified block diagram illustration of an active radiator module, constructed and operative in accordance with a preferred embodiment of the present invention.

Reference is now made to FIG. 3 which is a simplified block diagram illustration of an active radiator module forming part of the apparatus of FIG. 2. The active radiator module includes two separate transmit and receive antenna elements. This obviates the need for a diplexer, with the associated cost, power loss and occupied volume. Each antenna is preferably narrow banded, typically covering 12.5 MHz (<2%). A separation of preferably approximately 45 MHz provides about 20 dB isolation. Further isolation (up to 85 dB) is provided by the filters on the receiver and the transmitter channels. The transmitter amplifier is low power, 2 W or 0.2 W, depending on the application. A LNA follows the filter on the receiver channel.

Figure 4:
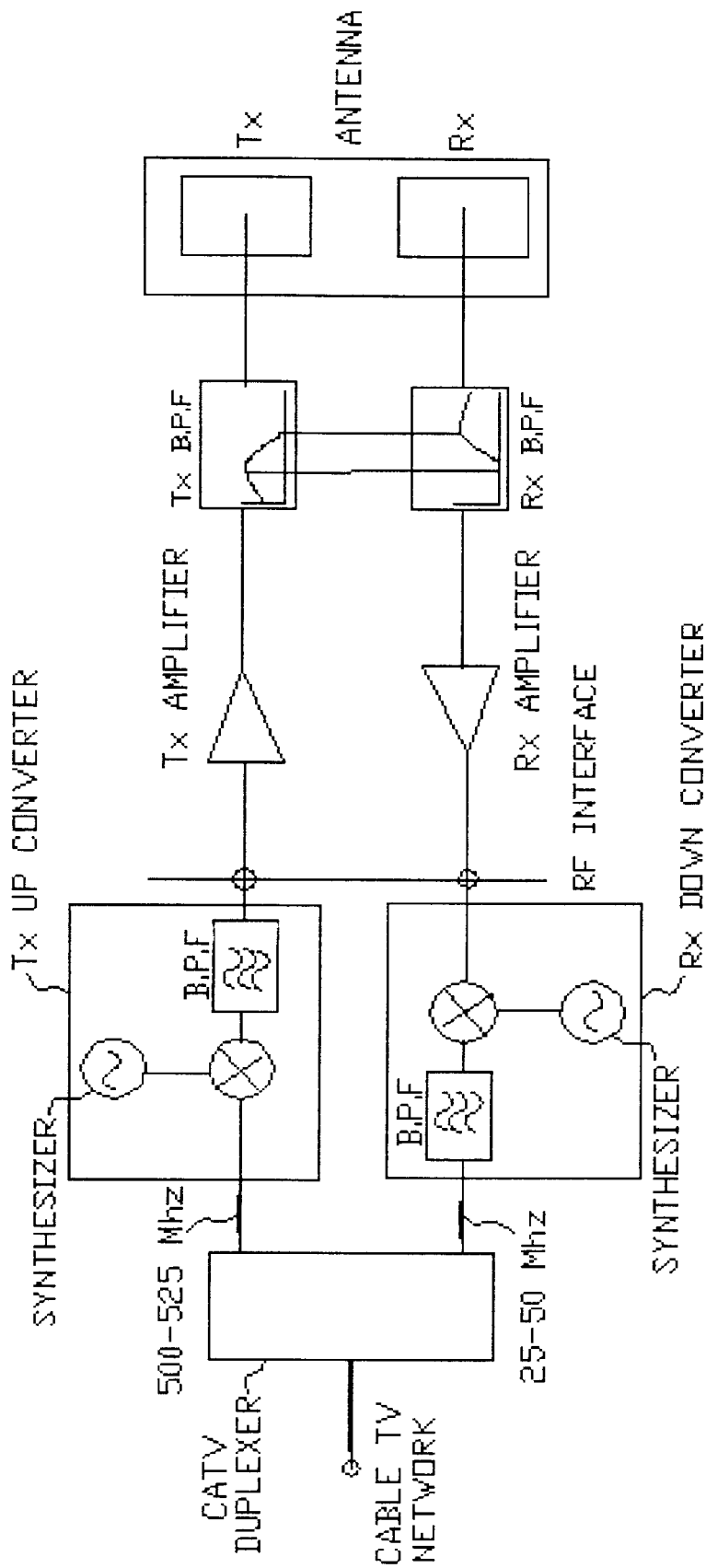
FIG. 4 is a simplified block diagram illustration of an active radiator module for CATV infrastructure based remote microcells, constructed and operative in accordance with a preferred embodiment of the present invention.

Reference is now made to FIG. 4 which illustrates an active radiator module for CATV infrastructure based remote microcells, constructed and operative in accordance with a preferred embodiment of the present invention. The basic active radiator module is preferably combined with a CATV up/down converter module to establish the CATV infrastructure based remote microcells. This special application active radiator module will make use of the existing CATV network as an RF trunk for remote RF Microcells. Such an existing CATV network is in use in U.S. markets with a great cost and capacity advantage. A similar product is being offered by Lucent Technologies.

The CATV up/down converter module input is preferably a coaxial cable connected to the CATV network and carrying the CATV standard forward link (typically 450–650 MHz) and reverse link (typically 5–52 MHz). A bandwidth of 10 MHz for each forward and reverse links is preferably dedicated to cellular active radiator module use.

The CATV diplexer within the converter separates the transmitter and receiver signals. These are then converted to the appropriate cellular frequencies. Each of these converters includes a mixer, phased locked oscillator and a band pass filter to eliminate image and low frequencies. The up/down converter module is attached directly to the active radiator module in this application.

Figure 5:
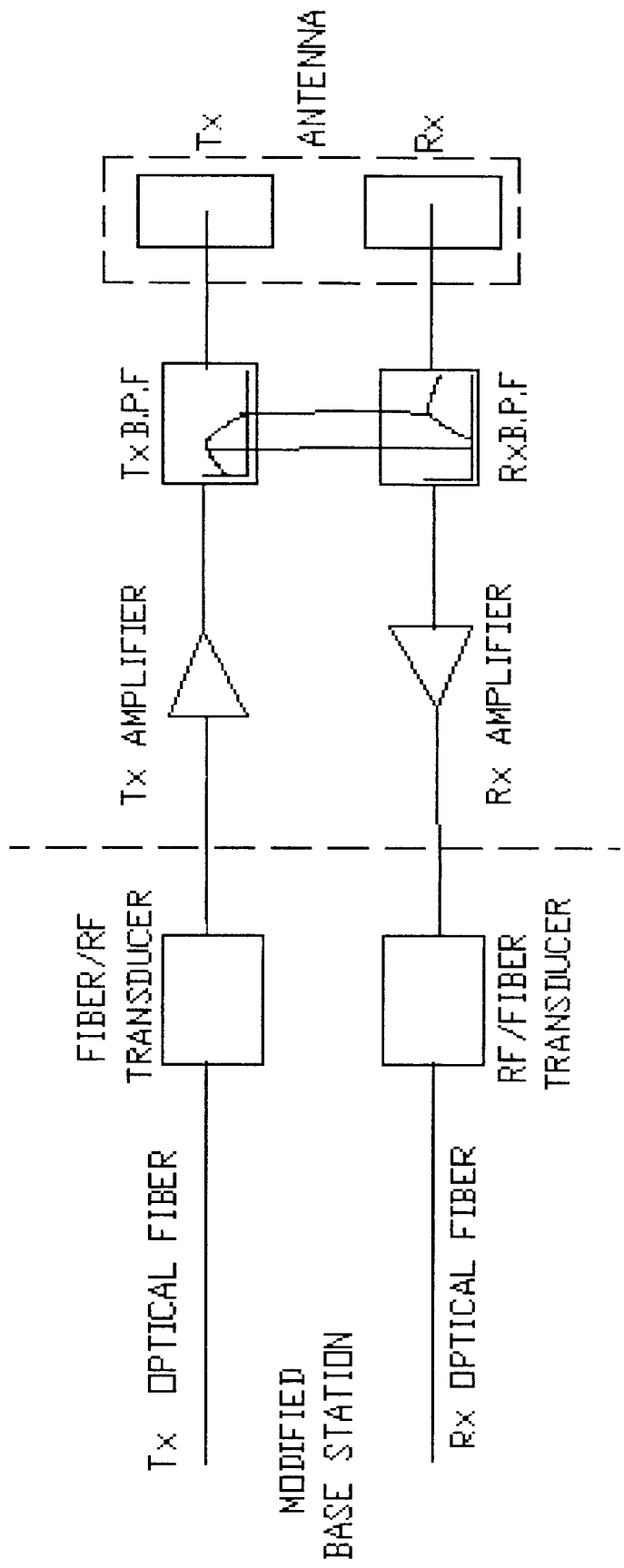
FIG. 5 is a simplified block diagram illustration of an active radiator module remote microcell via fiber, constructed and operative in accordance with a preferred embodiment of the present invention.

Reference is now made to FIG. 5 which illustrates an active radiator module remote microcell via fiber, constructed and operative in accordance with a preferred embodiment of the present invention. A fiber/RF converter module is attached to the basic active radiator module for fiber-optics trunking for remote active radiator module microcells. RF trunking via fiber is an efficient method for microcells layout, proposed for both in-buildings and outdoors microcell distribution. The fiber/RF transducer module preferably includes both transmitter fiber/RF converter and receiver RF/fiber converter within the same module. The input to this module is preferably either one fiber carrying both transmitter and receiver signals, split and filtered within the module, or two separate fibers, depending on fiber infrastructure. The fiber/RF converter module is attached directly to the active radiator module.

Figure 6:
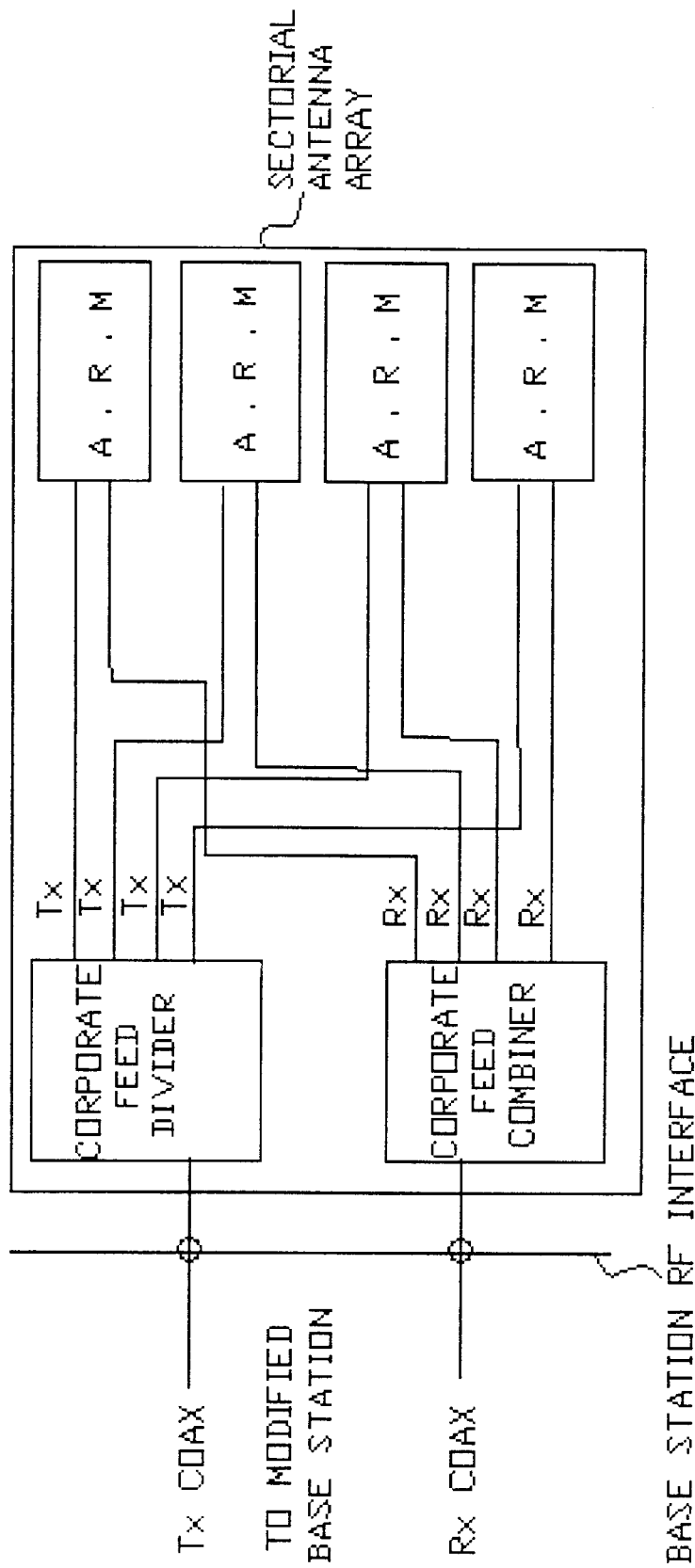
FIG. 6 is a simplified block diagram illustration of an active radiator module based high gain antenna array, constructed and operative in accordance with a preferred embodiment of the present invention.

Reference is now made to FIG. 6 which illustrates an active radiator module based high gain antenna array. Large cellular cells require both high ERP (Effective Radiated Power) and antenna gain. Arrays composed of active radiator module elements provide both effectively, at lower BTS cost, and higher flexibility and reliability. The ERP generated by a linear array composed of N active modules, each transmitting p Watts, is $N^2 p$. There is no additional loss, otherwise included in the link budget due to the BFN (Beam Forming Network), cable and diplexer.

Reference is now made to FIG. 7 which is a table comparing the transmission path power budget of a second generation prior art BTS and that of an active radiator module array, constructed and operative in accordance with a preferred embodiment of the present invention. It may be appreciated that a 10 element array, a 100 W MCLPA, with the associated high power cable and diplexer, may be replaced by 10 active radiator modules, each transmitting 2 W. A similar advantage is obtained on the receive path.

Figure 8:
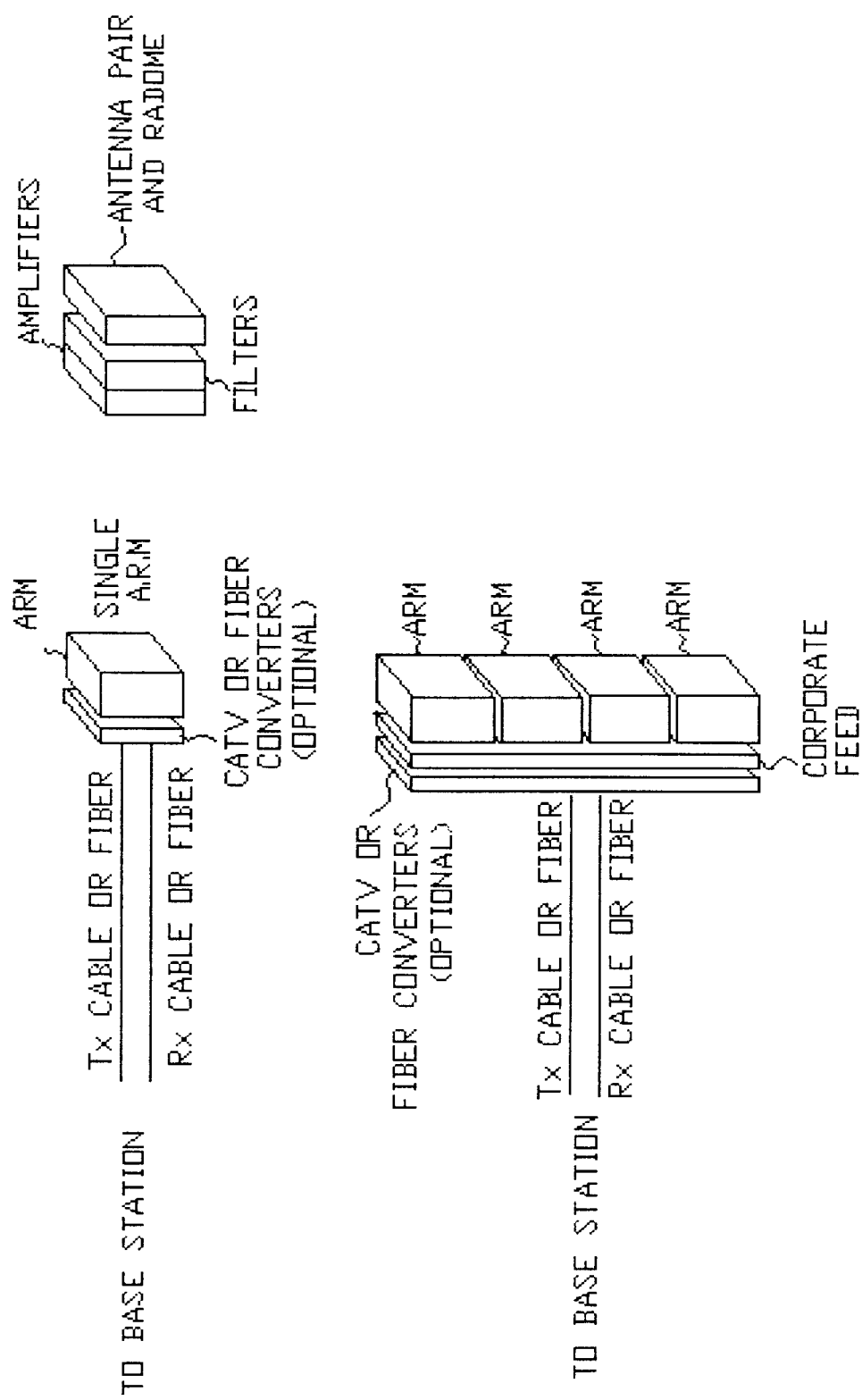
FIG. 8 is a simplified block diagram illustration of a modular design of the active radiator module, constructed and operative in accordance with a preferred embodiment of the present invention.

Reference is now made to FIG. 8 which illustrates a modular design of the active radiator module in accordance with a preferred embodiment of the present invention. Each module can be attached to other modules to establish a new product matched to specific customer requirements.

In the illustrated embodiment, the active radiator module comprises five basic building blocks and the integrating enclosure. The basic building blocks are:

1. transmitter amplifier
2. receiver amplifier
3. transmitter/receiver band pass filters
4. transmitter/receiver antenna element
5. power supply Before describing the amplifier of the active radiator module of the present invention, a brief discussion of the prior art will now be presented. Generally in the prior art, stringent intermod products (IMP) specifications are imposed on the BTS transmission, in order to avoid interference to its own receivers and to adjacent cells and systems. These impose linearity requirements on the transmission chain beyond the channel filters. The MCLPA for a large cell is thus specified not to exceed −70 dBc IMP. These constraints do not apply for a single channel amplifier, and are relaxed for microcells, where the dynamic range of the cell is reduced by over 30 dB. The IMP requirements for CDMA systems are less stringent.

A class A amplifier with proper backoff (3 to 5 dB) may serve the requirements for CDMA microcells and for other systems' low capacity microcells and cells ("minicells"). Higher linearity requires linearization techniques. Pre-distortion results in 7 to 10 dB higher $3^{rd}$ ICP (third order intercept point) and enables 10 to 20 dB lower IMP. A cost factor of 10 is considered today practical compared to the class A amplifier, owing to the hybrid design of the latter, as compared to discrete components and manual tuning of the pre-distorted amplifier. The cost may be reduced by resorting to a similar technology, justified for large quantities. Further linearization requires feed-forward techniques as used in the high power MCLPA. It is expected that these expensive techniques will not be needed in any of the active radiator module applications.

The amplifier of the active radiator module of the present invention will now be described. A class A amplifier, operating at 3 to 5 dB backoff, may be used for the first generation of active radiator module. Such an amplifier offers low cost and a short development time. The amplifier accommodates the CDMA microcells and minicells and low capacity microcells and minicells for other systems, which constitute a major portion of the market.

The transmitter amplifier preferably comprises two stages. The first stage is preferably a monolithic silicon class A gain stage. The second stage is preferably a hybrid packaged power amplifier. The amplifier with all of its matching and biasing networks are preferably assembled using SMT technology on a RF printed board within the transmitter amplifier enclosure.

Typical transmitter amplifier specifications are presented here for purposes of description of best mode, but the present invention is not limited to these values.

| | |
|---|---|
| Frequency band | 1930–1990 MHz (PCS) |
| Output power (average) | 2 w for CDMA |
| Input power for max. output | −2 dBm |
| Input power for burn out | +12 dBm max. |
| Power control range | 20 dB min |
| Power down at Shutdown | −50 dB min |
| 1 dB compression | 36–38 dBm |
| $3^{rd}$ order intercept point | +46 dBm min. |
| Two tones I.M products | −30 dBc for 1 w per tone |
| | −44 dBc for 0.2 w per tone |

-continued

| | |
|---|---|
| Gain | 35 dB to 38 dB, @ small signal without external compensation |
| Gain flatness | +/−0.1 db over any 1.25 MHz |
| Gain variation over temp | 3 dB max. without external compensation |
| Transmission phase variation vs. Freq. | +/−1° over any 1.25 MHz |
| Transmission phase window between units | +/−3° |
| AM/PM conversion | 0.25°/dB Max up to 3 dB below 1 dbcp |
| Noise figure | 8 dB Max |
| Spurious (non-harmonic) | −60 dBc |
| Input VSWR | 1.5: 1 @ 50 ohm system |
| Output VSWR | 1.3: 1 @ 50 ohm system |
| DC supply voltage | +8 volts and −5 volts DC with missing negative voltage protection |
| DC supply current | 4 Amp @ 8 v |

The receiver amplifier within the active radiator module is intended to ensure that the base station sensitivity will not be degraded because of long coaxial cables losses or other media losses and noise add in between the antenna element and base station front end.

The receiver amplifier preferably has enough gain, low enough noise figure, high enough compression and intercept points to eliminate sensitivity, inter-channel interference and non-linear multi-channel distortion degradation.

Typical receiver amplifier specifications are presented here for purposes of description of best mode, but the present invention is not limited to these values.

| | |
|---|---|
| Frequency range | 1850–1910 MHz (PCS) |
| Noise figure | 2.5 dB max. |
| Gain | 30 dB min. without external compensation |
| Gain flatness | +/−0.1 dB over any 1.25 MHz |
| Gain variation over temp | 3 dB max. without external compensation |
| Input power burn out | +15 dBm max. |
| Power control range | 20 dB min |
| Input 1 dB compression point | 0 dBm min |
| Input $3^{rd}$ order intercept Point | +10 dBm min |
| Transmission phase variation vs. Freq. | +/−1° over any 1.25 MHz |
| Transmission phase window between units | +/−3° |
| Spurious (non-harmonic) | −60 dBc |
| Input/Output VSWR | 1.5: 1 @ 50 ohm system |
| Class of operation | A |
| Voltage suppty | +8 v regulated |
| Current requirement | 150 mA |
| Technology | SMT of MMIC |

Transmitter and receiver filters of the active radiator module establish, together with transmitter/receiver antennas separation, a diplexer which isolates transmitter and receiver signals from each other. Specifications for transmitter and receiver filters are directly driven from performance requirements of active radiator module per system and application.

Typical specifications are presented here for purposes of description of best mode, but the present invention is not limited to these values.

| | |
|---|---|
| Tx Channel | |
| Frequency band | 1960–1990 MHz (PCS) |
| Output power (average) | 2 w for CDMA |

-continued

| | |
|---|---|
| Input power for max. output | −2 dBm |
| Input power for burn out | +10 dBm max. |
| Power control range | 20 dB min |
| Power down at Shutdown | −50 dB min |
| Output 1 dB compression | 36–38 dBm |
| 3$^{rd}$ order intercept point | +46 dBm min. |
| CDMA ACP @ +33 dBm out | −45 dBc @ 1.25 MHz B.W |
| In/out Gain | 35 ± 0.5 dB with compensation |
| Gain flatness | +/−0.1 dB over any 1.25 MHz |
| Gain variation over temp | 0.5 dB max. with compensation |
| Transmission phase variation vs. Freq. | +/−1° over any 1.25 MHz |
| Transmission phase window between units | +/−5° |
| AM/PM conversion | 0.25°/dB Max up to 3 dB below 1 dbcp |
| Noise figure | 8 dB Max |
| Spurious (non-harmonic) | −60 dBc |
| Input VSWR | 1.5: 1 @ 50 ohm system |
| Rx Channel | |
| Frequency range | 1880–1910 MHz (PGS) |
| Noise figure | 3.5 dB max. |
| In/out Gain | 30 ± 0.5 dB with compensation |
| Gain variation over temp | 0.5 dB max. with compensation |
| Input power for burn out | +15 dBm max. |
| Power control range | 20 dB min |
| Gain flatness | +/−0.1 dB over any 1.25 MHz |
| Transmission phase variation vs. Freq. | +/−1° over any 1.25 MHz |
| Transmission phase window between units | +/−5° |
| Input 1 dB compression point | 0 dBm min |
| Input 3$^{rd}$ order Intercept Point | +10 dBm min |
| Spurious (non-harmonic) | −60 dBc |
| Class of operation | A |
| Output VSWR | 1.5: 1 @ 50 ohm system |

The transmitter filter has two roles within the active radiator module. The first is to reduce transmitter wide band noise in a receiver band. The second is to reduce spurious signals which might interfere with a receiver channel of the same cell or other cells or other systems. The more demanding requirement is the first one and it dictates the transmitter filter performance and thus transmitter filter structure.

In order for the transmitter noise and leakage into the receiver channel input to be lower than the receiver noise floor, an isolation of 60 dB (−74+135) is required. 20 dB of the required isolation is attributed by transmitter/receiver antenna isolation and the other 40 dB plus 10 dB of safety margin, are given by receiver band rejection of the transmitter filter. The same reasoning holds for CDMA systems where the values differ but the ultimate results hold.

The receiver filter has two roles within the active radiator module. The first is to reduce the transmitter signal to a level where interfering intermod products are not generated in the receive chain, and the receiver amplifier is not desensitized by saturation. The other purpose of the receiver filter is to reduce interfering signals from other base stations and other systems. The more demanding requirement is the first one and it will dictate the receiver filter performance and thus the filter's structure.

In order for the transmitter leakage not to interfere with received signal, it should be kept at a much lower level than receiver channel compression for systems with no AGC or when AGC is at minimum. For example, if the 1 dB compression point at the receiver antenna terminal is −60 dBm, the transmitter leakage is preferably below −70 dBm. For transmitter average output power of +33 dBm and transmitter/receiver antenna isolation of 20 dB, the receiver filter rejection of transmitter band is preferably 85 dB. The same reasoning holds for CDMA systems where the values differ but the ultimate results hold.

Typical specifications for the active radiator module filters are presented here for purposes of description of best mode, but the present invention is not limited to these values.

| | |
|---|---|
| Tx Filter | |
| Pass band | 1960–1990 MHz (PCS) |
| Rejection | −50 dB @ 50 MHz below pass band |
| | −40 dB @ 50 MHz above pass band |
| | −60 dB from 80 MHz above band to 4 GHz |
| Insertion loss | −1.5 dB max. @ pass band (0.5 dB goal) |
| Ripple within band | dB max. over any 1.25 MHz band |
| | 0.6 dB max. over 30 MHz |
| Group delay variation | 2 nsec max. over any 1.25 MHz |
| Transmission phase window between units | +/−5° |
| Return loss in/out | −17 dB min |
| Handling power | 10 w max |
| Rx Filter | |
| Pass band | 1880–1910 MHz (PCS) |
| Rejection | −75 dB @ 50 MHz above pass band (−85 dB design goal) |
| | −40 dB @ 50 MHz below pass band |
| | −60 dB from 80 MHz above band to 4 GHz |
| Insertion loss | −1.5 dB max. @ pass band (0.5 dB goal) |
| Ripple within band | dB max. over any 1.25 MHz band |
| | 0.6 dB max over 30 MHz |
| Group delay variation | 2 nsec max. over any 1.25 MHz |
| Transmission phase window between units | +/−5° |
| Return loss input | −17 dB min |
| Handling power | 10 w max |

Figure 9:
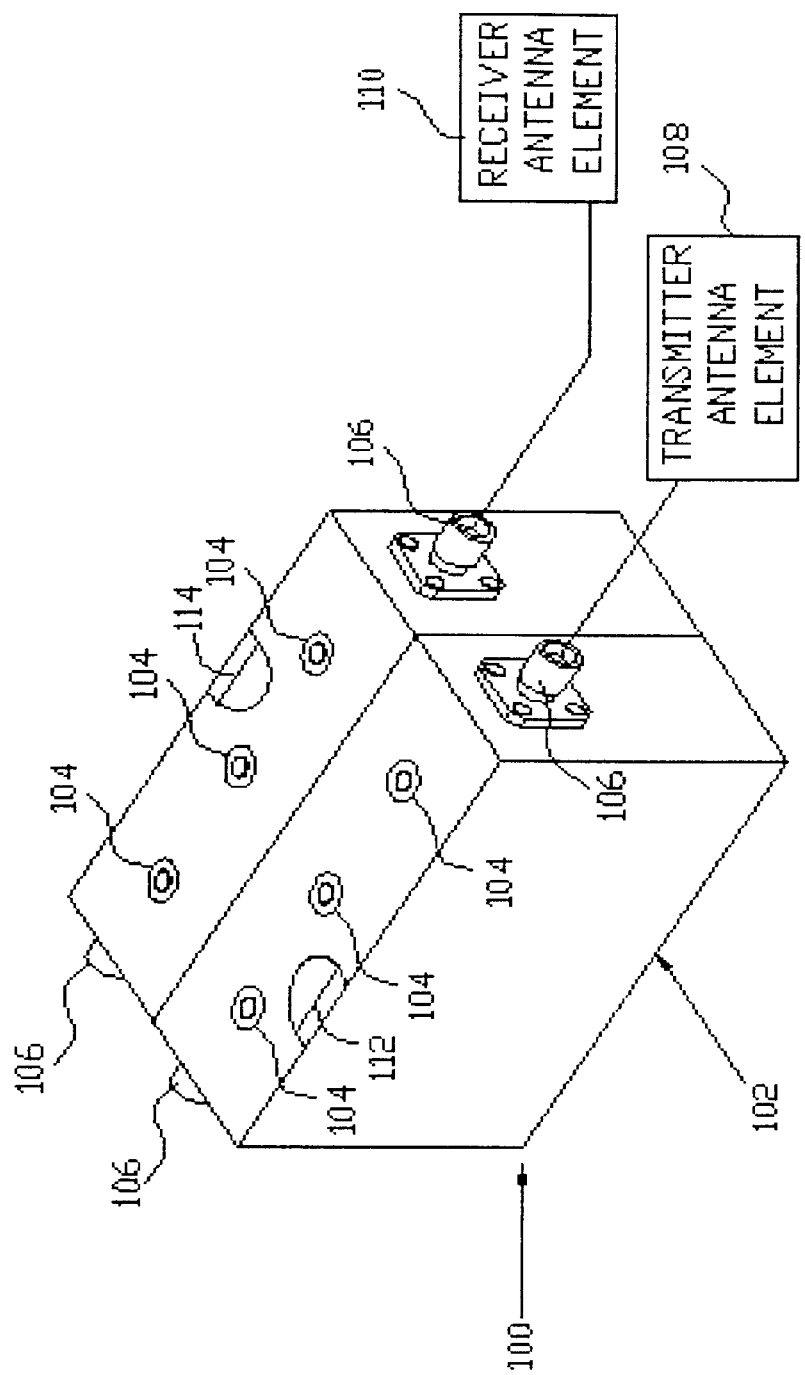
FIG. 9 is a simplified illustration of mechanical structure of the active radiator module, constructed and operative in accordance with a preferred embodiment of the present invention.

Reference is now made to FIG. 9 which illustrates mechanical structure of an active radiator module 100 in accordance with a preferred embodiment of the present invention. Active radiator module 100 preferably includes a housing 102 typically constructed of aluminum. A plurality of tuning elements 104 and I/O connectors 106 are preferably mounted on outside surfaces of housing 102. Input from transmitter and receiver antenna elements 108 and 110, respectively, is fed to the I/O connectors 106 and output connections are preferably directly made with the amplifier's circuit boards (not shown). Disposed inside housing 102 are transmitter and receiver filters 112 and 114, respectively. Each of the transmitter and receiver filters 112 and 114 preferably includes a 6-coaxial-resonators elliptic filter in combine structure.

Both transmitter and receiver antenna elements 109 and 110 are preferably printed patch elements. Transmitter and receiver elements 108 and 110 are preferably printed on the same base material (typically polyurethane material) and covered by a sheet of epoxy-fiberglass or other protective cover that withstands the environment, including UV radiation. Both elements 108 and 110 are preferably designed to ensure the required isolation between the elements. The design is preferably compatible with array-stacking of elements for a high-gain antenna, as will be described further below.

Typical specifications are presented here for the active radiator module antenna for purposes of description of best mode, but the present invention is not limited to these values.

| | |
|---|---|
| Frequency band | Tx: 1960–1990 MHz for PCS |
| | Rx: 1880–1910 MHz for PCS |
| Tx/Rx elements isolation | 20 dB (15 dB min.) |
| | for any Tx/Rx polarization |
| | combination |
| Polarization | Vertical or Horizontal in any |
| | combination |
| Gain | 5 dBi min. 6 dBi (target) |
| Beam width | AZ.120. @ −4 db |
| | EI 80° max. |
| Side lobes | AZ: none |
| | EI: −15 dB |
| Front to Back ratio | @ 90°–120°& 240° −270° < −10 dB |
| | @ 120°–240° < −15 dB |
| Efficiency | 90% |
| VSWR.(@ 50Ω system) | 1.6: 1 Max |
| Size | 140 × 70 × 15 mm |

An active radiator module power supply preferably supplies all DC power requirements of the transmitter and receiver amplifiers and includes all protection means needed for a tower top mounted device. Since the active radiator module power supply is preferably mounted on top of the antenna tower and cable connecting the base station and the active radiator module does not have a prefixed length a DC-DC converter is needed within the power supply. DC supply is preferably through transmitter or receiver coaxial cables, which means a BIAS-T should be implemented within the active radiator module power supply. The DC supply source is preferably within the base station. This way of DC supply is convenient for the modular approach where each module (CATV converter or Fiber/RF converter) has an independent power supply, all consuming DC power from the same source through connecting coaxial cables.

Typical specifications are presented here for the power supply for purposes of description of best mode, but the present invention is not limited to these values.

| | |
|---|---|
| Input voltage | 18–32 V DC |
| Output voltages | 8 V DC @ 4 Amp |
| | (or other voltage with same power) |
| | 5 VDC @ 0.1 Amp |
| Operating temperature | −40° C. to +50° C. |
| Input connection | Through an internal BIAS-T |

The integrating enclosure of active radiator module is based on a transmitter/receiver filters block. This block occupies the main volume of the active radiator module. The mechanical structure is preferably divided into two main mechanical parts: each encompassing a fitter block and a compartment housing the active circuits: one half incorporates the transmit circuit and power supply, while the other hosts the receive part and the monitoring and central unit.

The antennas' panel is attached to the front of the unit, and connected directly to the filters' terminals.

Both mechanical parts are preferably made of die cast aluminum and screwed to one another with sealing conductive O-ring in between the parts. Overall size of active radiator module structure is preferably around 70×140×160 mm.

The active radiator module aluminum structure is preferably designed to dissipate heat from the transmitter and receiver amplifiers and power supply. Overall heat dissipated within the active radiator module is about 30 W and the temperature rise above ambient temperature is approximately 10° C. or less.

The antenna radome is preferably at the front of the active radiator module, while the transmitter and receiver connectors are preferably on the rear side. Several active radiator module units may be interconnected to form an array for the higher gain and higher power antennas.

Figure 10:
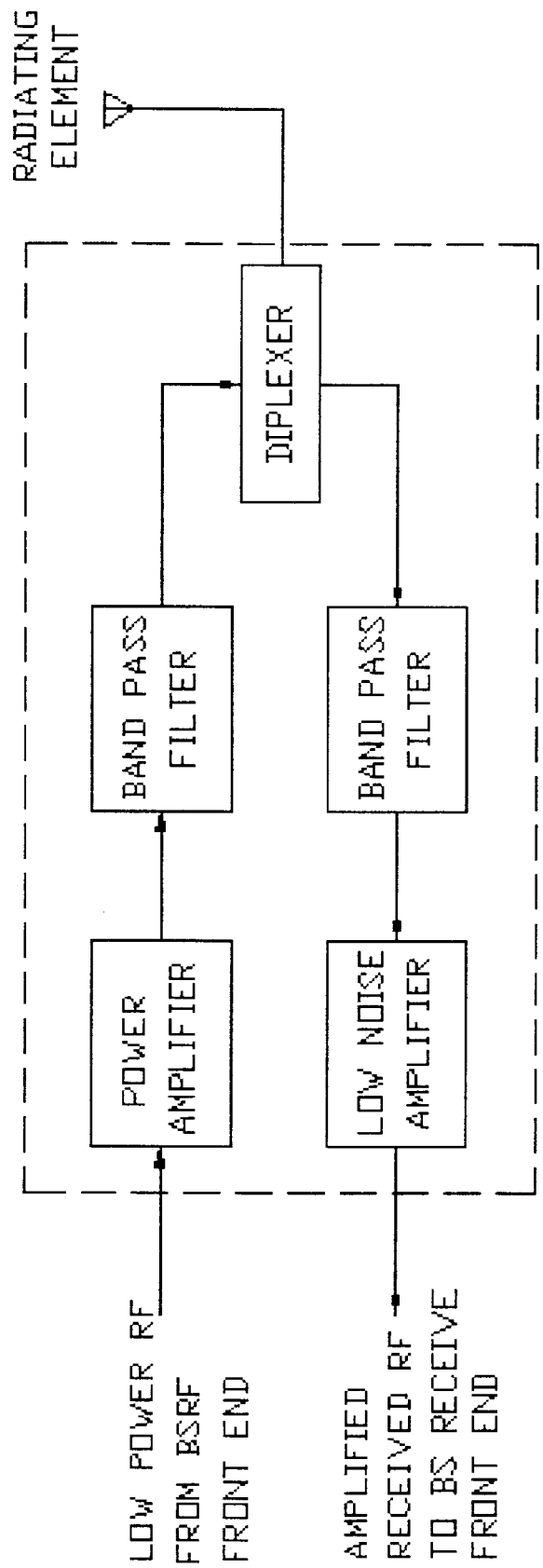
FIG. 10 is a simplified block diagram illustration of one module of an active radiator module constructed and operative in accordance with a preferred embodiment of the present invention.

As mentioned above, the active radiator modules are compatible with array-stacking of elements for a high-gain antenna. Reference is now made to FIG. 10 which illustrates a block diagram of one module of an active radiator module constructed and operative in accordance with a preferred embodiment of the present invention. The active radiator module preferably includes a power amplifier, band pass filter, diplexer and LNA in conjunction with a radiating element, such as an antenna.

Figure 11:
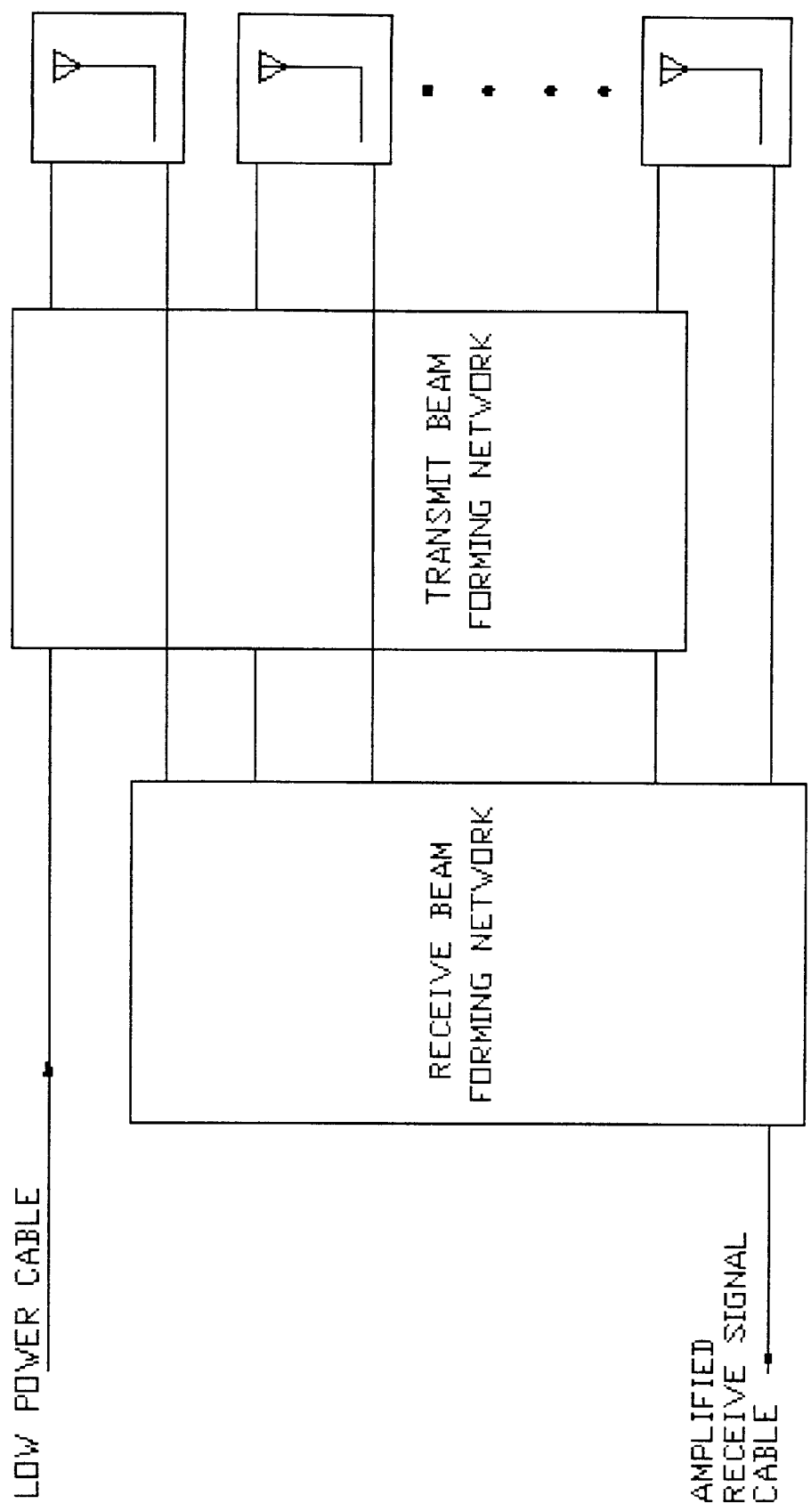
FIG. 11 is a simplified block diagram illustration of a stack of modules of active radiator modules constructed and operative in accordance with a preferred embodiment of the present invention.

Reference is now made to FIG. 11 which illustrates a block diagram of a stack of modules of active radiator modules constructed and operative in accordance with a preferred embodiment of the present invention. A low power cable is used with the transmit beam forming network.

Figure 12:
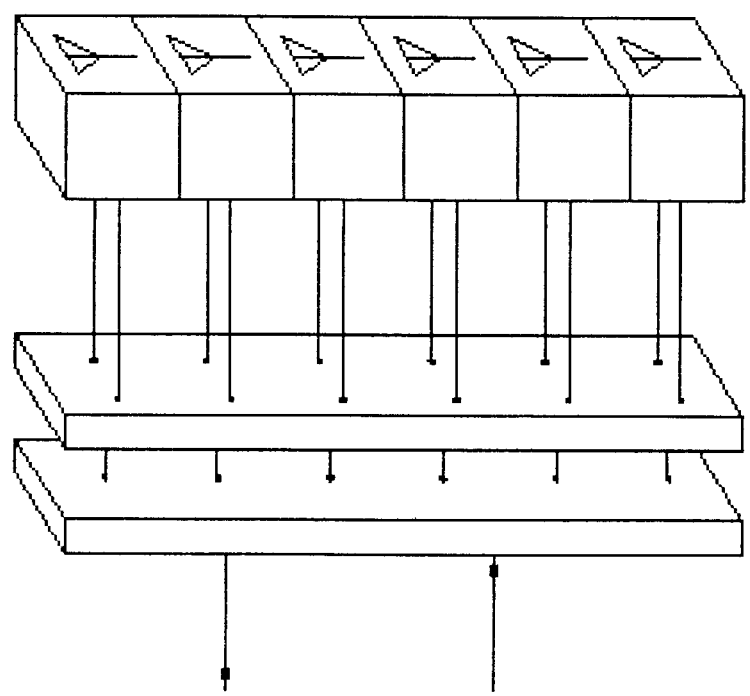
FIGS. 12, 13 and 14 are simplified illustrations of three different arrays of stacks of modules, constructed and operative in accordance with three preferred embodiments of the present invention.
Figure 13:
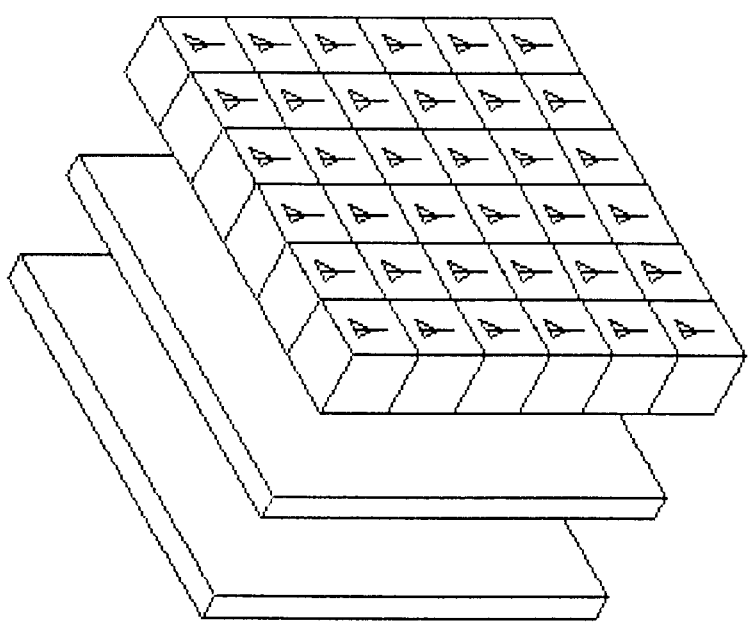
Figure 14:
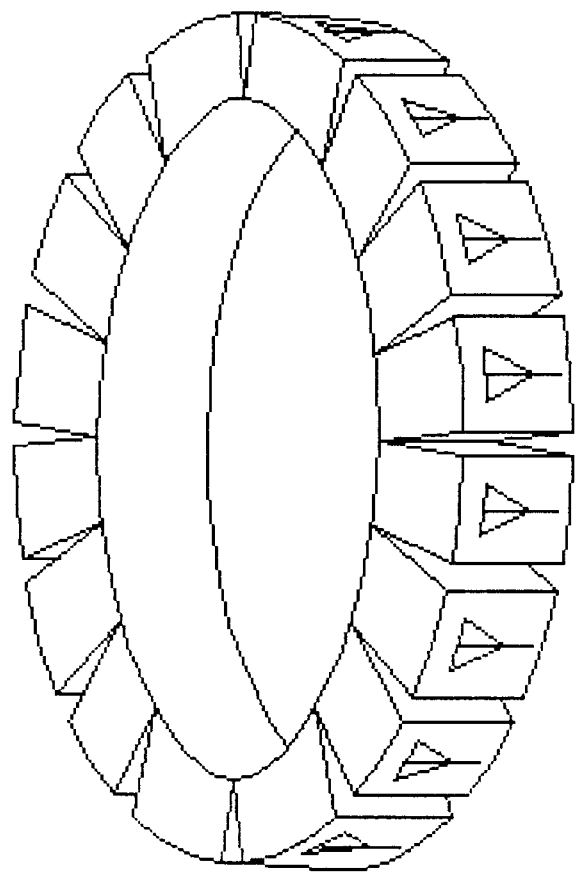

Reference is now made to FIGS. 12, 13 and 14 which illustrate three different possible arrays of stacks of modules, constructed and operative in accordance with a preferred embodiment of the present invention. FIG. 12 illustrates a vertical array, FIG. 13 illustrates a planar array and FIG. 14 illustrates a circular array. It is appreciated that other configurations are possible in the scope of the invention. Alternatively, in the embodiments of FIGS. 10, 11, 12, 13 and 14, instead of employing a diplexer, two separate antennas for transmit and receive may be used.

The following list summarizes some of the advantages of the active radiator module of the present invention:

A common module for many cellular applications

A major cost saver for large cells (reduces the power requirement by 3 to 6 dB as compared to MCLPA at the base station (BS) compartment, reduces the need for high power low loss cable, and enables longer distance between the antenna and the BS).

Takes a substantial "bite" out of the BS market, while avoiding the need for expensive technology licenses associated with the BS production.

Reduces the BS noise figure by eliminating the cable losses.

Reduces antenna Intermod Products (IMP) by separating the transmitter and receiver antennas and by eliminating cable connections.

A failure of a module in an array does not cause a catastrophic damage to the BS, but only a graceful degradation.

A building block for multiple-beam and smart antennas.

Figure 15:
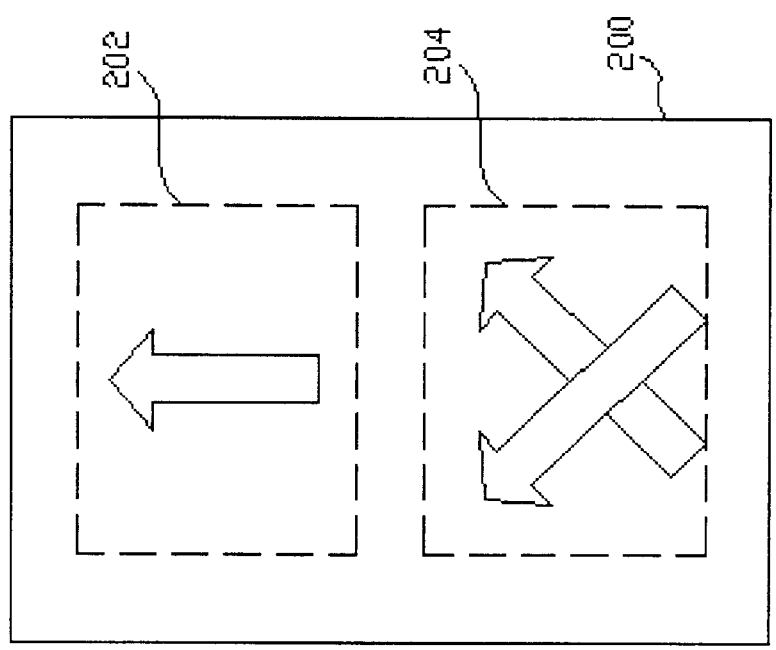
FIG. 15 is a schematic illustration of an antenna unit, constructed and operative in accordance with a preferred embodiment of the present invention.

Reference is now made to FIG. 15 which is a schematic illustration of an antenna unit, generally designated 200, constructed and operative in accordance with a preferred embodiment of the present invention. Antenna unit 200, which comprises a vertically polarized Tx antenna 202 and dual polarized Rx antennas 204, is effective for polarization diversity.

The effectiveness of the polarization diversity antenna depends on the similarity of the radiation patterns of the two receiving antennas, and on the equality of the average level of signal received in both. Preferably, the dual polarized Rx antennas 204 are linearly slant polarized antennas.

The preferred polarization for the transmit antenna 202 is vertical. Since the polarization of the subscribers' handsets is probably randomly distributed, with an average on the vertical. Generally, a separate antenna is thus required for transmission, thereby doubling the antenna height. An alternative arrangement frequently adopted in prior art is for transmission on one of the slant polarized antennas.

However, the polarization is less effective and in a diplexer is required in one of the receive antennas, which reduces the symmetry between their reception.

The active antenna unit 200 has the advantages of encompassing the vertically polarized antenna 202, backed by a power amplifier and a transmission band filter, and two slant-linear antennas, each backed up by a LNA and a receive band filter (not shown). The choice of separate, narrow band, special antennas, therefore forms a most compact antenna for transmit and receive, each at the optimal polarization. The active elements on transmit and on receive offer improvements in standards of sensitivity, reliability and flexibility in design and maintenance.

In another embodiment, one receive antenna is vertically polarized as in FIG. 15 and two transmit antennas are polarized in slant linear polarization of ±45° respectively. The active Radiator unit incorporates one receive amplifier, connected to the Rx antenna via a proper band filter and two transmit amplifiers, each connected to one of the transmit antennas via a proper hand filter. The preferred application of this configuration is for polarization diversity repeater, whereby the two transmit channels relay the diversity products to the donor base station, while the receive channel relays the signal from the donor base station to the distribution subscribers.

Appendix A further discloses active radiator modules, constructed and operative in accordance with other preferred embodiments of the present invention.

APPENDIX A

CONTENTS

1. ARM description
2. ARM configurations
   2.1. High gain antenna array
   2.2. Dual polarized antenna
   2.3. Transmission diversity delay module for CDMA IS95
   2.4. Multibeam/intelligent antenna arrays
   2.5. Multiplex trunking for multibeam/intelligent antenna arrays
   2.6. CATV trunking module
   2.7. Fiber optics trunking module
3. ARM high-level design and specifications
4. ARM array interface with the base station.
5. ARM-based base station cost comparison
6. ARM array reliability analysis
7. ARMcell—guidelines for cell design with ARM

1. Description of the ARM Module
1.1. The Base Transceiver Subsystem (BTS) (FIG. 16)

Figure 16:
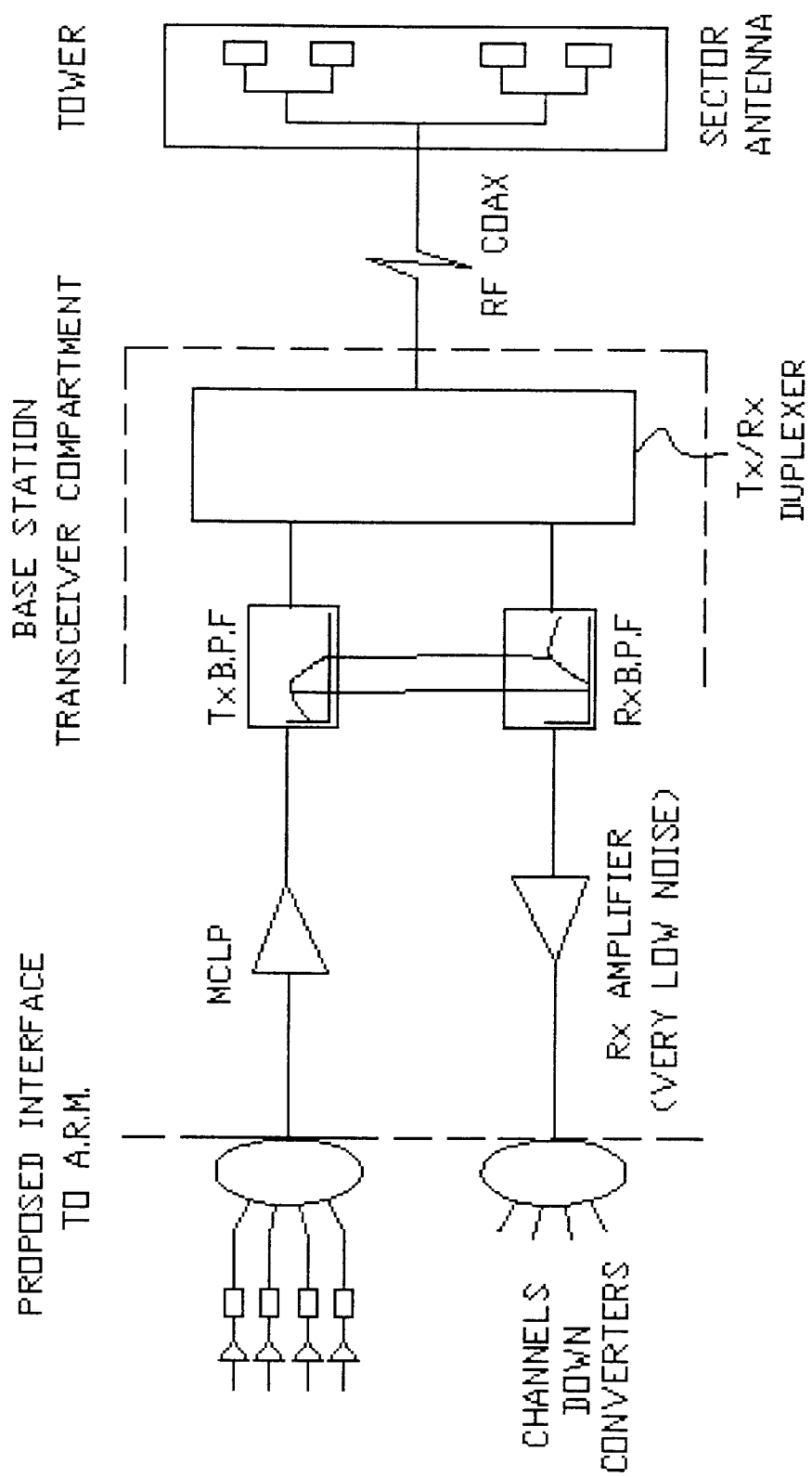
FIG. 16 is a diagram of the base transceiver subsystem.

The RF section of a second generation of Base Transceiver Subsystem (BTS) is depicted in FIG. 16. The single channels are combined, after preamplification and channel filtering, and then feed a Multi Carrier Linear Power Amplifier (MCLPA). The combined signal is then band-pass filtered, diplexed and ran through a high power, low loss cable, to the antenna array. The complex, consisting of the cable and antenna array, serving both transmit and receive signals, is required to be extremely linear and not generate IMD (Intermod products) higher then about −135 dBc—which stresses the antenna and the cable connections specifications. The diplexer and Band Pass Filters need about 100db of isolation between Tx and Rx frequencies.

The cost of this architecture is a power loss of 3 to 10 dB in the filters, diplexer cable and antenna beam forming network, that has to be compensated by a high power MCLPA and all its supporting equipment. The antenna beam forming network and the cable loss degrades the noise figure on the receive side by 3 to 5 dB.

The ARM replaces the MCLPA, high power cable, diplexer and broadband superlinear antennas, and LNA, by a module on the mast that amplifies the low level transmission signal to a moderate level that is radiated by the elemental antenna that is integrated in the module. The radiation of all modules in a column array is combined in the air to produce the required ERP. Two narrow band antennas for transmit and receive are integrated in each, thus reducing the linearization and structural requirements of the antennas and alleviating the need for a diplexer. The received signal is amplified at the antenna terminal with no additional loss. Since BTS with ARM system performance is not sensitive to cables losses, the cables connecting the ARM and the BTS are inexpensive and may be extended as needed.

Figure 18:
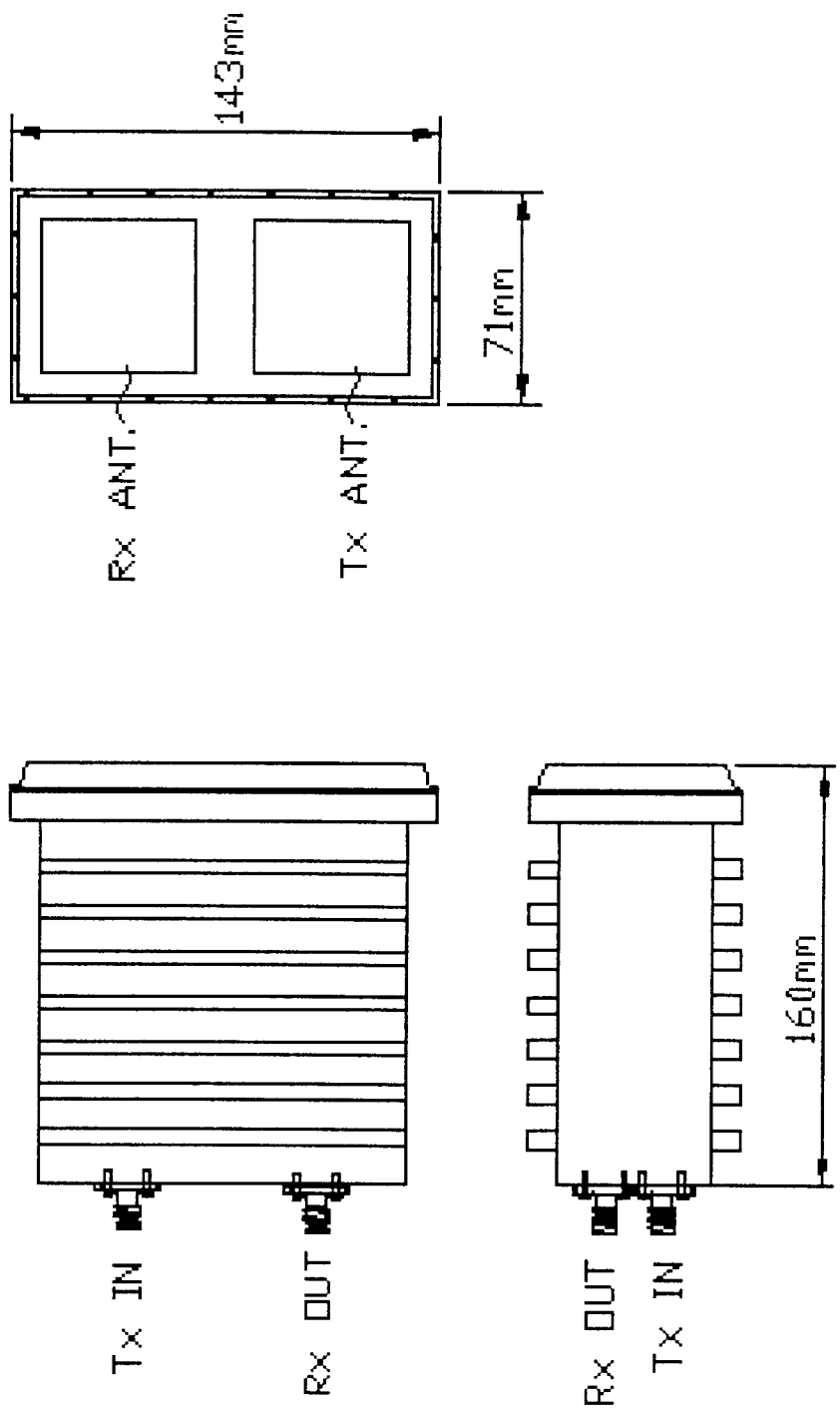
FIG. 18 shows the mechanical layout of the active radiator module.
Figure 19:
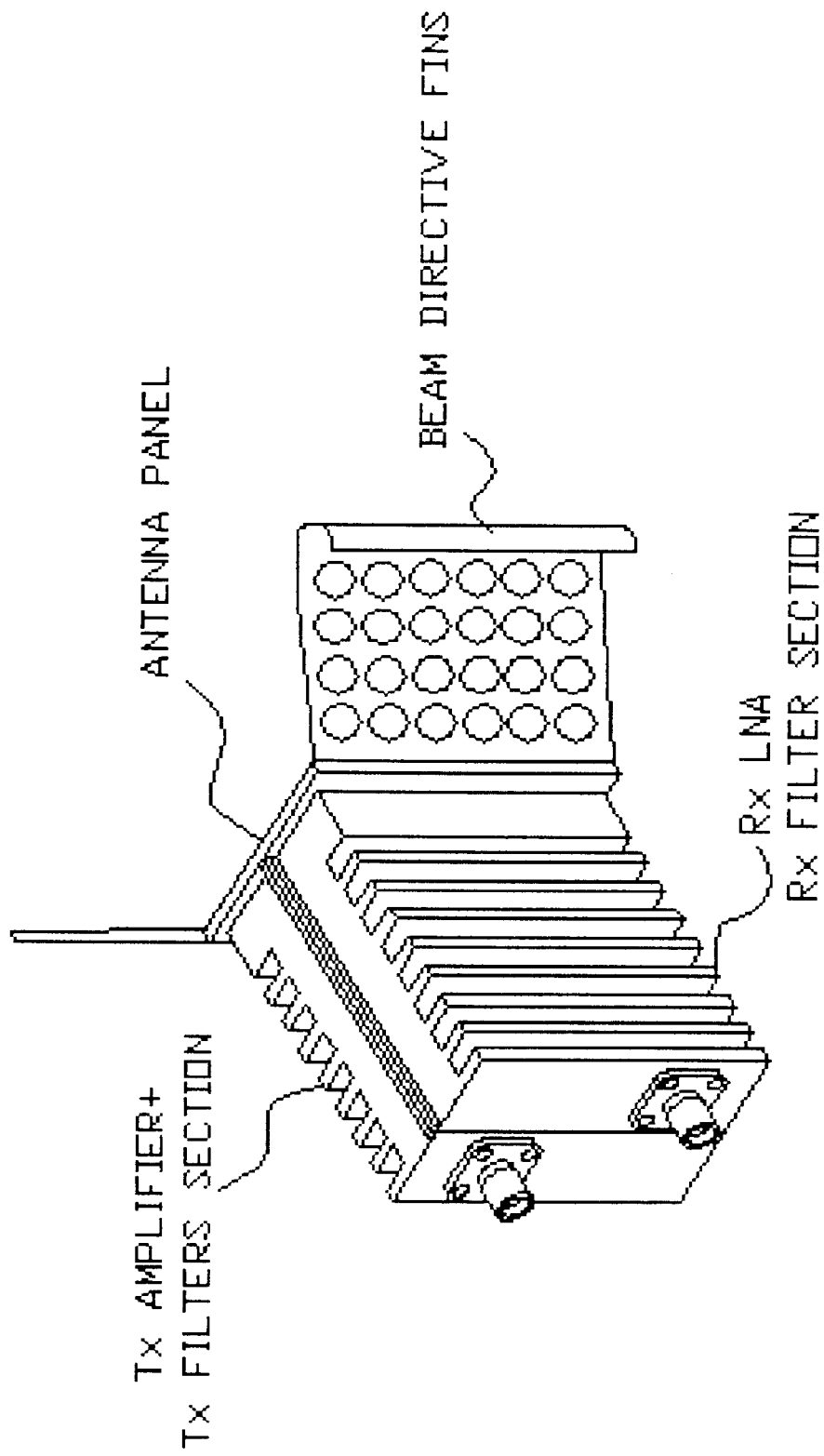
FIG. 19 shows the modular architecture of the active radiator module.

1.2. Description of the Basic ARM (FIGS. 17–19)

Figure 17:
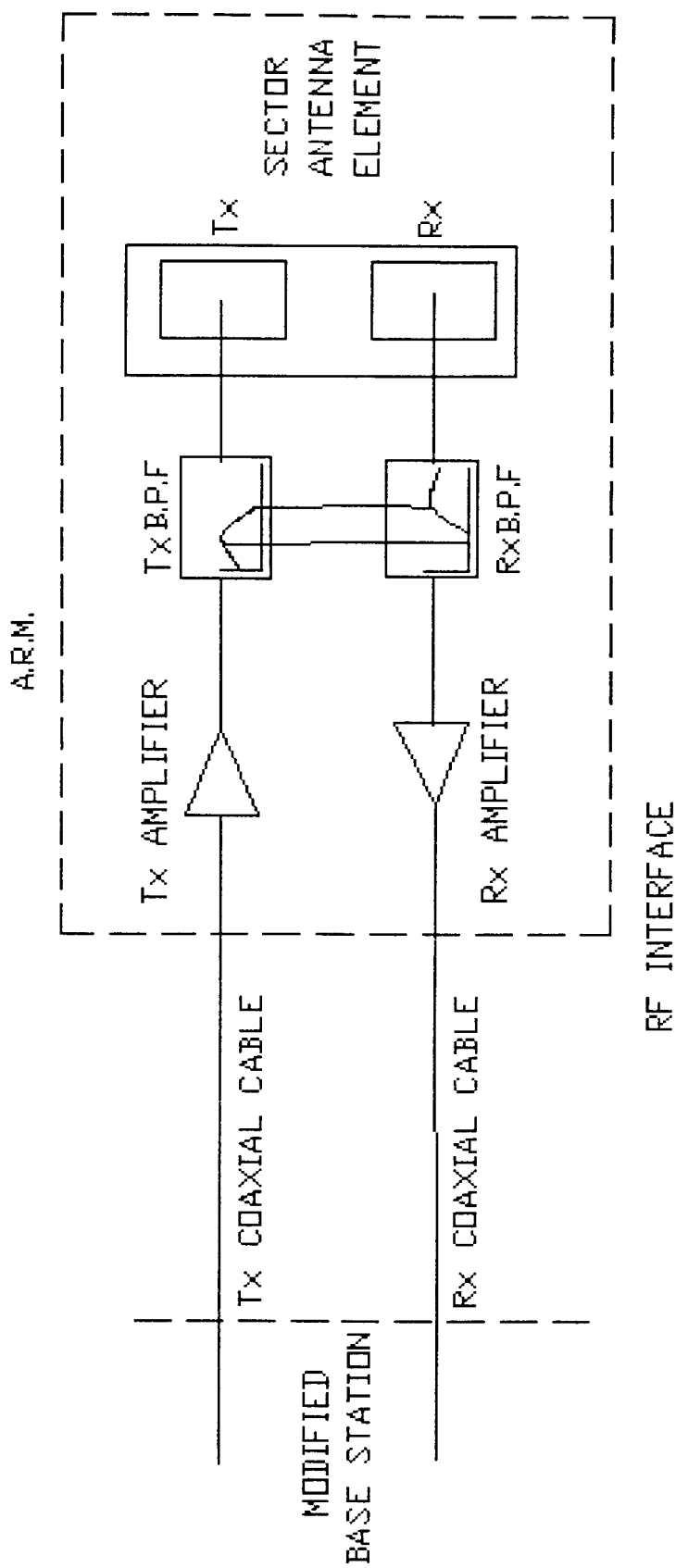
FIG. 17 is a block diagram of the active radiator module.

The Active Radiator Module (ARM) block diagram is shown in FIG. 17. The ARM incorporates two separate transmit and receive antenna elements. Each antenna is narrow banded, (<3%). The separation between the Tx and Rx bands provides about 20 dB isolation, and obviates the need for a diplexer, with the associated cost, power loss and complexity. The band pass filters on the Rx and the Tx channels provide the additional 85 dB isolation required between the links. The Tx amplifier is low power, providing 2 Watts compound linear output power. A LNA follows the filter on the Rx channel. Each module has its own power supply and monitoring-and-control function.

The reliability of a single ARM module is over 100,000 hours MTBF. When stacked into an array, as in most cells; the redundancy of the ARMs in the array provides an unmatched reliability of the order of $10^9$ hours MTBF.

The ARM architecture is modular (see FIG. 19.):

The antenna plate is removable, allowing for both V or H polarized antennas. With the panel removed the ARM becomes a filtered bidirectional amplifier. Beam directive fins are attachable to the unit for beam shaping.

The ARM is provided with either a vertical or a horizontal polarization on each transmit and receive antennas, and polarization can be changed by replacing the antenna form-fit module at the ARM front face. This is due to the unique design of the unit.

The Tx part and the RX part reside in separate sections. Each can be used as a stand alone Tx or Rx amplifier-filter. A receive unit (PolARM) can be constructed by using two Rx sections, and a dual polarized Rx antenna.

The modular, self contained, structure and functioning of ARM, its dimensions—that suit antenna arraying both in vertical columns and horizontal multibeam arrays, and the robustness of its tuning parameters, offer a unique flexibility for arraying and processing the base station radiation elements—by simple engineering and without resorting to further development for each new task. This feature is the key for optimizing the configuration of each cell, to many enhancement features and to emerging "smart antennas".

2. Arm Configurations 2.1. High gain antenna array
2.2. Dual polarized module
2.3. Transmission diversity delay module for CDMA IS95
2.4. Multibeam/intelligent antenna arrays
2.5. Multiplex trunking for multibeam/intelligent antenna arrays 2.6. CATV trunking module 2.7. Fiber optics trunking module 2.8. ARM repeaters 2.9. Indoors distribution with ARM 2.1. ARM Based High Gain Antenna Array (FIGS. 20–23)

Large cellular cells require both high ERP (Effective Radiated Power) and antenna gain. Arrays composed of ARM elements provide both effectively, at lower BTS cost, and higher flexibility and reliability. The ERP generated by a linear array composed of N active modules, each transmitting p Watts, relates to $N^2 p$ (the gain of a linear array relates to the number of elements N. This is multiplied by the number of amplifiers N). There is no additional loss, otherwise incorporated in the link budget due to the BFN (Beam Forming Network), cable and diplexer. Table 2.1 exemplifies the comparison. A 100 Watt MCLPA (Multi Carrier Linear Power Amplifier), feeding a 10 element antenna array through the associated high power !cable and diplexer, is compared to an array of 10 ARMs, each transmitting 2 W.

Figure 25:
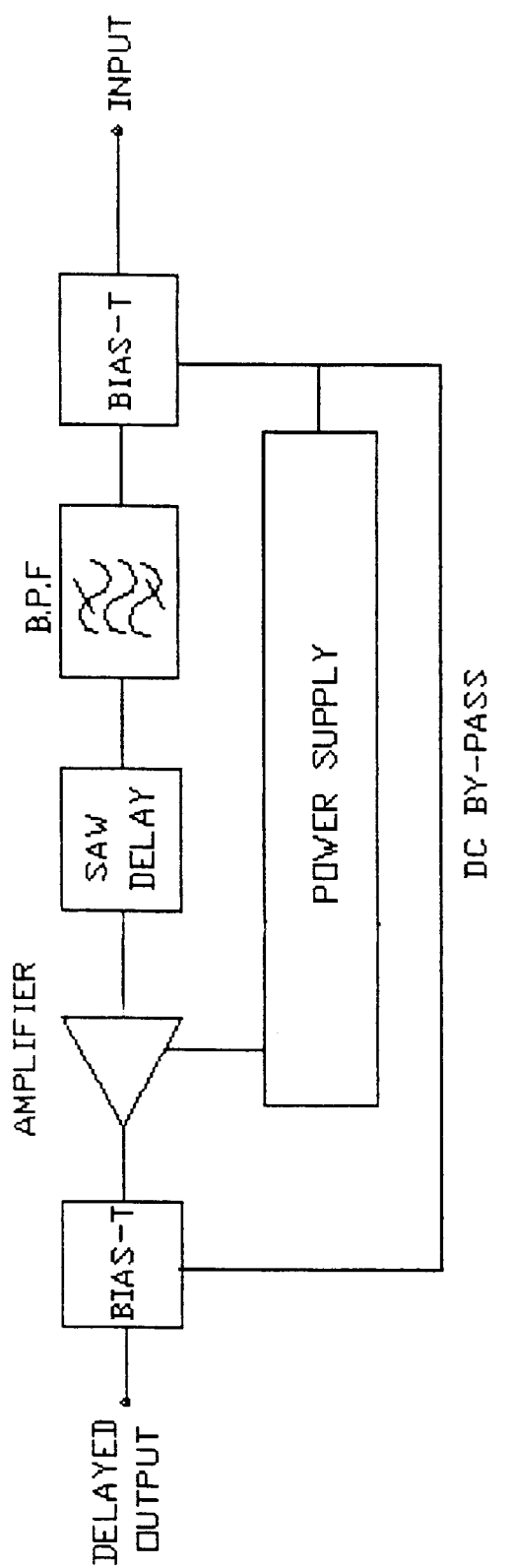
FIGS. 25–26 show a delay diversity module for CDMA IS 95.

2.3. Delay Diversity Module for CDMA IS 95 (FIGS. 25–26)

The Delay diversity Module enables the Tx CDMA delay diversity option where required. The modules main blocks are the SAW delay line and the amplifier which compensates for the delay line insertion loss. The dual bias-T by-passes this module for DC current and M&C signals wile biasing the internal power supply off the main Tx coaxial cable supply. The Delay diversity module is attached at the Tx Beam-Forming Networks input or at an individual ARM Tx input where applicable. FIG. 25 shows modules block diagram.

Figure 26:
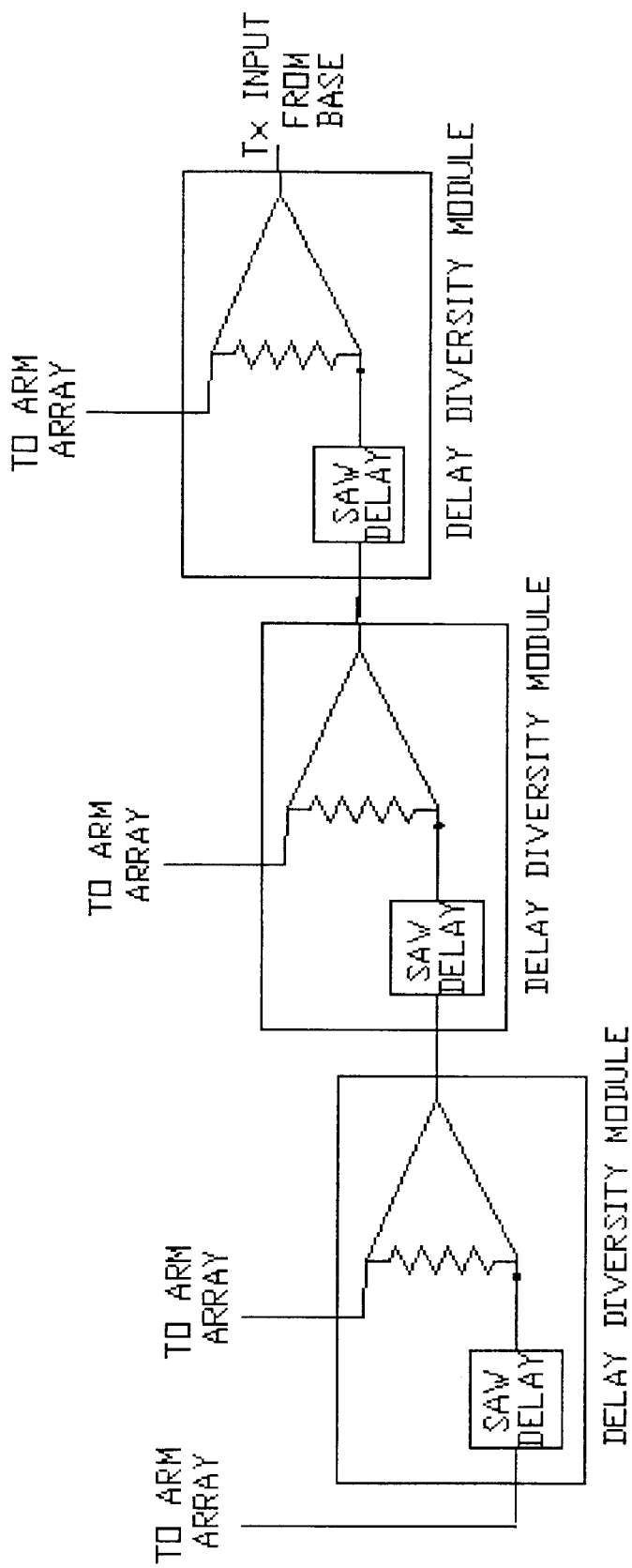

AN implementation of this module to a CDMA Delay Diversity Distributed Antenna is shown in FIG. 26.

Figure 27A:
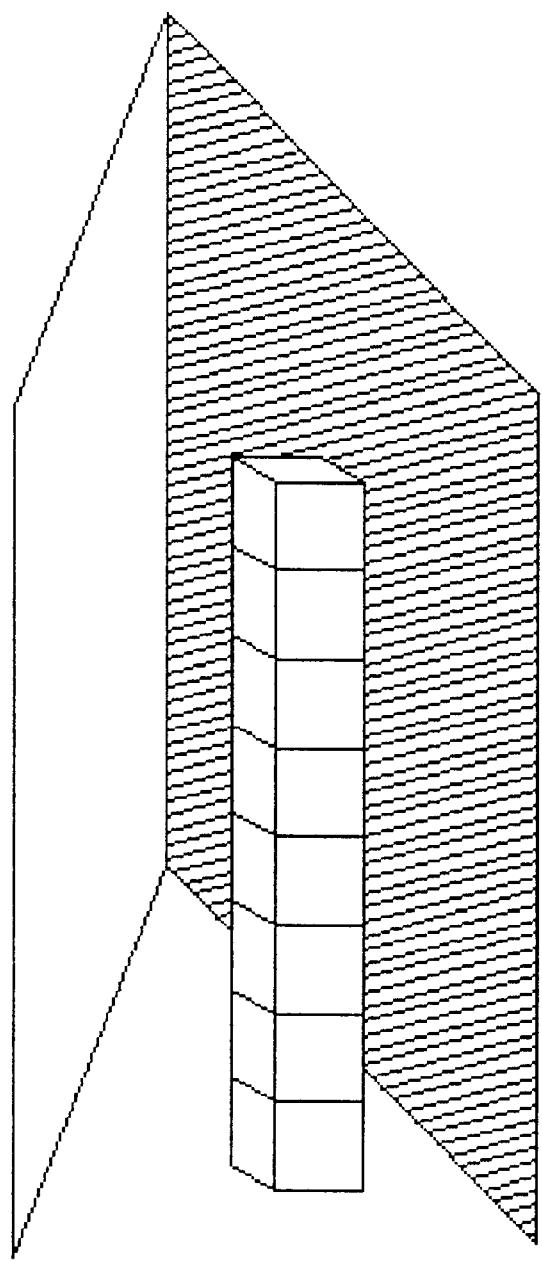
FIGS. 27A and 27B shown an ARM for multibeam/adaptive arrays.
Figure 27B:
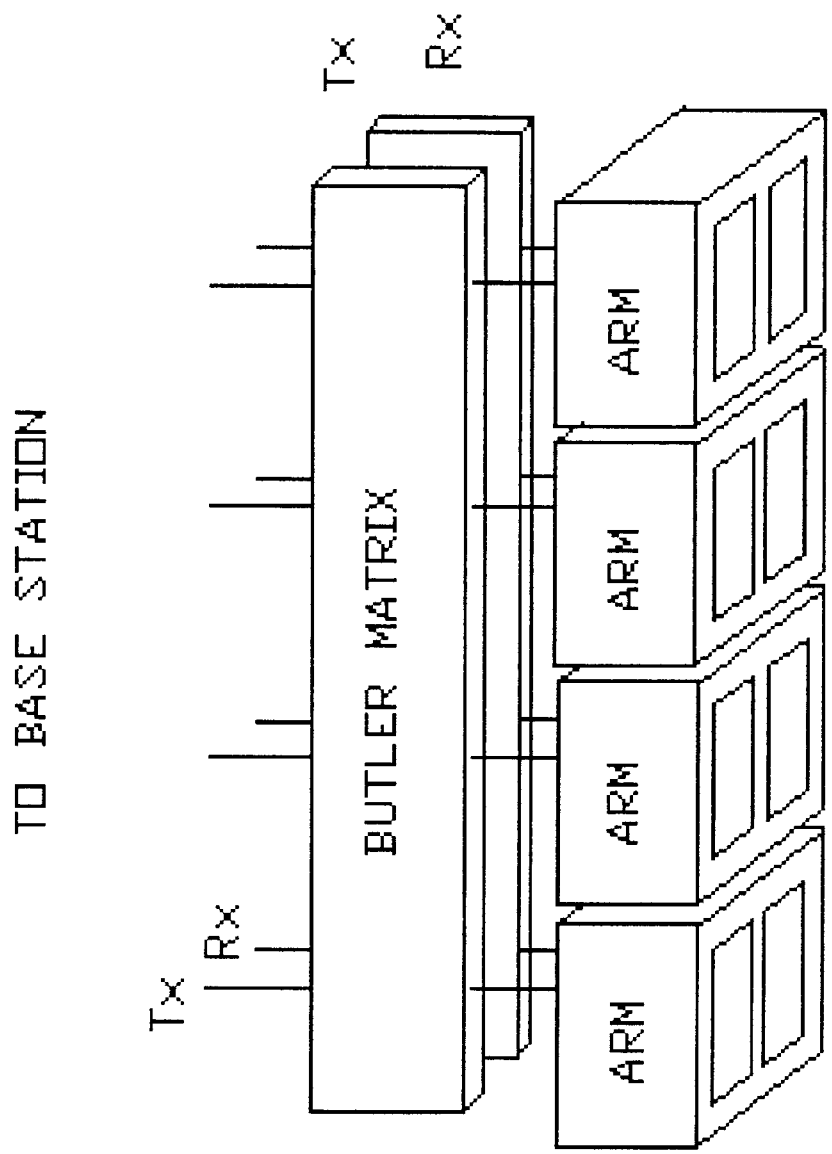

2.4. ARM for Multibeam/adaptive Arrays (FIGS. 27A and 27B)

The capacity, gain and performance of the cellular systems are expected to improve by the use of "Intelligent antennas" (or "smart antennas"). These are arrays of antennas that can form multiple narrow beams, or shape a

TABLE 2.1

Transmission path power budget

| Item | PA (dBw) | Filter | Diplexer | Cable + BFN | Array gain | ERP for N elements | ERP for 10 elements |
|---|---|---|---|---|---|---|---|
| 2$^{nd}$ gen. BTS | 20 | −.5 | −2 | −5 | 10 LogN | 12.5 + 10 LogN | 22.5 dBw |
| ARM array | 3+ 10 logN | −.5 | 0 | 0 | 10 LogN | 2.5 + 20 LogN | 22.5 dBw |

The reliability of the transmitter is improved considerably at the same time by the redundancy of the amplifiers. The same is true for the receive chain, where the noise figure is improved by 2 to 5 dB, which is translated to additional coverage of up to 70%.

Figure 20:
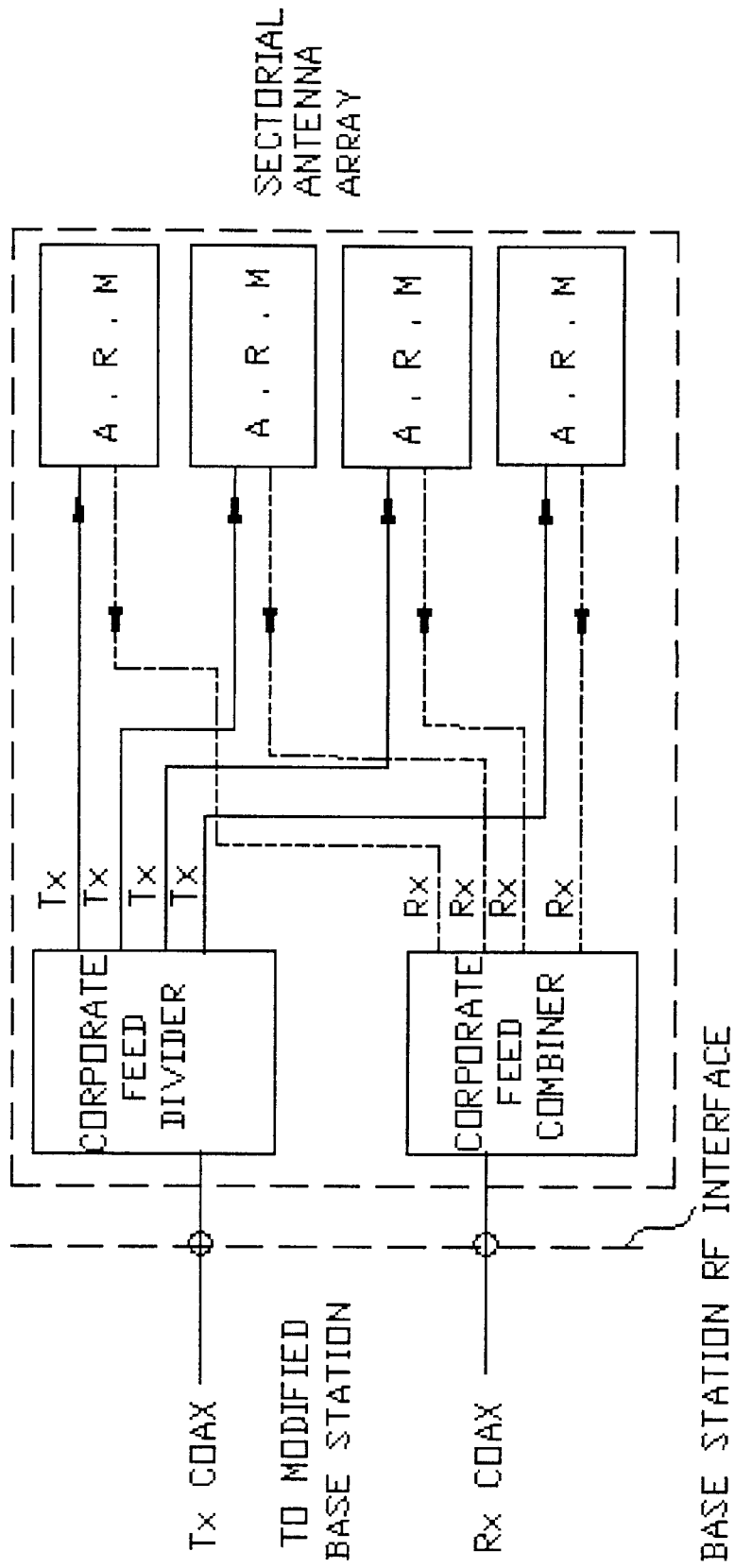
Figure 21A:
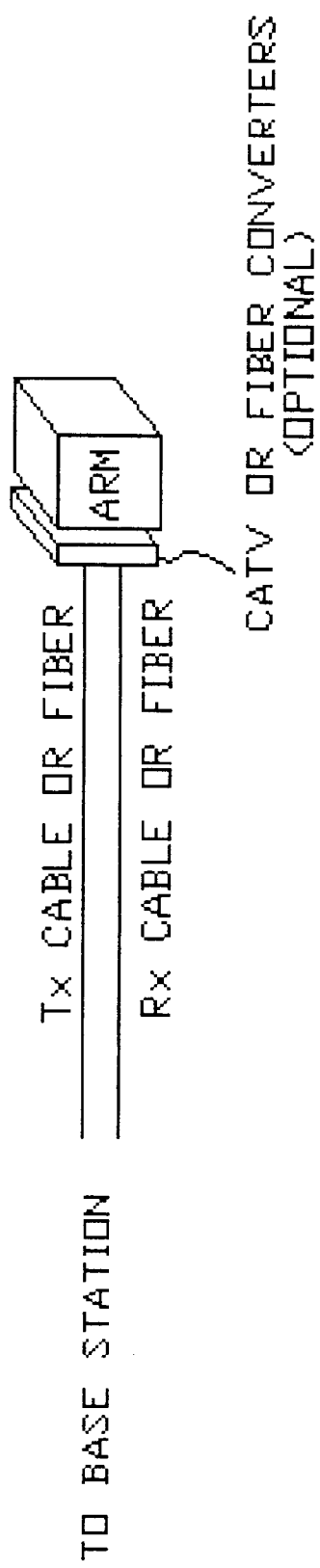
Figure 21B:
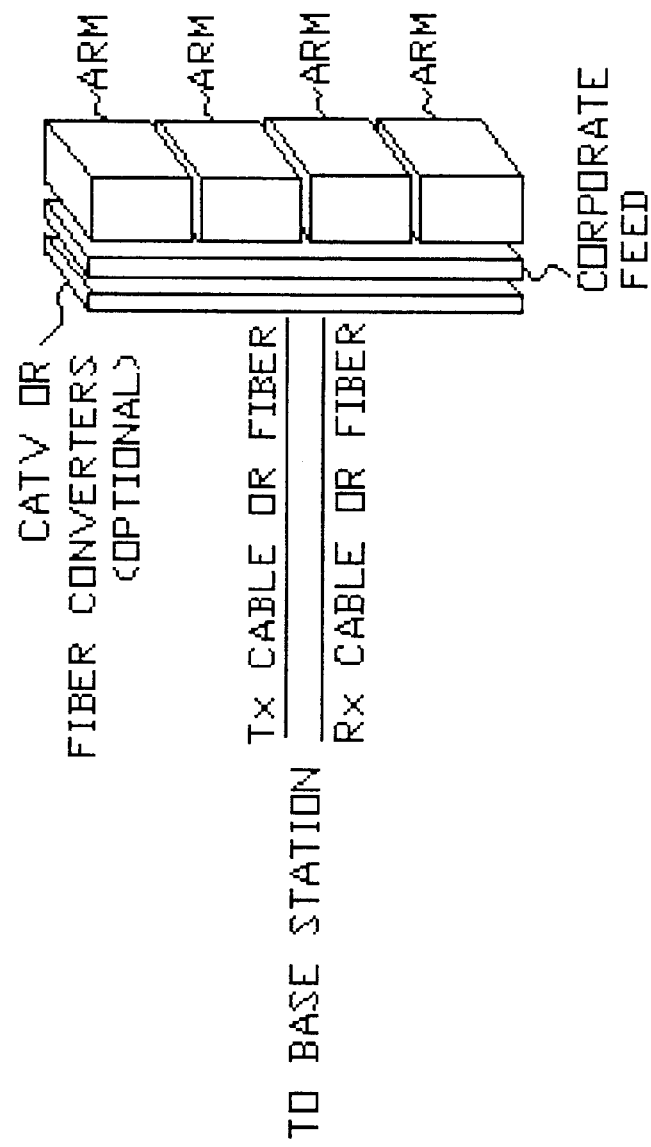
Figure 23:
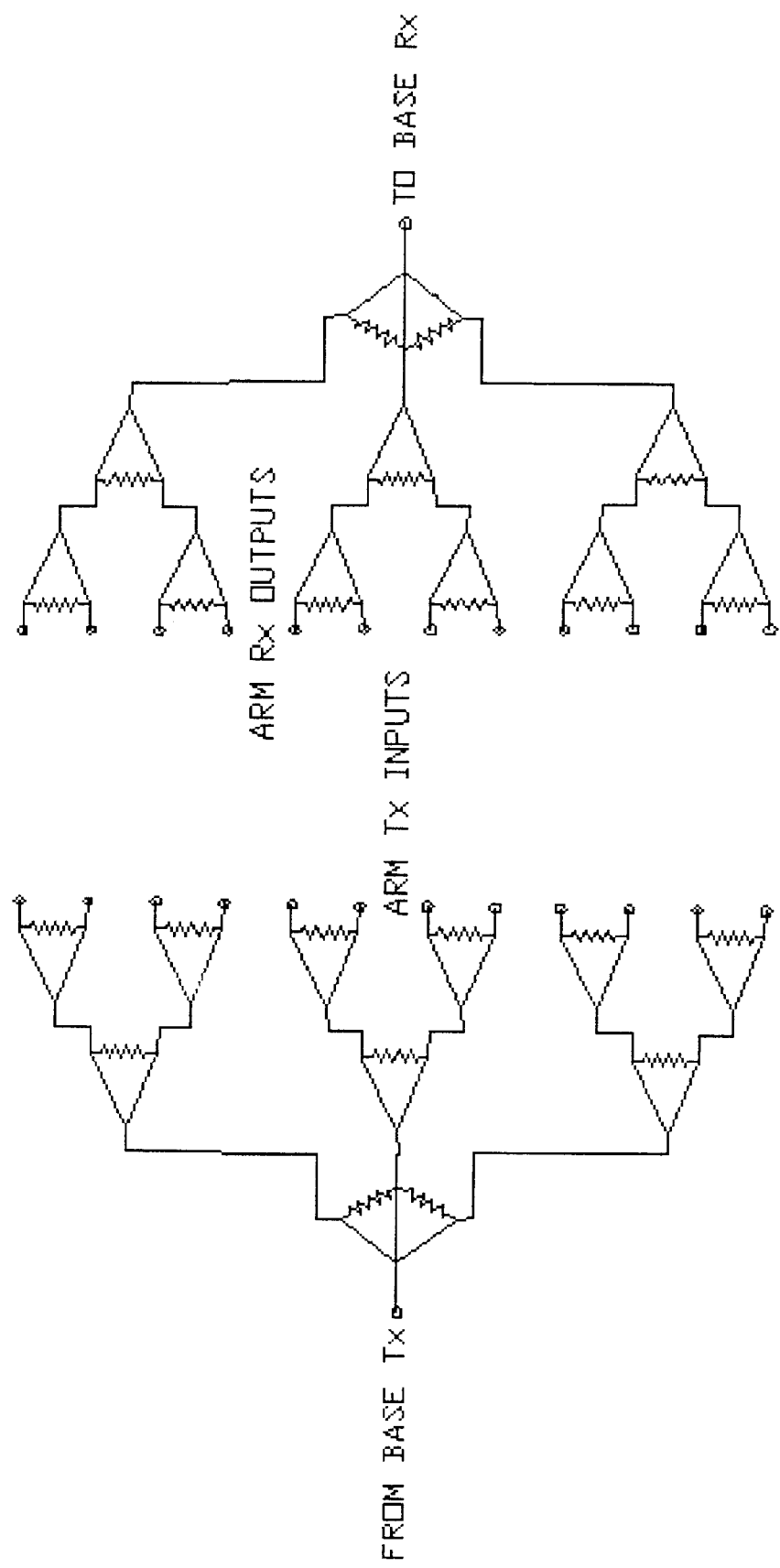

The ARM is configured to allow stacking in linear and in two dimensional arrays. Two corporate feeds, for Tx and for Rx, provide the respective beam forming. These may be custom designed for specific tilts or beam shaping. The array block diagram is shown in FIG. 20, and the modular configuration of the ARM stacks is shown in FIGS. 21A (Single module) and 21B (Active array antenna).

FIGS. 22A–22E illustrate examples of various ARM arrays, as follows:

FIG. 22A A 4 element column

FIG. 22B An 8 element column

FIG. 22C A 8×4 planar/multibeam array

FIG. 22D A circular array

FIG. 22E An horizontal array backed by a comer reflector 2.2. Dual Polarized ARM Modules (FIG. 24)

Figure 24A:
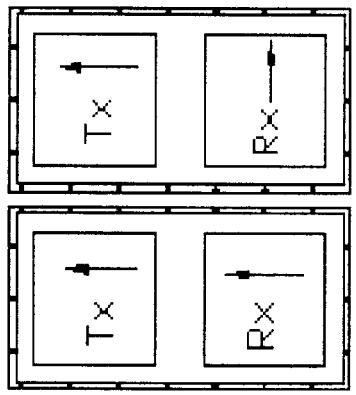
FIG. 24 shows a dual polarized ARM module.
Figure 24B:
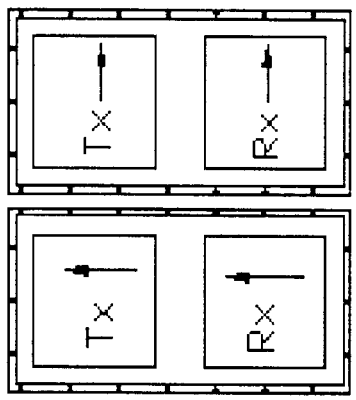
Figure 24C:
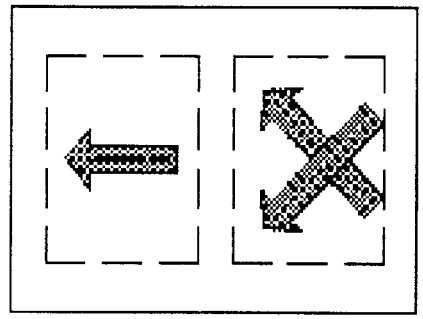

2.2.1. This dual polarized pair for transmit, and one for receive, allow the BS to use polarization diversity on receive, and polarization matching on transmit. The applications are described in part 2. The ARM can incorporate vertical or horizontal polarization on both the Tx and the Rx antennas. This is due to the unique design of the antennas and their feeds. This flexibility offers a variety of implementations. FIG. 24A describes the configuration of polarization diversity on Rx, while the Tx is vertically polarized and power-enhanced. A configuration for polarization diversity on Rx and on Tx, or polarization matching on Tx, is described in FIG. 24B.

The PolARM (FIG. 24C) is polarization-diversity ARM unit comprised of one Tx module and two Rx modules. This is the building block for a compact polarization ndiversity column array, and for multibeam arrays.

compound beam, that is adaptive to the teletraffic activity. The intelligence for creating the beams is derived from the signals received by the BTS or by special scanning receivers connected to the same antennas.

The same array has thus to receive, and to transmit, a multiplicity of signals for the MS within the cell coverage, and each antenna element shares all these signals. The beam forming network associated with this complex and incorporates phase shifters, and—in the case of adaptive arrays, amplitude control. Implementation of the BFN in the RF incurs a significant loss, that deteriorates the noise figure on reception, and the available power at the antenna for transmission.

The use of ARM arrays revolutionize this application: as the active elements are located at the antenna terminals, the BFN losses are no longer of importance. Moreover, the BFN can be implemented at the base-band level, in digital processing, and separate feed lines relayed to each element, or to each column (for horizontal-only scanning).

This approach of feeding each column with its own power amplifier is common to most of the intelligent antennas proposed. However, these amplifiers are placed at the BTS and each feeds a whole column—a similar situation to that discussed in Table 2.1. The ARM array offers a much higher reliability, due to their redundancy, in addition to all other advantages already mentioned.

Figure 28:
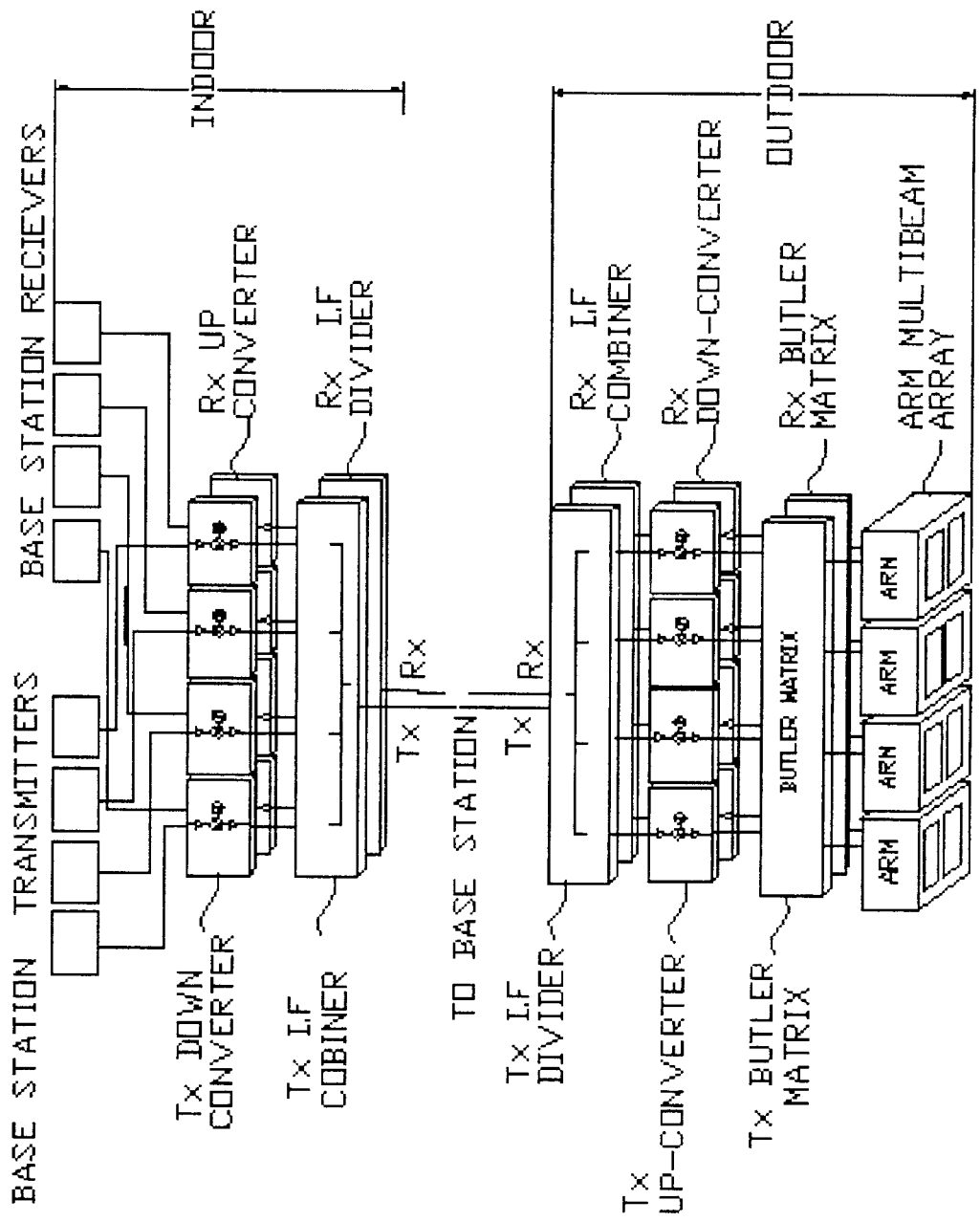
FIG. 28 illustrates multiplex trunking of a multibeam/intelligent antenna.

2.5. Multiplex Trunking of a Multibeam/intelligent Antenna (FIG. 28)

The number of cables laid on the tower, connecting the BTS and the antenna, is of major concern, and affects the weight load, the cost and the complexity. The cables associated with ARM arrays are much thinner and lighter than otherwise, as they do not carry high power and may suffer a considerable loss with no degradation to the system. Nevertheless, the reduction of the number of these cables may be desirable in certain cases, and this option is offered by the multiplex trunking, described in FIG. 28. This multiplexing, both on tx and Rx, is unique to ARM, where the trunking is not sensitive to losses.

Figure 29:
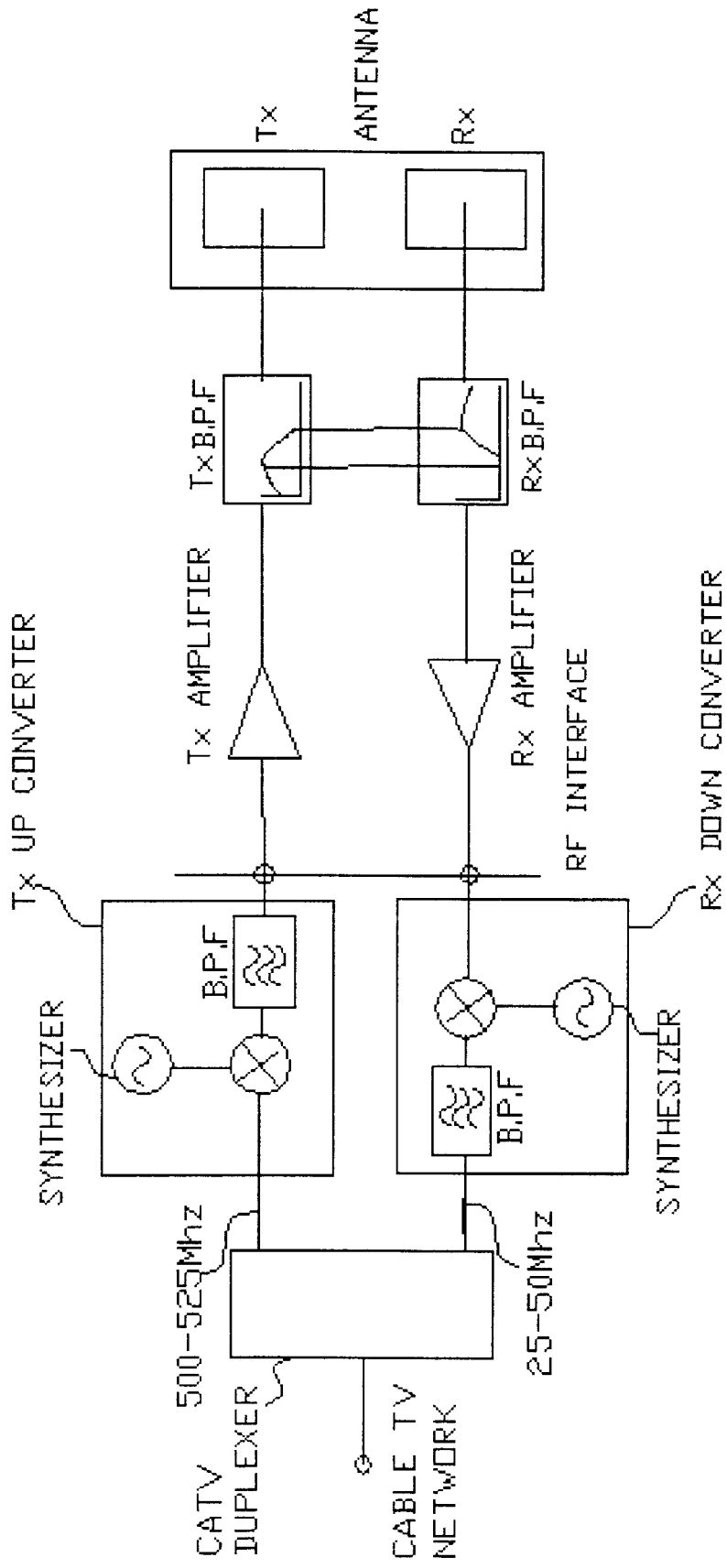
FIG. 29 shows an ARM for CATV infrastructure based remote microcells.

2.6. ARM for CATS Infrastructure Based Remote Microcells. (FIG. 29)

The basic ARM is combined with a CATV up/down converter module to establish the CATV Infrastructure based Remote Microcells. This special application ARM makes use of the existing CATV network as an RF trunk for remote RF Microcells. Such an architecture incorporates a great cost and capacity advantage. The block diagram of this ARM derivative is shown in FIG. 28.

The CATV up/down converter module input is a coaxial cable attached to the CATV network and carrying the CATV standard forward linkand reverse link. A bandwidth commensurate with the cellular system has to be allocated in the CATV for each forward and reverse links cellular ARM use.

The CATV diplexer within the converter separates the Tx and Rx signals. These are then converted to the appropriate cellular frequencies. Each of these converters is composed of a mixer, Phased locked Oscillator and a Band Pass Filter to eliminate image and L.O frequencies. The up/down converter module is attached directly to the ARM in this application.

The ARM for CATV application will have a physical configuration suited for the application.

Figure 30:
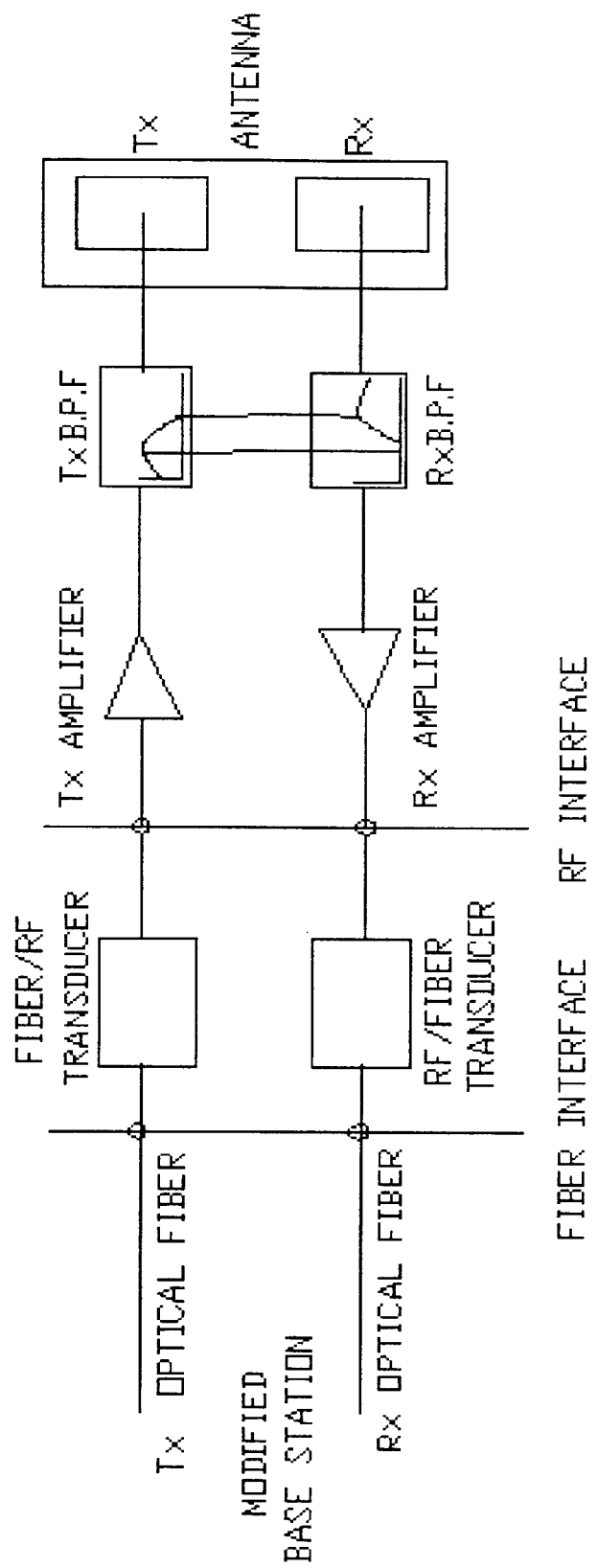
FIG. 30 shows an ARM remote microcell via fiber.

2.7. ARM Remote Microcell via FIBER (FIG. 30)

A FIBER/RF converter module is attached to the basic ARM for FIBER-OPTICS trunking for remote ARM Microcells. RF trunking via fiber is an efficient method for microcells layout, proposed for both in-buildings and outdoors Microcells distribution. The block diagram of this ARM derivative is shown in FIG. 30.

The Fiber/RF Transducer Module will contain both Tx Fiber/RF converter and Rx RF/Fiber converter within the same module. The input to this module will be either one fiber carrying both Tx and Rx signals, split and filtered within the module, or two separate fibers, depending on Fiber infrastructure. The Fiber/RF converter module is attached directly to the ARM.

The same transducer unit will be used for high gain applications where desired. The transducers interface with the input/output of the beam forming network in a fixed beam array, or with each column—for a multibeam/adaptive array.

2.8. ARM Repeaters (FIG. 31)

Figure 31:
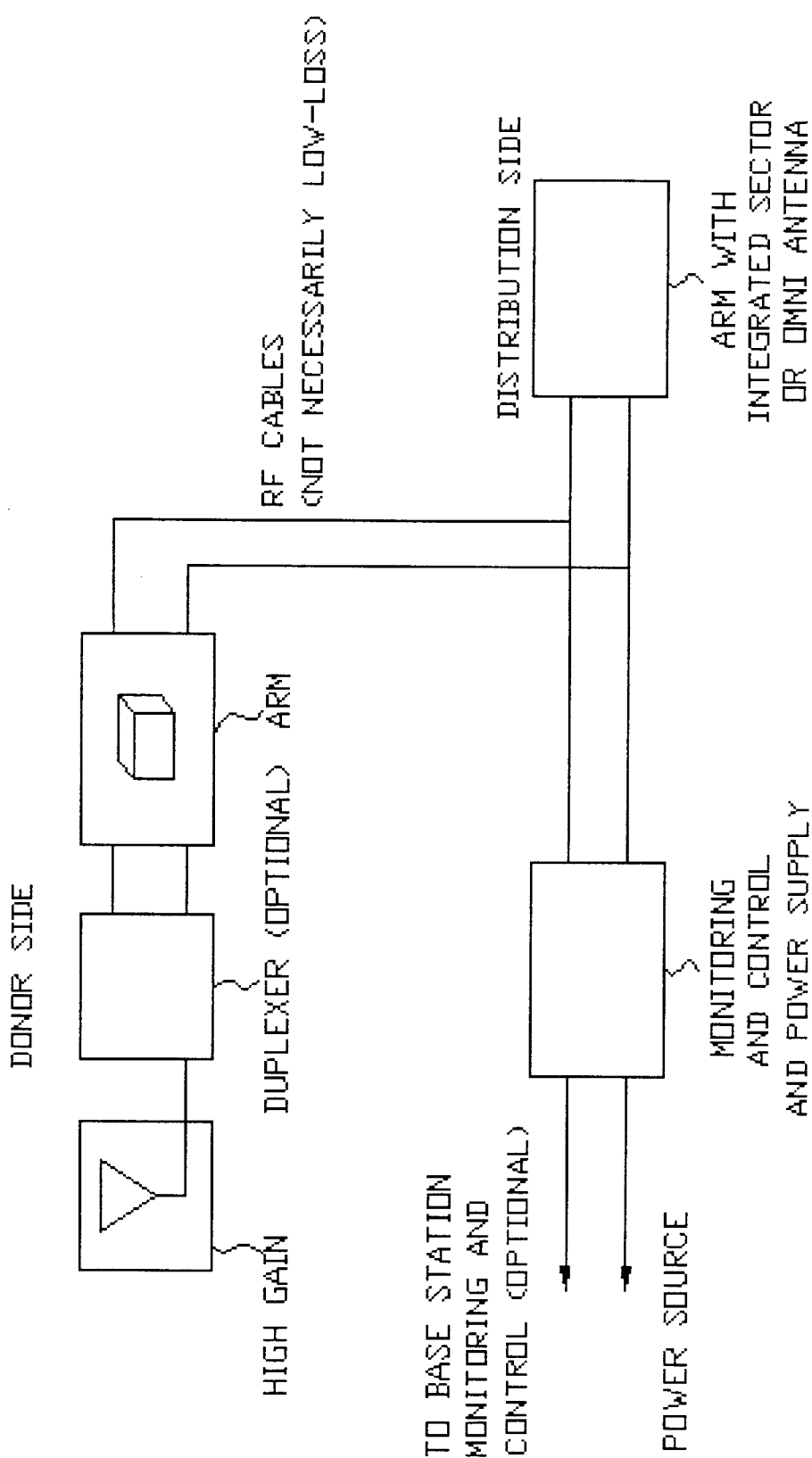
FIG. 31 shows an ARM repeater.

FIG. 31 illustrates a repeater comprised of ARM units.

2.9. Indoors Distribution with ARM (FIG. 32)

Figure 32:
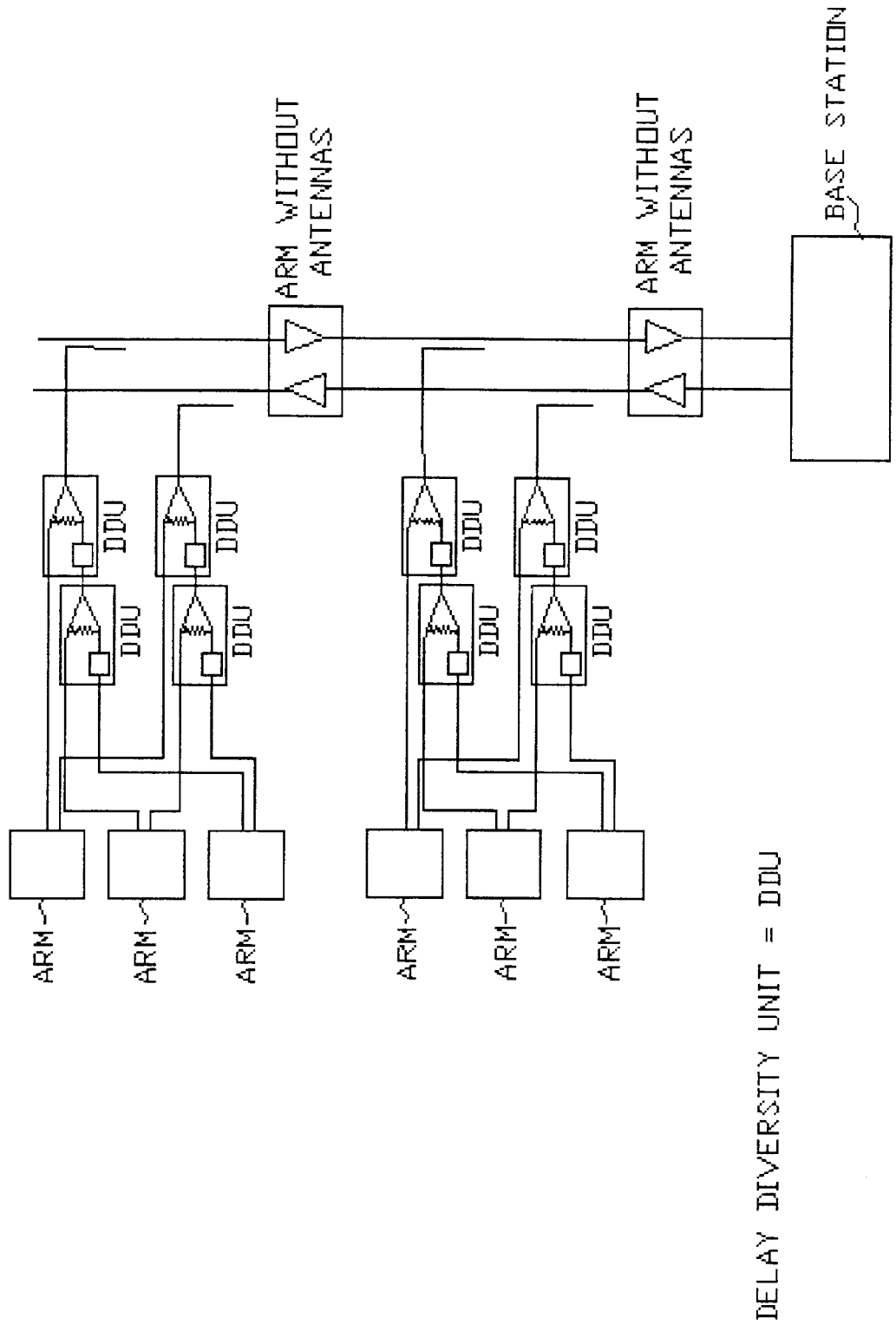
FIG. 32 illustrates indoor distribution with ARM.

A layout of a multi-floor distribution is exemplified in FIG. 32. The layout follows the building conduit in the central elevator shaft, or similar, and a distribution in every floor, or every other floor. The RF cable losses are compensated by ARM booster as necessary. Delay units may be inserted to benefit from the CDMA rake receiver, where applicable.

3. High Level Design and Specifications of Arm and Arm Sub-Modules (Us Pcs Version)

The Active Radiator Module (ARM) in the illustrated embodiment is composed of six basic building blocks and the integrating enclosure. Each one of these is described and separate specifications given. The basic building blocks are:

1. Tx amplifier
2. Rx amplifier
3. Tx/Rx Band Pass Filters
4. Tx/Rx antenna element
5. Power Supply
6. Monitor and Control (M&C) circuit
7. Integrating Enclosure 3.1. Integrated ARM Specifications The integrated ARM unit meets or exceeds the following specifications under full duplex operating scheme and any combination of environmental conditions as specified herein.

Electrical

Tx Channel

Frequency band . . . 1960–1990 MHz (PCS)

Output power (average) . . . 2 w for CDMA

Input power for max. output . . . −2 dbm

Input power for burn out . . . +10 dbm max.

Power control range . . . 20 db min

Power down at Shutdown . . . −50 db min

Output 1 db compression . . . 36–38 dbm $3^{rd}$ order intercept point . . . +46 dbm min.

CDMA ACP @+33 dbm out . . . −45 dbc @ 1.25 MHz B.W

In/out Gain . . . 35±0.5 db with compensation

Gain flatness . . . +/−0.1 db over any 1.25 MHz

Gain variation over temp . . . 0.5 db max. with compensation

Transmission phase variation vs. Freq. . . . +/−10 over any 1.25 MHz

Transmission phase window between units . . . +/−5°

AM/PM conversion . . . 0.25°/db Max up to 3 db below 1 dbcp

Noise figure . . . 8 db Max

Spurious (non-harmonic) . . . −60 dbc

Input VSWR . . . 1.5:1 @ 50 ohm system

Monitoring . . . see M&C specifications

Antenna element Polarization . . . Vertical or Horizontal

Beam width @ −3 db . . . AZ 120° (−4 dB) EI 80°

Side lobes . . . EI −T.B.D db

Front to Back ratio . . . TBD

Effective Radiated Power . . . +38 dbm

Rx Channel

Frequency range . . . 1–1910 MHz(PCS)

Noise figure . . . 3.5 db max.

In/out Gain . . . 30±0.5 db with compensation

Gain variation over temp . . . 0.5 db max. with compensation

Input power for burn out . . . +15 dbm max.

Power control range . . . 20 db min

Gain flatness . . . +/−0.1 db over any 1.25 MHz

Transmission phase variation vs. Freq. . . . +/−1° over any 1.25 MHz

Transmission phase window between units . . . +/−5°

Input 1 db compression point . . . 0 dbm min

Input $3^{rd}$ order Intercept Point . . . +10 dbm min

Spurious (non-harmonic) . . . 60 dbc

Class of operation . . . A

Output VSWR . . . 1.5:1 @ 50 ohm system

Monitoring and Control . . . see M&C specifications

Antenna element Polarization . . . Vertical or Horizontal

Beam width @ −3 db . . . AZ 120° (4 dB)
EI 80°

Side lobes . . . EI −T.B.D db
Front to Back ratio . . . TBD
DC Supply
DC supply . . . +18 v to +32 v dc @ 1.7 A to 0.95 A respectively per ARM
DC connection . . . multiplexed on Tx input cable
Noise and ripple induced to input . . . 10 mV peak max. up to 1 MHz
Lightning protection . . . 50 v turn on, 3 joules surge.
Thermal shut down . . . self contined within main DC/DC converter
Monitoring and Control
Monitoring and Control . . . per following table

| input/output | Function |
|---|---|
| Input | Tx gain compensation and control |
| Input | Tx amplifier shut down |
| Output | rewop tuptuo xT hcr |
| Output | Tx input power |
| Output | Tx amplifier current sense |
| Output | ARM temperature sensor output |
| Input | Rx gain compensation and control |
| Output | Rx amplifier current sense |

M&C communication with Base . . . FSK modulated channel
M&C connection . . . multiplexed on Rx cable
Mechanical
   Size . . . 140×70×160 mm max.
   weight . . . 1100 g max.
   Radome . . . fits outdoor use
   Connectors . . . Tx and Rx connectors—N Type, female other types are optional.
   Finish . . . White Polyurethane paint for outdoors.
   Integration options . . . Mechanical structure enables integration into column or planar arrays.
   Tilt option . . . mechanical tilt option up to −15°

Figure 33:
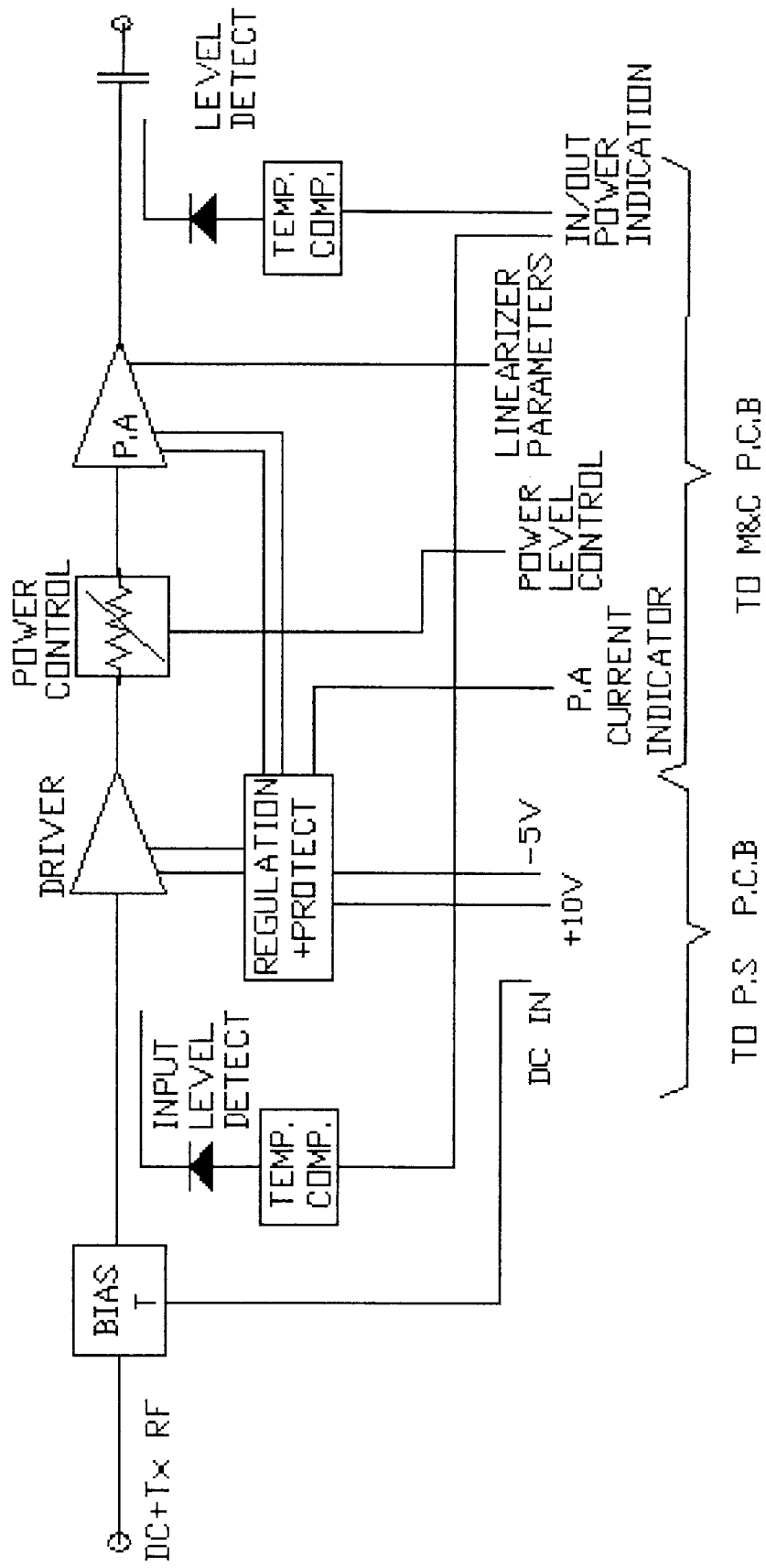
FIG. 33 shows a transmit amplifier.

3.2. Tx Amplifier (FIG. 33)

A class AB amplifier with proper backoff and proprietary linearization serves the requirements for CDMA systems, and most other systems. An enhanced linearization scehme will support all other multichannel-full bandwidth systems. Amplification is obtained in two stages: the first is a class A monolithic silicon, used also in PCS handsets. The second is a hybrid packaged power amplifier. The amplifier with its matching and biasing networks is assembled by SMT technology on a RF printed board within the Tx amplifier enclosure.

Tx Amplifier Specifications
   Electrical
     Frequency band . . . 1930–1990 MHz (PCS)
     Output power (average) . . . 2 w for CDMA
     Input power for max. output . . . −2 dbm
     Input power for bum out . . . +12 dbm max.
     Power control range . . . 20 db min
     Power down at Shutdown . . . −50 db min
     1 db compression . . . 36–38 dbm
     $3^{rd}$ order intercept point . . . +46 dbm min.
     Two tones I.M products . . . −30 dbc for 1 w per tone
        −44 dbc for 0.2 w per tone
     Gain . . . 35 db to 38 db, @ small signal without external compensation
     Gain flatness . . . +/−0.1 db over any 1.25 MHz
     Gain variation over temp . . . 3 db max. without external compensation
     Transmission phase variativs. Freq. . . . +/−10° over any 1.25 MHz
     Transmission phase window between units . . . +/−3°
     AM/PM conversion . . . 0.25°/db Max up to 3 db below 1 dbcp
     Noise figure . . . 8 db Max
     Spurious (non-harmonic) . . . −60 dbc
     Input VSWR . . . 1.5:1 @ 50 ohm system
     output VSWR . . . 1.3:1 @ 50 ohm system
     DC supply voltage . . . +8 volts and −5 volts DC with missing negative voltage protection
     DC supply current . . . 4 Amp @8 v
     Monitoring and Control . . . per following table

| input/output | Function | Voltage [V] | Current [mA] |
|---|---|---|---|
| Input | Tx gain compensation and control | t.b.d | |
| Input | Tx amplifier shut down | t.b.d | |
| Output | Tx output power | t.b.d | |
| Output | Tx input power | t.b.d | |
| Output | Tx amplifier current sense | t.b.d | |
| Output | ARM temperature sensor output | t.b.d | |

Figure 34:
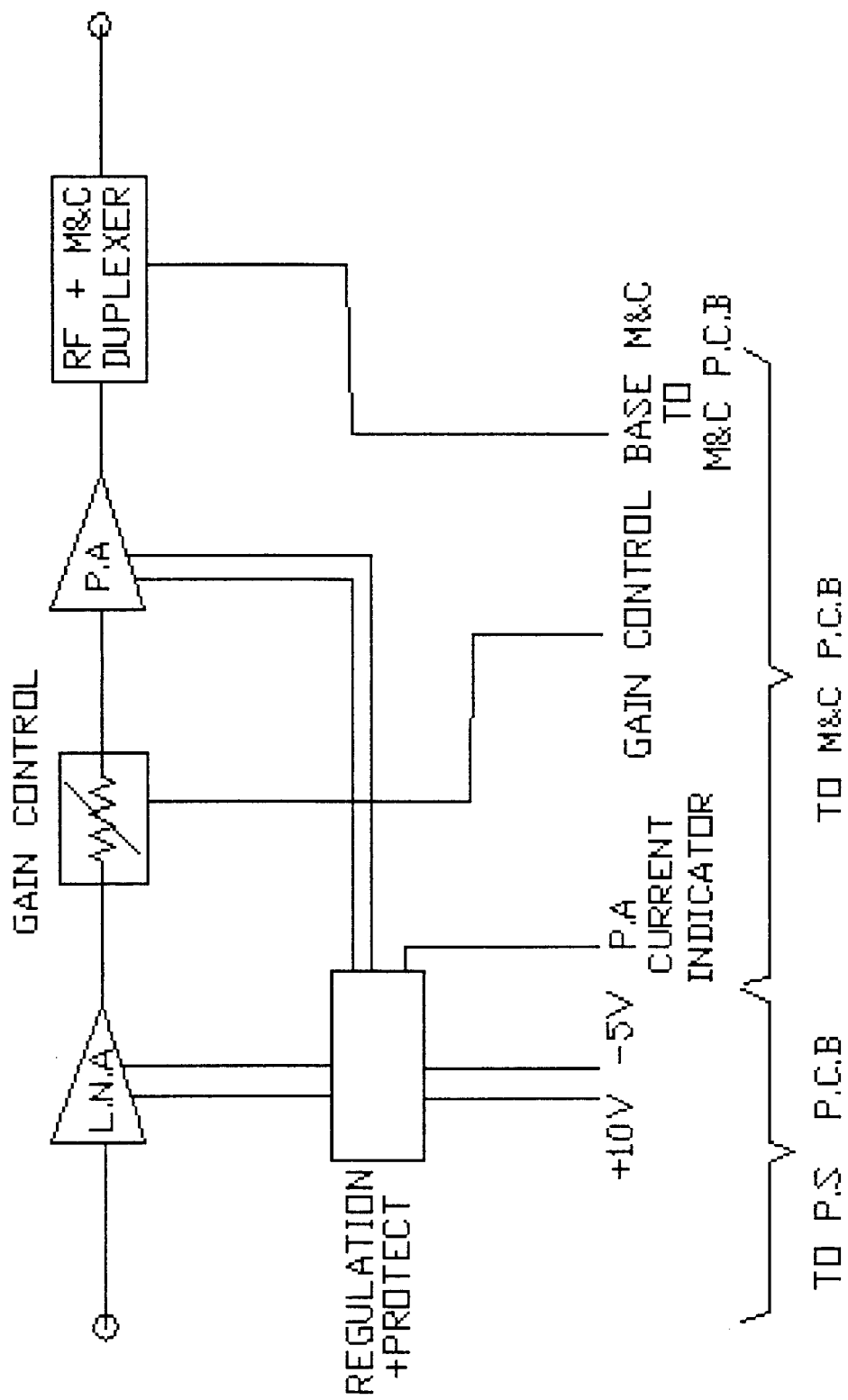
FIG. 34 shows a receive amplifier.

Mechanical
   size . . . t.b.d
   Structure . . . S.M.T P.C.B with trough holes for attachment 3.3. Rx Amplifier (FIG. 34)

The Rx amplifier within the ARM is connected to the Rx antenna output via the filter, and avoids the additional losses of the diplexer, beam forming network, and cable. The redundancy of LNAs in the ARM array guarantees an extremely high reliability. The Rx amplifier has enough gain low enough noise figure, and high enough compression and intercept points to eliminate inter-channel interference and non-linear multi-channel distortion, and degradation in sensitivity.

The communication in between the ARM and the base station is established by the M&C signal modulated on the Rx coaxial cable. The connection to the Rx cable is done by the RF/M&C Diplexer at the output of the Rx amplifier, as shown in FIG. 34. The amplifier meets the following draft specifications:

Rx Amplifier Specifications
   Electrical
     Frequency range . . . 1850–1910 Mhz (PCS)
     Noise figure . . . 2.5 db max.
     Gain . . . 30 db min. without external compensation
     Gain flatness . . . +/−0.1 db over any 1.25 MHz
     Gain variation over temp . . . 3 db max. without external compensation
     Input power bum out . . . +15 dbm max.
     Power control range . . . 20 db min
     Input 1 db compression point . . . 0 dbm min
     Input $3^{rd}$ order Intercept Point . . . +10 dbm min
     Transmission phase variation vs. Freq. . . . +/−1° over any 1.25 MHz Transmission phase window between units . . . +/−3°
Spurious (non-harmonic) . . . −60 dbc
Input/Output VSWR . . . 1.5:1 @ 50 ohm system
Class of operation . . . A
Voltage supply . . . +8 v regulated
Current requirement . . . 150 mA
Technology . . . SMT of MMIC
Monitoring and Control . . . per following table

| input/output | Function | Voltage [V] | Current [mA] |
|---|---|---|---|
| Input | Rx gain compensation and control | t.b.d | |
| !rqrOutput | Rx amplifier current sense | t.b.d | |

Figure 35:
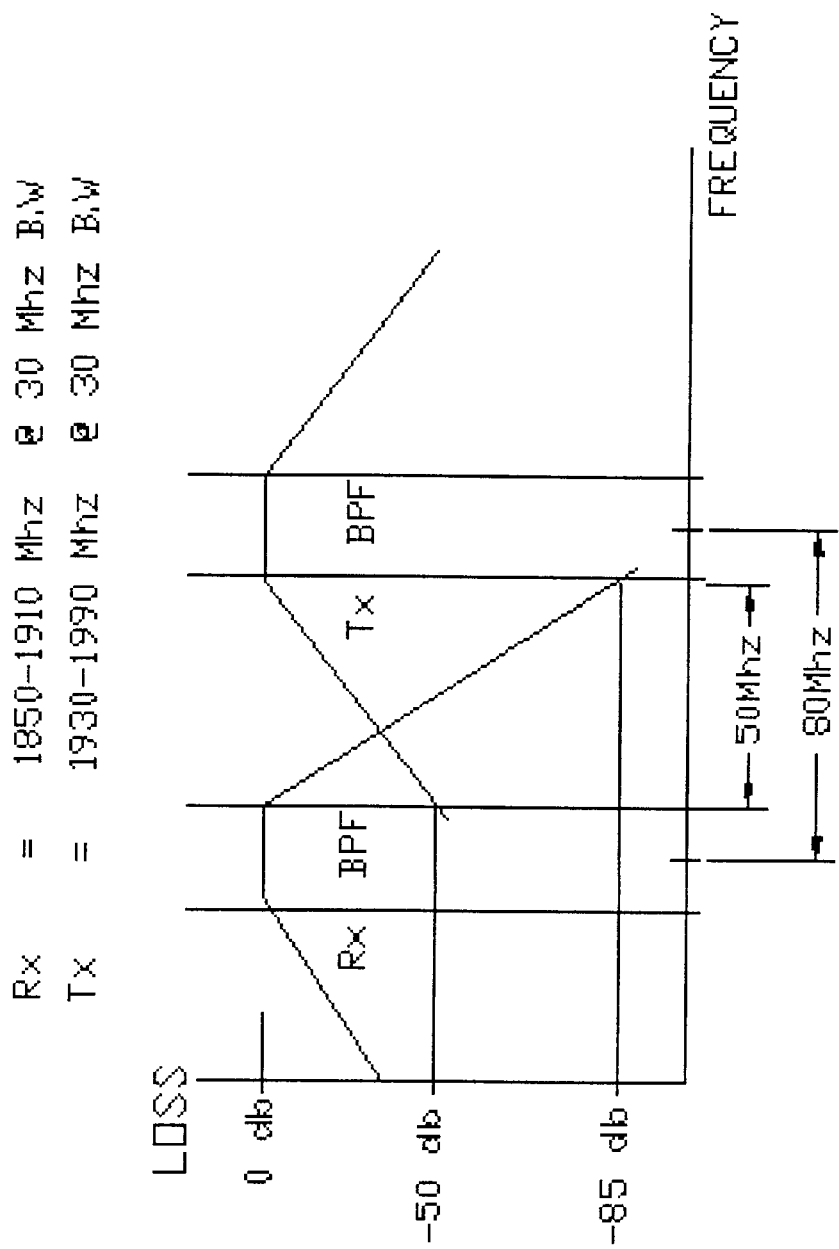
FIGS. 35 and 36 show transmit/reciever band pass filters.
Figure 36:
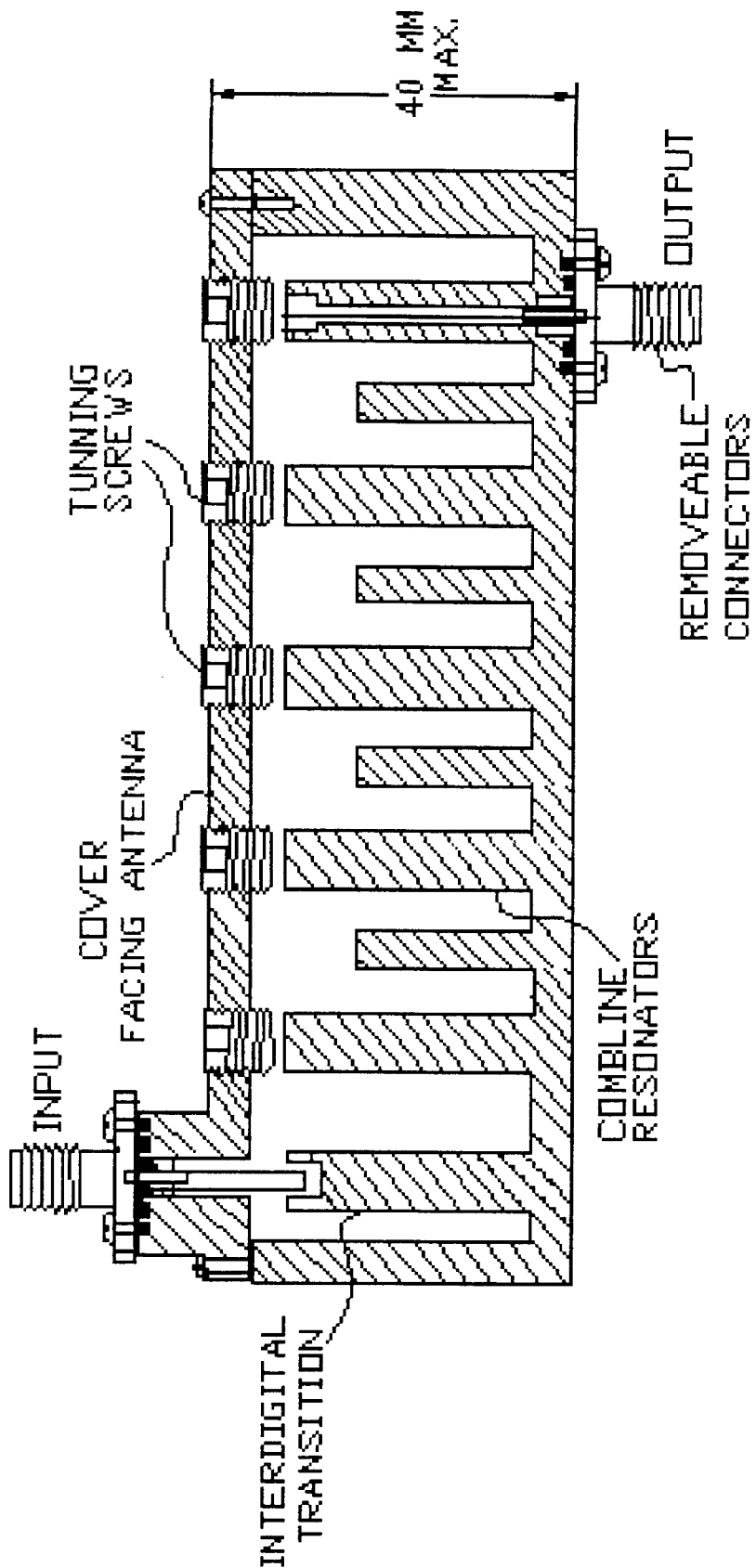

Mechanical
Size . . . t.b.d
Structure . . . S.M.T P.C.B with trough holes for attachment 3.4. Tx/Rx Band Pass Filters (FIGS. 35 and 36)

Tx and Rx filters of the ARM establish together with Tx/Rx antennas separation, a diplexer which isolates Tx and Rx signals from each other. Specifications for TX and Rx filters are directly driven from performance requirements of ARM.

3.4.1. Tx Filter

The Tx filter has two roles within the ARM. The first is to reduce the Tx wide band noise in Rx band. The second is to reduce spurious signals which might interfere with Rx channel of same cell or other base terminals, including other operators' MS. The more demanding requirement is the first one and it dictates the Tx filter performance and thus Tx filter structure.

In order for the Tx noise that leaks into the Rx channel input to be lower or equal to the Rx noise floor, isolation of 60 db (−74+135) is required. 20 db of the required isolation is attributed by Tx/Rx antenna isolation and the other 40 db plus 10 db of safety margin, are given by Rx band rejection of the Tx filter.

3.4.2 Rx Filter

The Rx filter has two roles within the ARM. The first is to reduce the Tx signal to a level which does not interfere with the received signal causing Intermodulations, and thus Desensitization of the receiver channel. The other purpose of the Rx filter is to reduce interfering signals from other Base Stations and mobile terminals. The more demanding requirement is the first one and it dictates the RX filter performance and thus filter's structure.

In order for the Tx leakage not to interfere with received signal, it should be kept at a much lower level than Rx channel compression for systems with no AGC or when AGC is at minimum. Assuming input 1 db compression of −60 dbm at ARM input, the Tx leakage should be below −70 dbm. For Tx average output power of +33 dbm and Tx/Rx antenna isolation of 20 db, the Rx rejection of Tx filter should be 75 db. A design goal for Rx filter rejection is 85 db to assure 10 db of margin. A dielectric filter at Rx amplifier input will be implemented if the Rx filter rejection is insufficient. The same reasoning holds for CDMA systems where numbers differ but ultimate result hold.

3.4.3. ARM Filters Specifications

Electrical
Tx Filter
Pass band . . . 1960–1990 MHz (PCS)
Rejection . . . −50 db @50 MHz below pass band, −40 db @ 50 MHz above pass band, −60 db from 80 MHz above band to 4 GHz
Insertion loss . . . −1.5 db max. @ pass band (0.5 db goal)
Ripple within band . . . 0.2 db max. over any 1.25 MHz band 0.6 db max over 30 MHz
Group delay variation . . . 2 nsec max. over any 1.25 MHz
Transmission phase window between units . . . +/−5°
Return loss in/out . . . −17 db min
Handling power . . . 10 w max
Rx Filter
Pass band . . . 1880–1910 MHz (PCS)
Rejection . . . −75 db @50 MHz above pass band (−85 db design goal) −40 db @ 50 MHz below pass band −60 db from 80 MHz above band to 4 GHz
Insertion loss . . . −1.5 db max. @ pass band (0.5 db goal)
Ripple within band . . . 0.2 db max. over any 1.25 MHz band 0.6 db max over 30 MHz
Group delay variation . . . 2 nsec max. over any 1.25 MHz
Transmission phase window between units . . . +/−5°
Return loss in/out . . . −17 db min
Handling power . . . 10 w max
Mechanical Structure Each of the Tx and Rx filters is a 6 coaxial resonators elliptic filter in combline structure. The housing is made of aluminum with tuning elements on the cover of filter's housing as seen on FIG. 36.

3.5. ARM Antenna Elements (FIG. 37)

Both Tx and Rx antenna elements are printed elemental radiators. The Tx and Rx elements have a multilayer configuration and covered by a radome of Epoxy-Fiberglass. Isolation of 18 dB between adjacent elements is achieved by the special design. The size of the ARM front face— 0.43–0.45λ (H) and 0.9–0.93λ (V) (Tx frequencies), is designed to allow full beam scanning and multibeam arraying of ARM elements in the horizontal plane, and formation of a high gain array in the vertical plane, as suitable for present and future applications in cellular systems.

Figure 37:
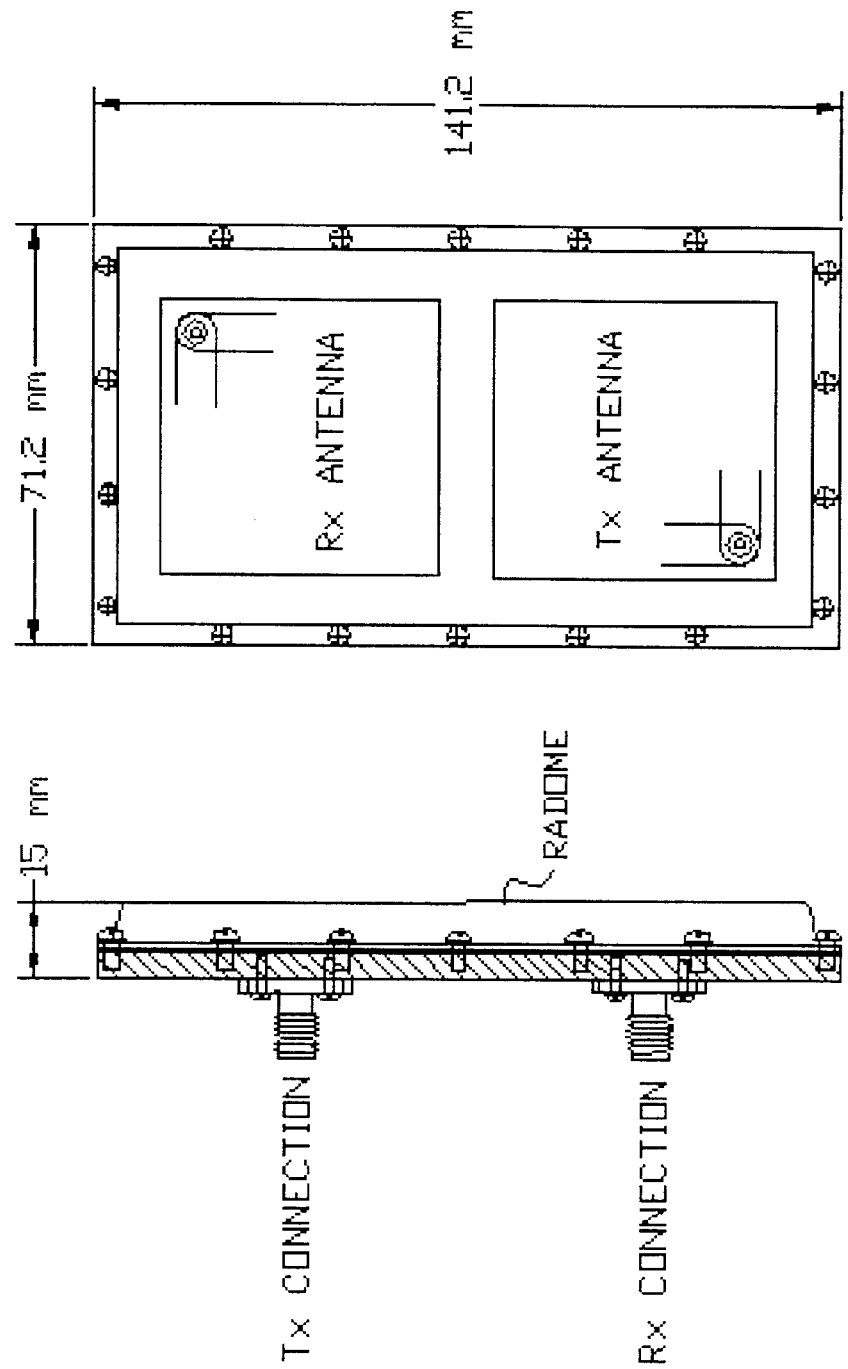
FIG. 37 shows ARM antenna elements.

The Antenna outline drawing is shown on FIG. 37. The anis environmentally protected by a Radome and is moisture sealed except for the interconnections.

3.5.1. ARM Antenna Specifications
Electrical
Frequency band . . . Tx: 1960–1990 MHz for PCS . . . Rx: 1880–1910 MHz for PCs
Tx/Rx elements isolation . . . 20 db (15 db min.) for any Tx/Rx polarization combination
Polarization . . . Vertical or Horizontal in any combination
Gain . . . 5 dbi min. 6 dbi (target)
Beam width . . . AZ .120. @ −4 db
EI 80° max.
Side lobes . . . AZ: none
EI: −15 db
Front to Back ratio . . . @ 90°–120° & 240°–270°<−10 db @ 120°–240°<−15 db
Efficiency . . . 90%
VSWR.(@ 50Ω system) . . . 1.6:1 Max
Mechanical
Size . . . 140×70×15 mm
Connectors . . . Coaxial connections
Radome . . . fits outdoor use
Finish . . . White Polyurethane paint for outdoors.

3.6. Power Supply

The ARM power supply has to supply all dc power requirement of the Tx and Rx amplifiers and include all protection means needed for a tower top mounted device, including Thermal over load protection and lightning secondary strike protection. Since ARM power supply is mounted on top of the antenna tower and the length of the cable connecting the base station and the ARM is not fixed, a DC-DC converter is needed within this power supply. DC supply is done through the Tx coaxial cable which explains the BIAS-T is implemented within the Tx amplifier. TDC supply source is located within the base station. This way of DC supply is convenient for the modular approach where each module (CATV converter or Fiber/R!F converter) has its independent power supply, all consuming DC power from same source through connecting coaxial cables.

ARM Power Supply Specifications
  Electrical
    Input voltage . . . 18–32 v dc
    output voltages . . . +8 v dc @ 4 Amp (or other voltage with same power) . . . 5 v dc @ 0.1 Amp
    Regulation . . . ±2%
    Outputs Noise and ripple . . . 10 mV peak max. up to 1 MHz
    Noise and ripple induced to input . . . 10 mV peak max. up to 1 MHz
    Lightning protection . . . 50 v turn on, 3 joules surge.
    Thermal shut down . . . self contained with in main DC/DC converter
  Mechanical
    Size . . . T.B.D
    Structure . . . S.M.T P.C.B with trough holes for attachment
    Input connection . . . Through an internal BIAS-T

3.7 Monitoring and Control Circuit

3.7.1 General

The Monitoring and Control (M&C) circuit controls the proper operation of the ARM circuits and enables a real-time communication both ways between each individual ARM unit and the Base Station central computer. M&C circuit is realized as a separate p.c.b, integrated into the ARM assembly as part of the Rx subassembly. The interconnection in between Rx and Tx circuits is done by analog wiring. The dual directional communication with the base station is established through a FSK modulated communication channel multiplexed on the Rx coaxial cable connecting the individual ARM (or Rx Beam Forming Network combiner of an array), to the base station.

The M&C circuit tasks can be divided into two groups: Internal ARM functions and external ARM/Base station monitoring and control functions.

a. ARM internal Functions:
  Tx amplifier gain compensation over temperature.
  Rx amplifier gain compensation over temperature.
  Thermal over load protection
b. ARM/Base Station External Functions:
  Individual ARM identification code.
  Tx amplifier gain control
  Rx amplifier gain control
  ARM temperature sensing
  Rx amplifier current sensing
  Tx amplifier current sensing
  Tx amplifier shut down

3.7.2. M&C Circuit Specification

Electrical
  t.b.d
  Lightning protection . . . 50 v turn on, 3 joules surge.
Mechanical
  Size . . . T.B.D
  Structure . . . S.M.T P.C.B with trough holes for attachment
  Input connection . . . Multiplexed on Rx cable through an internal BIAS-T at Rx output.

3.8 ARM Integrating Enclosure

The integrating enclosure of ARM is based on the Tx/Rx filters block, which takes most of the unit volume. Overall heat dissipated within the ARM is about 30 w, most of it on the Tx block. This is dissipated by the die-cast Aluminum structure. Expected temperature rise above ambient temperature is below 10° C.

The antenna and radome are attached at the front of the ARM, while the Tx and Rx connectors are located on the back side. The mechanical housing has the proper arrangement for the mechanical interconnection of ARM units to form vertical and/or horizontal arrays. A single ARM is easily replaceable on the mast in the array configuration.

Figure 38:
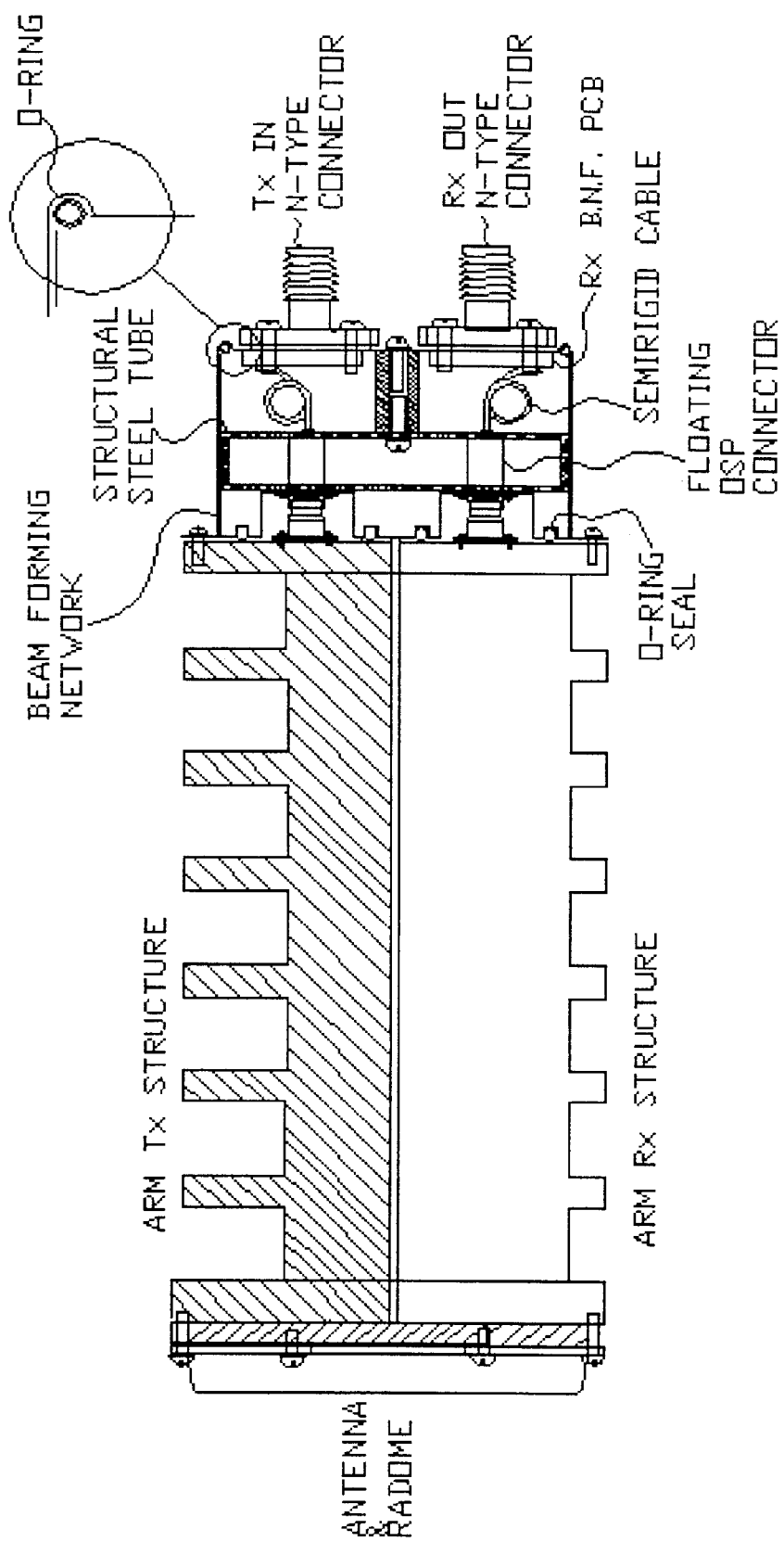
FIGS. 38 and 39 show a beam forming network.
Figure 39:
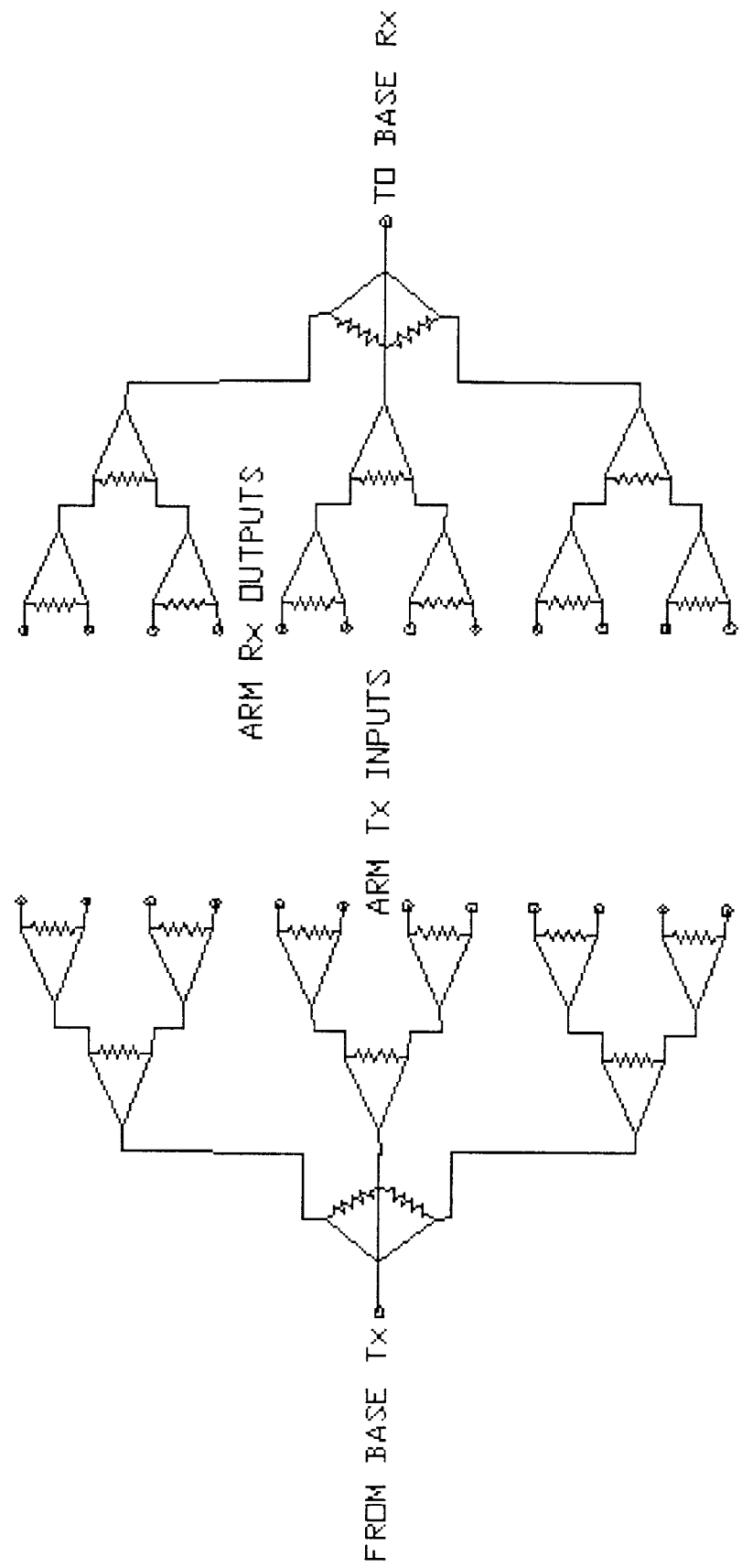

3.9 Beam Forming Network (FIGS. 38 and 39)

Beam Forming Network Specifications

The following specifications are for 4 elements vertical arrays. Larger arrays are to be implemented in the same basic structure:

Electrical
  Frequency band . . . Tx: 1960–1990 MHz for PCS . . . Rx: 1880–1910 MHz for PCs
  Tx/Rx networks isolation . . . 60 db min.
  Input to output insertion loss . . . 2 db max above division (summation) loss.
  VSWR at input/output.(50Ω system) . . . 1.5:1 Max (1.3 goal)
  Isolation in between ports . . . 20 db min.
  Amplitude distribution . . . equal on all outputs (or inputs)
  Amplitude distribution error . . . 0.75 db max. between outputs (or inputs)
  Phase distribution . . . equal on all outputs (or inputs)
  Phase distribution error . . . 3° max. in between outputs (or inputs)
  Permitted input power . . . +23 dbm
  DC connection . . . there should be a DC connection in between all outputs to the input of each B.F.N.
  DC current capability . . . up to 2 amp. at each Tx output
Mechanical
  Size . . . 560×70×50 mm
  connectors . . . to/from base: N Type, female to/from ARM: Floating OSP connectors
  Finish . . . White Polyurethane paint for outdoors.
  Sealing . . . The B.F.N is environmentally sealed

3.10 Weight of ARM Module

Each ARM unit weight is less then 1100 gr.
Each High Gain ARM array of 4 units weight is less then 6 kgr.
Each High Gain ARM array of 12 units weight is less then 17 kgr.

3.11. Environmental Requirements

All ARM family modules and assembled structures shall exhibit in-spec. electrical and mechanical performance under all combinations of environmental conditions as listed hereinafter:

Environmental

Operating Temperature . . . −20 to +50° C.

Non-operating temperature . . . −40 to +60° C.

Operating altitude . . . 8000 feet

Non-operating altitude . . . 35,000 feet

Humidity . . . up to 100% with condensation

Vibration . . . 5–50 Hz, sine, 0.1" displacement p.t.p 50–200 Hz, sine, 0.5 G

Wind load . . . 200 km/h

Shock (non-operating) . . . 30 G, half sine pulse, 11 msec

Salt atmosphere (non-operating) . . . 48 hours, 5% salt solution per MIL-STD-202, method 101, condition b

EMC/EMI

Conducted emissions on cables . . . T.B.D

Radiated emissions . . . T.B.D

Lightning Protection . . . ±5 kV input for 50 μsec, 1.2 μsec rise and fall time

Electrostatic discharge . . . ±15 kV surge by 500 pf capacitor and series 150Ω resistor

4. Arm Array Interface with the Base Staion

Interface Description

Tx: The level of Tx power required for proper operation is 1 mw at the ARM input. A level of 5–10 mw is thus needed at the output of the BST which allows for losses of the cables and BFN.

This may circumvent the High Power Amplifier rack at the BTS.

Rx: The ARM LNA gain is 25 db min. allowing for 5–10 db loss on the cable and BFN, the min. gain at the input to the BTS is 15 db.

This circumvents the LNA in the BTS.

DC: The DC is provided via the Tx coaxial cable through an appropriate Bias-T.

Supply voltage is 24–36 volts DC. Each ARM requires about 2 A.

Note: Remote High Gain Antennas with multiple ARM which require cable length over 300 feet, may need a separate DC cable.

Monitoring and Control: The monitoring and control commands are transmitted over the Rx cable via an appropriate Bias-T. The data interface to host computer is done by an Interfacing Control Box (ICB) using standard RS-232 interface.

5. Arm-Based Base Station—Cost Comparison

The cost comparison is made between a cell fed by a 75 W MCLPA and an 8 ARMs array, and 2 −2 ARMs arrays in a transmit diversity

TABLE 5.1

BTS Sector RF chain cost budget ($)

| | MCLPA | Di-plexer | Cable −100' | An-tenna | ARM array | Total | Total 3 sectors |
|---|---|---|---|---|---|---|---|
| 2$^{nd}$ generation | 20,000 | 20,000 | 350 | 500 | | 21,850 | 65,550 |
| ARM array | | | 200 | | 8,250 | 8,450 | 23,450 |

TABLE 5.1-continued

BTS Sector RF chain cost budget ($)

| | MCLPA | Di-plexer | Cable −100' | An-tenna | ARM array | Total | Total 3 sectors |
|---|---|---|---|---|---|---|---|
| ARM Arrays with Transmit diversity | | | 200 | | 5,000 | 5,200 | 15,600 |

Note: the ARM array includes also the receive chain, not considered in the cost comparison. An additional cost difference of $3000.

This may generalized by comparing the architectures of FIG. 16 and FIG. 17:

a. The ERP $/Watt.

b. The power delivered to the radiation $/Watt.

In a column of ARM elements, $$ERP_{ARM} = N^2 P_A$$

With the MCLPA configuration (FIG. 16)

$$ERP_{MCLPA} = N P_M L$$

where N is the number of elements in the array (and number of ARMS), L is the loss from the MCLPA to the radiating elements, and $P_A$, $P_M$ are the power out from an ARM unit and a MCPLA, respectively.

Now consider the cost $$C_A = K_A N, \quad C_M = K_M P_M$$

Then, by equating ERPs $$C_M/C_A = K_M/K_A \times P_A/L.$$

Here $K_A$ is the cost of an ARM unit, $/ARM, and $K_M$ is the cost coefficient of the MCLPA, $/Watt (assuming a linear proportion).

In this example $$K_A = \$1000, \quad K_M = \$200/W, \quad PA = 2w, \quad L = 0.1 => C_M/C_A = 4$$

In an ARM column $P_t = N P_A$, for the MCPLA $P_t = P_M L$

By equating the power delivered to radiation $C_M/C_A = K_M/K_A \times P_A/L$, which is the same result.

The costs of the receive chain, and the additional elements in the transmit chain in FIG. 16. configuration have not been incorporated in this calculation.

The ARM array offers additional advantages with high cost implications, that have to be quantified for each market:

A smaller BTS cabinet and housing. The MCLPA occupies a significant portion of the BTS cabinets, and most of the power consumption and air-conditioning requirements. The MCLPA is now eliminated, along with a substantial reduction in the power and emergency power requirements, and in the air-conditioning requirements.

There is no practical limit on the length of cables from the antenna mast to the BTS. The BTS may be located in an accessible and inexpensive location, not necessarily very close to the antenna.

The overall weight on the mast is lighter. Though the ARM array is heavier than the passive antenna array, this is more than compensated by the lighter weight cables.

The reliability of the array of ARM elements is by far higher than that of a single amplifier, and does not constitute an operation or a maintenance risk.

6. Reliability Analysis of an ARM Array

6.1. Reliability of a Single ARM

The system reliability is measured by MTBF—Mean Time Between Failures. This consists of MTTF—Mean Time To Failure, and MTTR—Mean Time To Repair. The first term is larger by far, and therefor MTBF=MTTF+MTTR≅MTTF.

The formal evaluation of the MTTF of a system follows Mil-Std-756B. This elaborate process involves worst case environmental conditions, which render a very pessimistic value compared to the vast experience with similar commercial products, serving in the outdoors. The latter will therefore be followed here, by quoting similar experience:

- A 4 Watt VSAT outdoors RF head in C band which has been field proven. Such units have been produced and delivered by the same manufacturer, in quantities of 2500 units per year, for the last 4 years. The rate of return for failures has been 2% per year, interpreted as an MTTF of 450,000 hours.
- The tracking antenna/RF/down conversion head of the OmniTRACS, a Qualcomm mobile USAT mounted on trucks, is known to have a similar rate of return. This unit is by far more complicated, and operates at Ku band.
- On a component basis, a 4 Watt power amplifier device is known to have about $10^6$ hours MTTF. This is the critical element in the ARM.

Based on these, an evaluation by comparison is made that the MTTF of the ARM, in the outdoors environment, is higher than 200,000 hours.

6.2. Reliability of an Array of ARM Elements (FIGS. 40–42)

Figure 40:
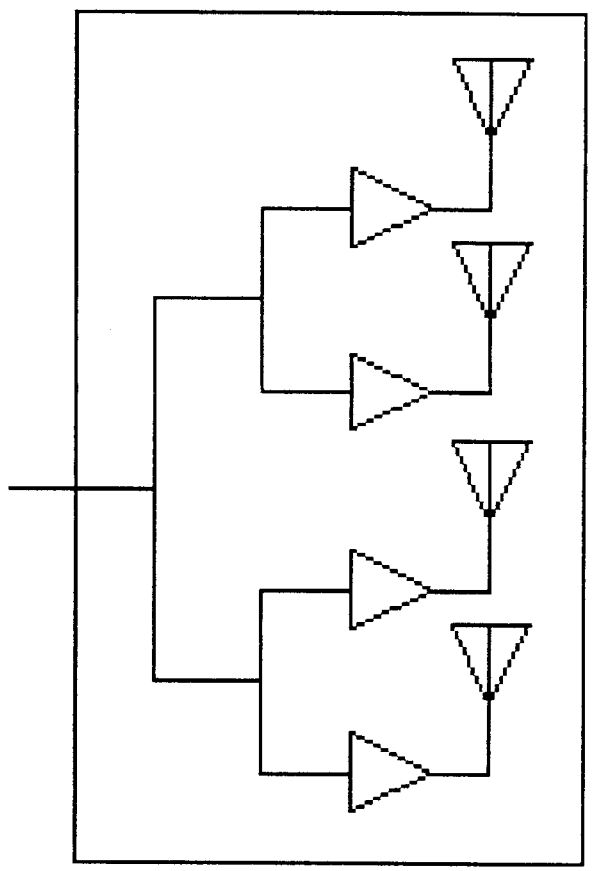
FIGS. 40–42 show an array of ARM elements.

The array provides redundancy in the performance of each element, as shown in FIG. 40.

The ERP of the array relates to the total transmitted power×the gain of the array. An array with N ARMs, each transmitting P Watts, produces N*P Watts. The gain of a column array is also directly proportional to the number of the antenna elements N. The ERP of the ARM array is therefor proportional to $N^2P$. A failure of a single element degrades the array ERP by less than 1 dB, as shown in FIG. 41.

Figure 41:
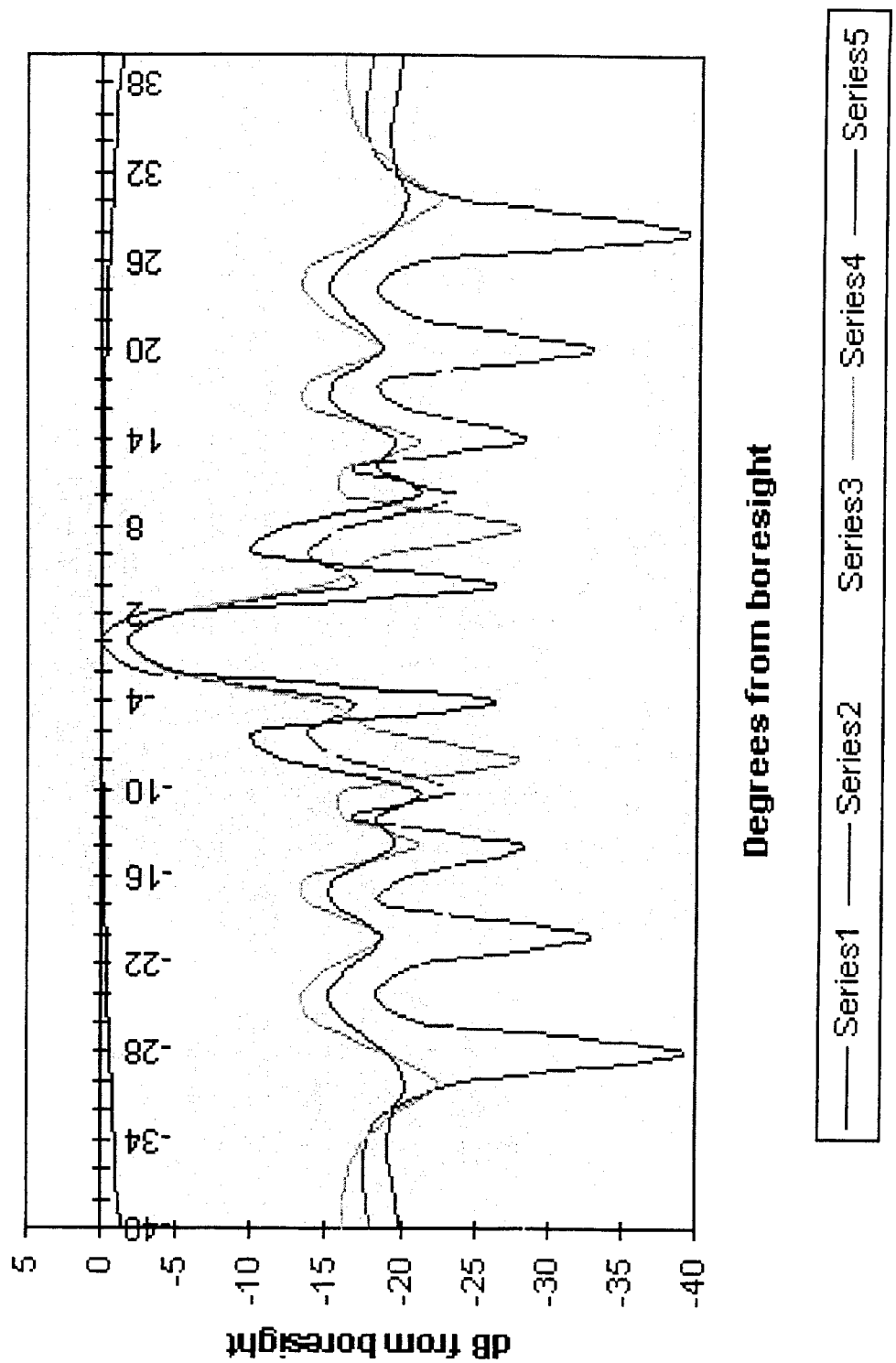
Figure 42:
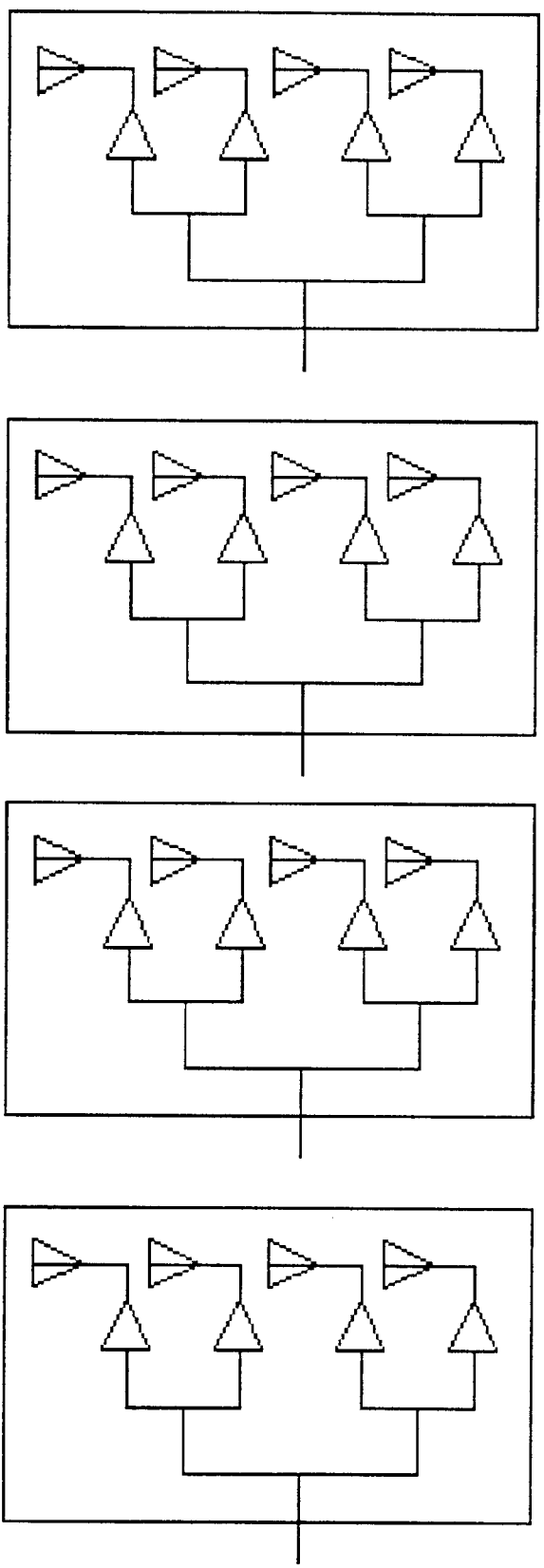

FIG. 41 shows the deterioration of the ERP of a 8 element ARM array due to a failure of one element.

a. Series 1—the element pattern
b. Series 2—the array ERP
c. Series 3—the array ERP, edge element missing
d. Series 4—the array ERP, element #2 missing
e. Series 5—the array ERP, element #4 missing A failure of x elements in a linear array:

1. Elements at the array edge. The remaining ERP is $(n-x)^2p$, and the relative loss is $\Delta=(n-x)^2/n^2$. For n=10, x=1 Δ=−0.9 dB, x=2 Δ=−1.9 dB.
2. Elements not in the edge. In this case the gain is almost intact, except for raising the sidelobes. $\Delta=(n-x)/n$. For n=10, x=1, Δ=−0.45 dB, x=2 Δ=31 0.96 dB.

A failure of an element in a planar array, as shown in FIG. 42, is much less significant.

A failure of x elements in a planar array:

If the element is not on the edge $\Delta=1-x/n^2$. For n=10, x=1 Δ=−0.04 dB, x=2 Δ=−0.08 dB. The values for elements on the edges are slightly higher.

A failure of a single ARM in an array is not catastrophic, as shown above, and only causes a graceful degradation of the array performance. A failure of 2 elements or more may be tolerated in an 8 element array before maintenance is called for. The number of failures allowed in a planar array is much higher.

The failure probability is $P_f=1/MTTF$, and the reliability $R=1-P_f=1-1/MTTF$. The MTTF of a failure of 2 ARMs in an array is derived by a conditional probnability that a second element fail, given one already failed. This is computed according to one of the alternative procedures(Mil-Std-756B):

Assume a model of "N ARMs in series, in parallel to N−1 ARMs in series". $R_t = R_{N\ ARMs} + R_{(N-1)ARMs} - R_{N\ ARMs} \times R_{(N-1)ARMs}$
$R_{N\ ARMs} = R_{ARM}^N$
$R_t \cong 1 - N(N-1)P_{fARM}^2$
When applied to $P_{fARM}=1/200,000$, N=8 => $R_t=1-1.4\times10^{-9}$
MTTF=700,000,000 hours According to "N−1 units out of N must be working" model:
$R_t = N \times R_{ARM}^{N-1} - (N-1)R_{ARM}^N \cong 1 - 0.5 \times N(N-1)P_{fARM}^2$
When applied to $P_{f\ ARM}=1/200,000$, N=8 => $R_t=1-0.7\times10^{-9}$
MTTF=1,400,000,000 hours

Conclusion

The reliability of the array of ARM elements is by far higher than that of a single amplifier, and does not constitute an operation or a maintenance risk.

7. ARM Cell—Guidelines for Cell Design with ARM

An important issue in the design of a cell is the design of the transmitted power, and antenna gain, as this determines the coverage and the capacity of the cell/sector. A cell/sector based on ARM array (for shortage—ARMcell) has a linkage between the number of ARM units, their arrangement and the cell coverage and capacity.

7.1. Link Balancing

The link budget is $$\frac{P_r}{P_t} = G_t G_r L = T$$

where $P_r$=Power at the receiver antenna output
$P_t$=Power at the transmit antenna input
$G_t, G_r$ gain of the tx and Rx antennas, respectively
L path loss
T transmission loss Now, the minimum receive power for a given service in
$P_{rM}$=SNR(singal to noise ratio)×N(noise)×NF(noise figure of the receiver) and $$P_{tM} = SNR \times N \times NF / T$$

The transmit power required from the base station can thus be inferred from the power transmitter by a MS(Mobile Station) times the number of MS—n—that the BS serves, by comparing the SNR, T and NF of the forward and reverse links:

$$P_{t,BS} = \left(\frac{T_R}{T_R}\right)\frac{(SNR \cdot N \cdot NF)_{MS}}{(SNR \cdot N \cdot NF)_{RS}} \cdot nP_{t,MS}$$

7.2 ERP and Gain with ARM Columns

The gain of a linear antenna array is roughly $$G = 2\frac{D}{\lambda}S = 2N\frac{d}{\lambda}S$$

where

D/λ is the total length (height) of the antenna array, in wavelengths

N is the number of ARM elements d/λ is the distabetween two adjacent ARM units in wavelengths S is the numbers of sectors.

For an ARM linear array it becomes g[db]=7.25+10 Log N

The ERP of a linear ARM array is $$ERP[Watts] = G \cdot 3NP_{ARM} = 6\frac{d}{\lambda}N^2 P_{ARM} = 5.32N^2 P_{ARM} = 10.64N^2$$

and in dBw

ERP[Watts]=10.27+20 Log(N)

7.3. CDMA IS 95

The forward link is coherent, pilot-aided and orthogonal (partially), and the required SNR (or) is 2–3 dB lower than that of the reverse link (thins already includes the effect of antenna diversity on the reverse link). On the other hand—the N!oise Figure of the MS receiver is 3 dB higher than that of the BS, and altogether they equalize. Therefor, if the antenna gains for both links are the same $P_{t,BS} \approx nP_{t,MS}$ Note that this result does not depend on the range of the cell. This enters through the BS antenna gain (a higher gain suppresses T) and through $P_{t,MS}$. Higher power may be required from the MS on the mof range-limited cells than in capacity-limited cells and microcells.

Microcell

If $P_{t,MS}$<50 mWatt in the microcell, and each sector serves 20 MS per channel, then $P_{t,BS}$<1 Watt which is the less than the power provided by a single ARM unit (2 Watts).

Large Cell

For a loaded large cell, single channel, $P_{t,MS}$<200 m Watt, and $P_{t,BS}$<4 Watt.

This is served by 4 ARM units. When stacked into a column they form an array that also provides about 11 dB gain. More ARM units may be stacked either in a column, to provide further gain, or in two shorter columns. Note that this is an extreme assumption, and $_{Pt,MS}$<100 mWatt is more realistic.

Forward-link Diversity

CDMA has the unique capability of providing forward link diversity from the base station by transmitting from two displaced antennas and providing the appropriate delay between them. This is implemented in a simplest way by the ARMcell, by two spaced ARM units or columns. The diversity gain provided, nominally higher than 3 dB, may be used to reduce the required $P_{t,BS}$ with a considerable cost saving to the base station. Thus a 2×4 ARM cell/sector can accommodate 16 RF channels, fully loaded, when the required MS power does not exceed 100 mWatt. With an average lo!ad of 50% this ARMcell accommodates the full 30 MHz allocation.

7.4. AMPS/IS 136/GSM

The forward link is weaker in these systems than the reverse link: as much as the modulation is the same, the reverse link enjoys both the antenna diversity gain (>3 dB) and the lower Noise Figure of the BS receiver (3 dB), and the reverse link is stronger by as much as 6 dB. This accounts for the higher transmit power required from the base stations in these technologies.

Microcell

If $P_{t,MS}$<100 mWatt, a single ARM can support 2 RF channels (2 AMPS or 6 IS 136 or 15 GSM MS). Most microcells do not support more than 2 RF channels in present configuration.

Large Cells

The highest power class of MS transmits 2 Watts. It is reasonable to assume that the average will not exceed 500 mWatt. One ARM is then required for each RF channel in a large cell. A column of 12 ARM units serves 12 RF channels (36 IS 136 or 95 GSM MS), creating a gain of about 17 dB. An alternative arrangement of 2×8 elements provide 16 Rf channels (48 IS 136 or 127 GSM MS), with a gain of 15 dB.

Appendix B describes several of the various components used with the active radiator modules of the present invention, as follows:

a. The ARM antenna and beam shaping b. Repeaters c. ARM Microcell 4 d. High Gain ARM e. ARM unit for Cellular Band

The ARM Antenna and Beam Shaping

1. Objectives

The key objectives in the ARM design are:

Cost

Low loss, both Tx and Rx

Linear to specs

Self contained, and robust to different configuratons setting.

Suitable for different configurations:

A single element—for microcells and indoors use

A single omnidirectional element

A column array—for high gain sector antenna

A planar multibeam or adaptive array

A circular multibeam or adaptive array

2. The Antenna Design Approach (FIGS. 43A and 43B)

An integrated design approach is being followed for this purpose, The diplexer is eliminated and part of the filter load relieved by employing separate antennas for transmit and for receive. Each of the antennas is narrow band—less than 3%, tuned to the forward and the reverse bands respectively. The isolation thus achieved reduces the complexity and the loss of the diplexer. Further, the antenna separation relieves the requirements on the antenna linearity (−153 dB intermod level) that apply to a two-way antenna. The narrow band design has a low profile and high isolation between elements. This design is suitable for multibeam arraying and avoids "blind angles", a fundamental difficulty with dipole antenna scanning arrays. A printed antenna design has been chosen. A complementary horizontally polarized antenna has the same form factor and pattern, and the same feedpoint which make it replaceable with the vertically polarized antenna at the ARM front face.

Figure 43A:
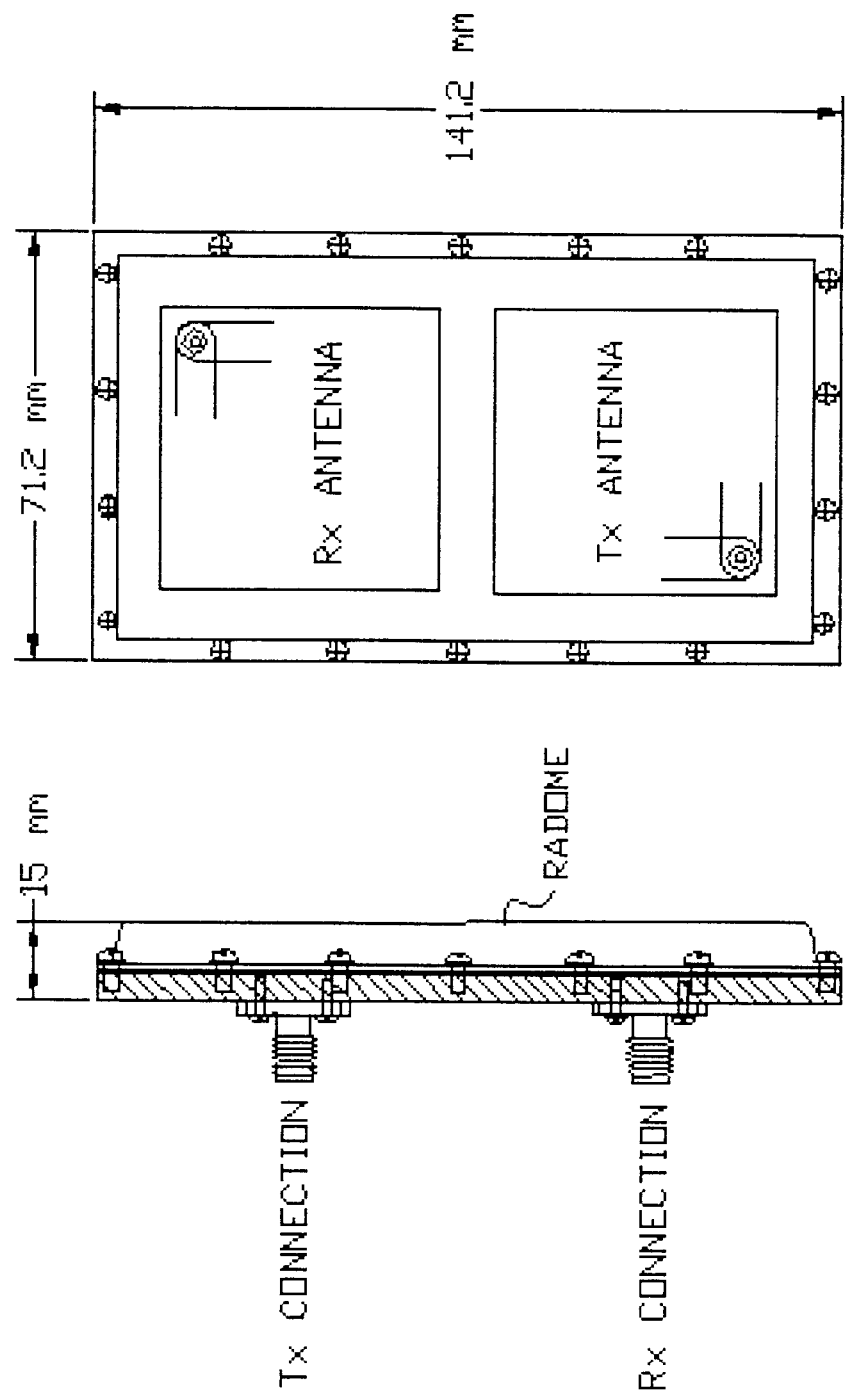
FIGS. 43A and 43B illustrate an antenna design approach.
Figure 43B:
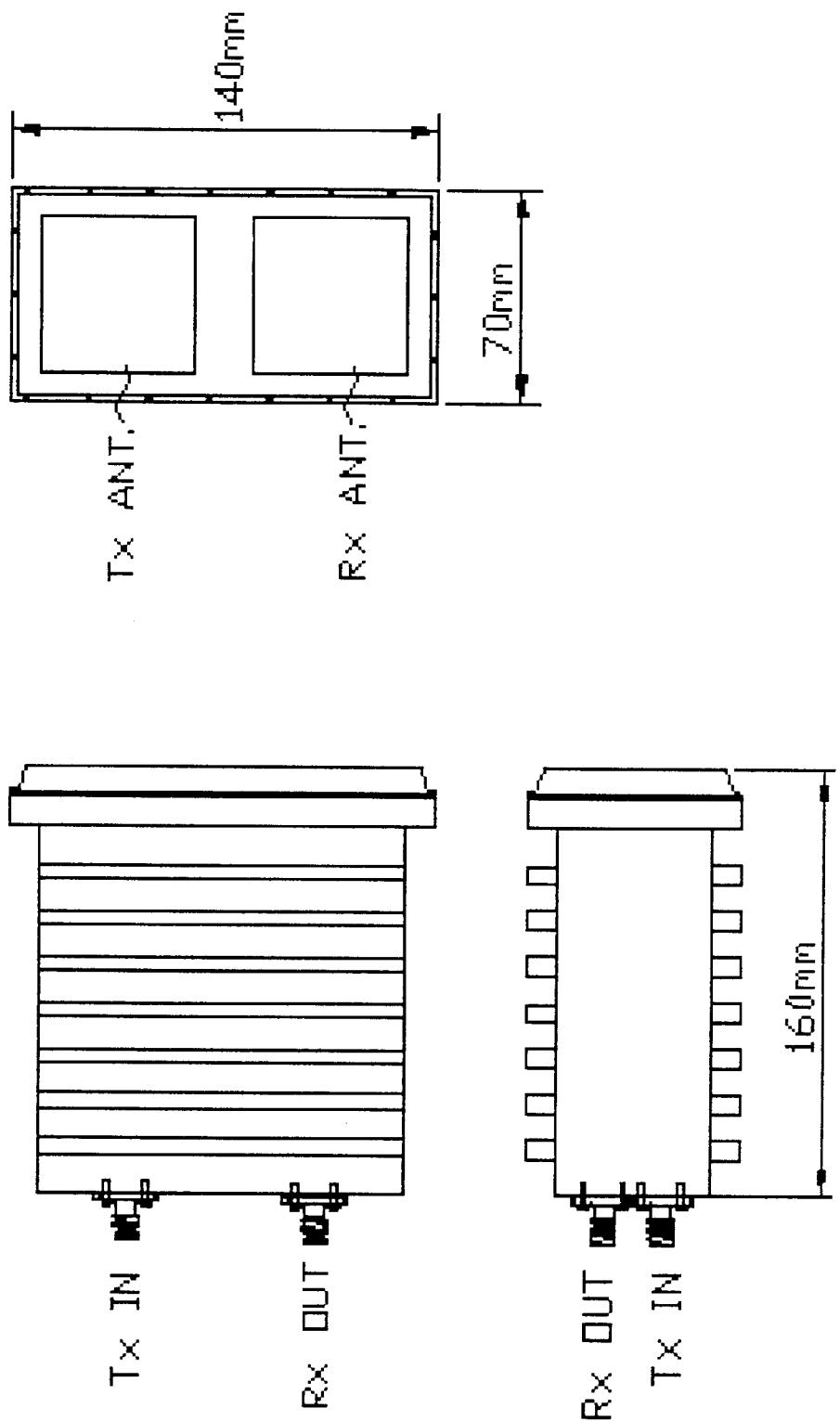

The connectors of the antenna module shown in FIG. 43A are replaced by a direct connection to the ARM module in FIG. 43B.

In the ARM module, when the antenna plate is removed, connectors are mounted on the unit to connect to an external antenna.

Figure 44A:
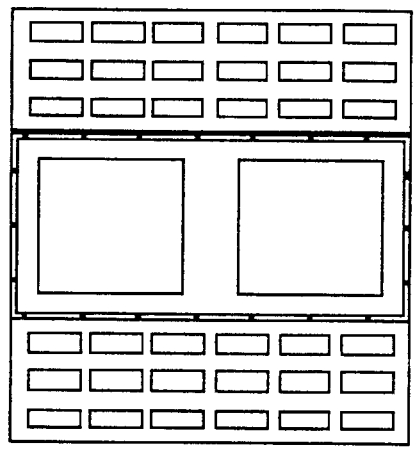
FIGS. 44A and 44B show a beam shaping of the module.
Figure 44A:
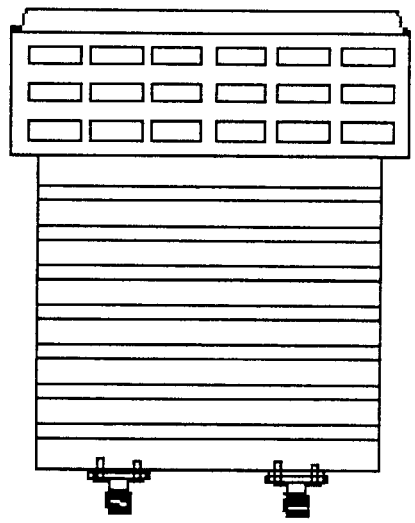
Figure 44A:
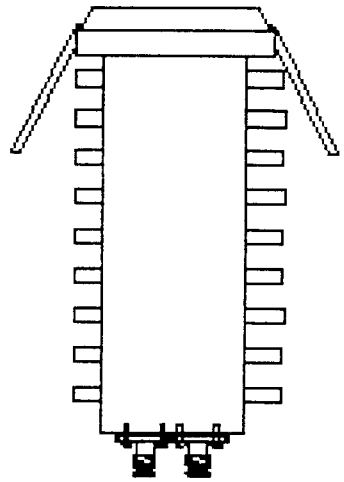
Figure 44B:
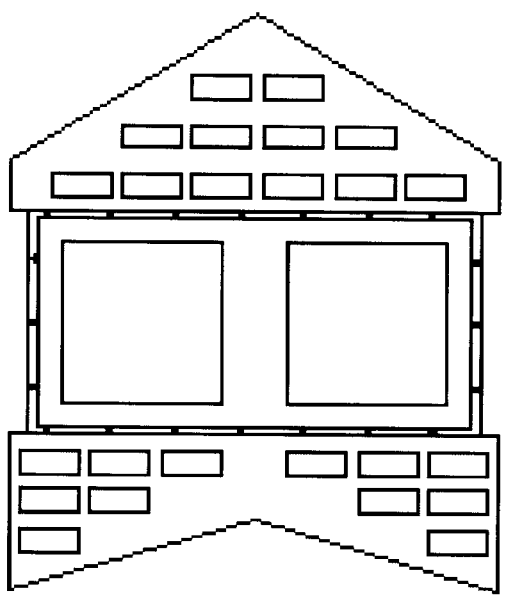

3. Beam Shaping of the Module (FIGS. 44A and 44B)

The ARM element is only 0.45 wide, and its horizontal radiation pattern depends on its shape and on the installation. A simple and efficient method for shaping the pattern, including the roll-off and the back lobe, is by adding fins to the unit, the shape and tilt of which determine the pattern.

The pattern is controlled from 120° to 60° by proper choice of the tilt. The nominal pattern is chosen to have a crossover at −6 dB at 120°, which assures a fast roll-off.

The tilt angle of the fins, and their shape, determine the Azimuth angle. The fins are attached to the ARM module between the module and the antenna panel. The configuration in FIG. 44B further reduces the back-lobe. The triangular recess and protrusion are about a quarter of a wavelength each, which cancels out the back-lobe.

4. Omnidirectional Cell Coverage with ARM Units

The integral antennas in the ARM provide a directional pattern, with (isotropic) gain of over 7 dB, which suits well sectored cell coverage. Applications that require omnidirectional coverage require some modifications, as follows:

4.1 Low Power Omnidirectional Cell.

The ARM is designed to match the transmit requirements for a full capacity, single ODMA (IS 95) channel, cell, where the MS power does not exceed 200 mW, and averages less than 100 mW in a cell. 25 calls in the reverse link of that cell amount to a total of 2.5 Watts. The forward link in a CDMA has a 2–3 dB advantage. A single ARM, emitting 2 Watts can thus-support such a cell. The gain of the antenna is determined by the EIRP per circuit requirements, derived from the coverage requirements.

Certain cells require an omnidirectional coverage. This is achieved by a pair of omnidirectional antennas, connected to the antenna ports at the face of the ARM unit, and replacing the integral antennas. A basic sleeve dipole on Tx and on Rx will provide about 5 dBW ERP. Higher gain is obtained with collinear arrays.

Figure 45:
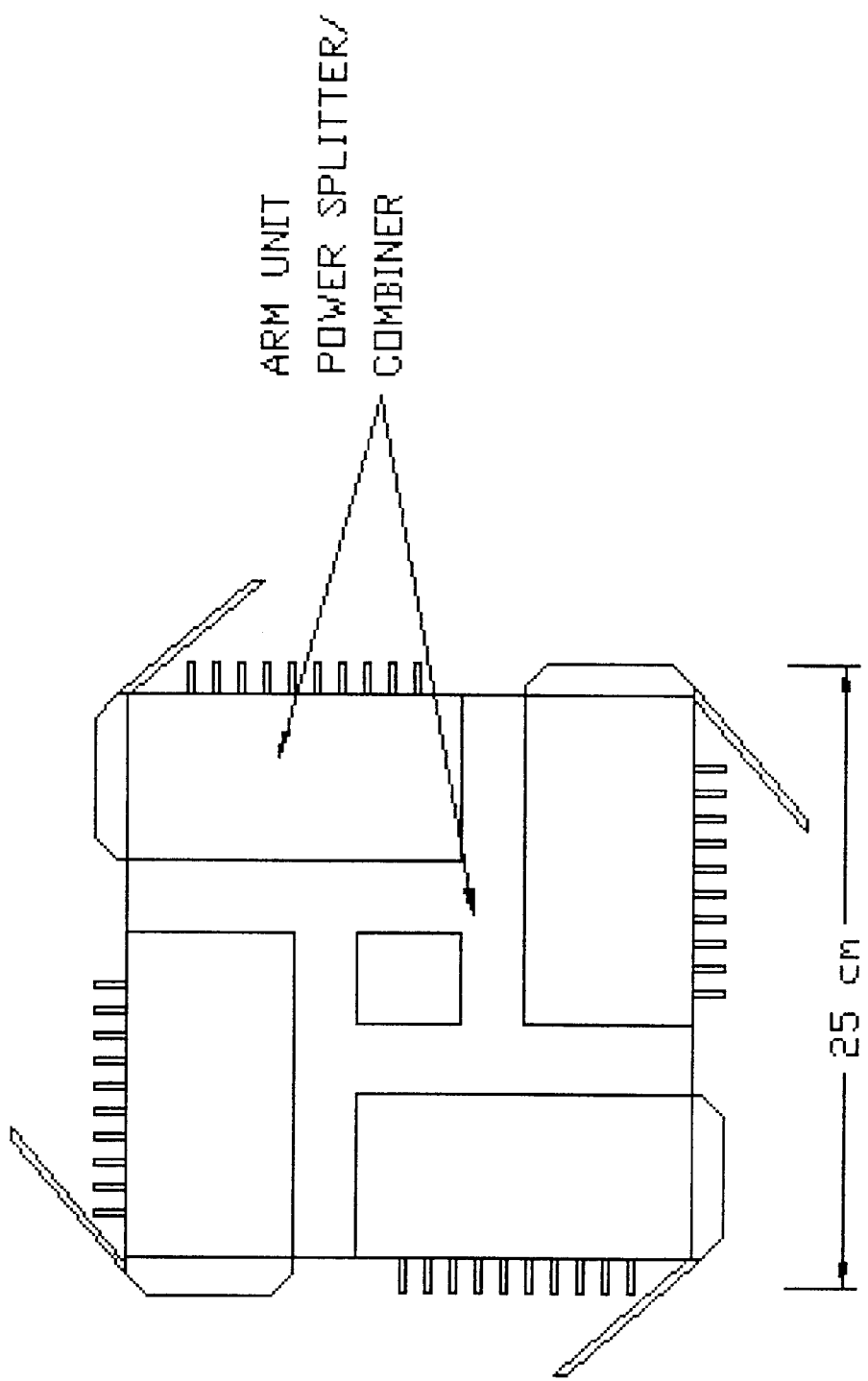
FIG. 45 shows a high power omni-directional cell.

4.2 High Power Omnidirectional Cell (FIG. 45)

An omnidirectional pattern is formed by a circular array of ARM units, preferably 3 or 4 units. The ERP of a 4 element ring array is about 11 dBW. Higher ERP may be obtained by stacking more ring arrays one on top of the other. The integral antennas of the ARM are used, or printed antennas are used over the perimeter to smooth the Azimuthal coverage.

Figure 46:
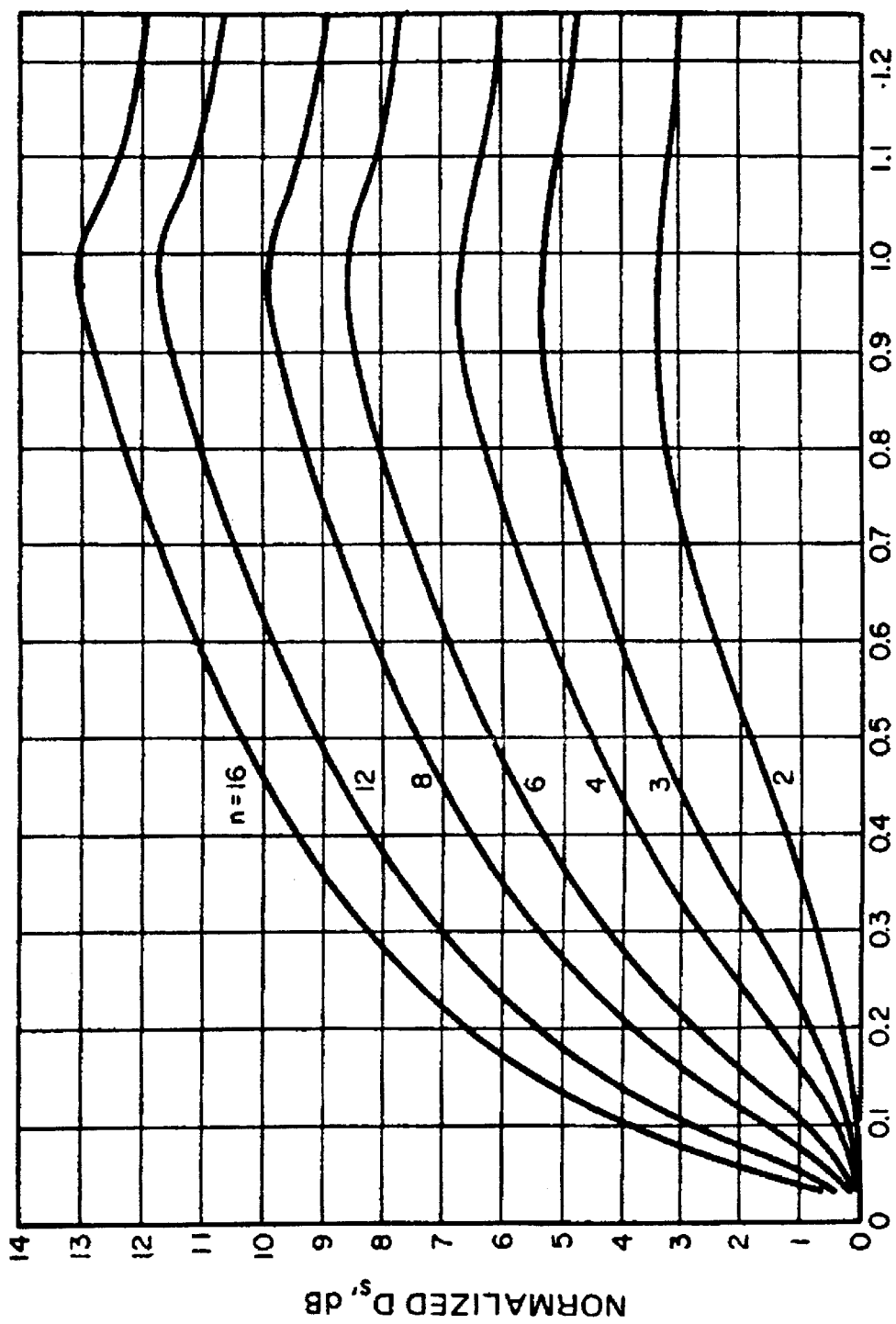
FIG. 46 shows an arraying of ARM units in a column.
Figure 47:
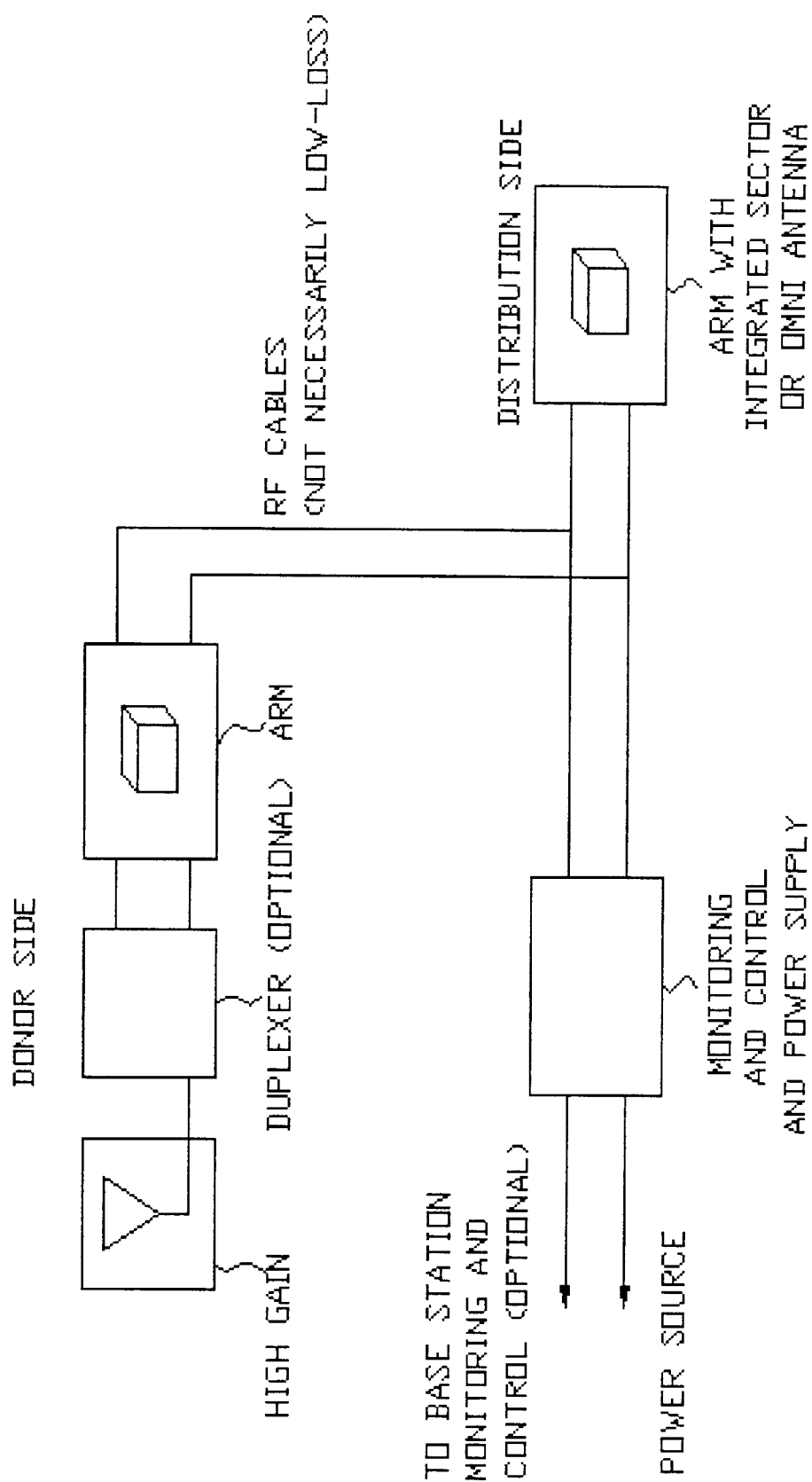
FIG. 47 shows the ARM repeaters.
Figure 48:
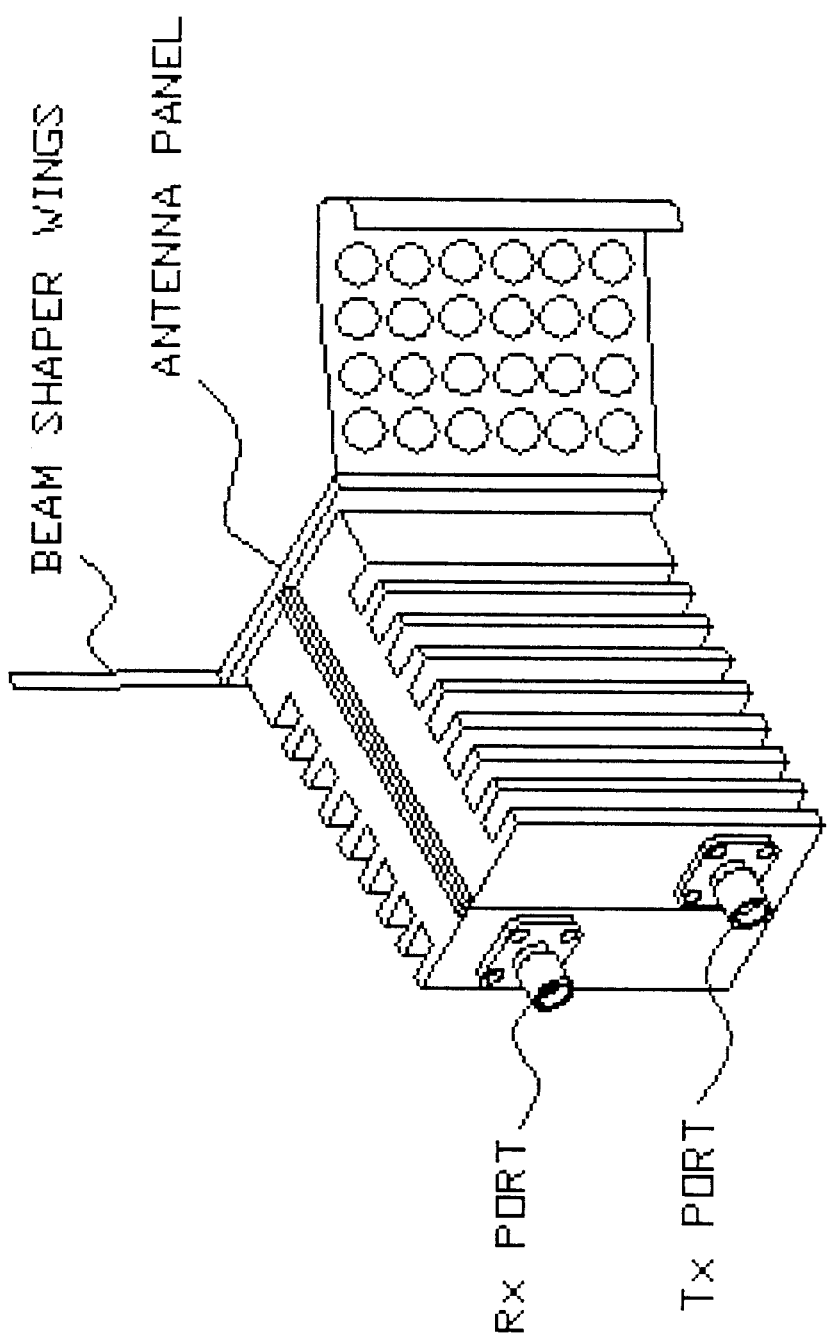
FIGS. 48–52 show the ARM.
Figure 49:
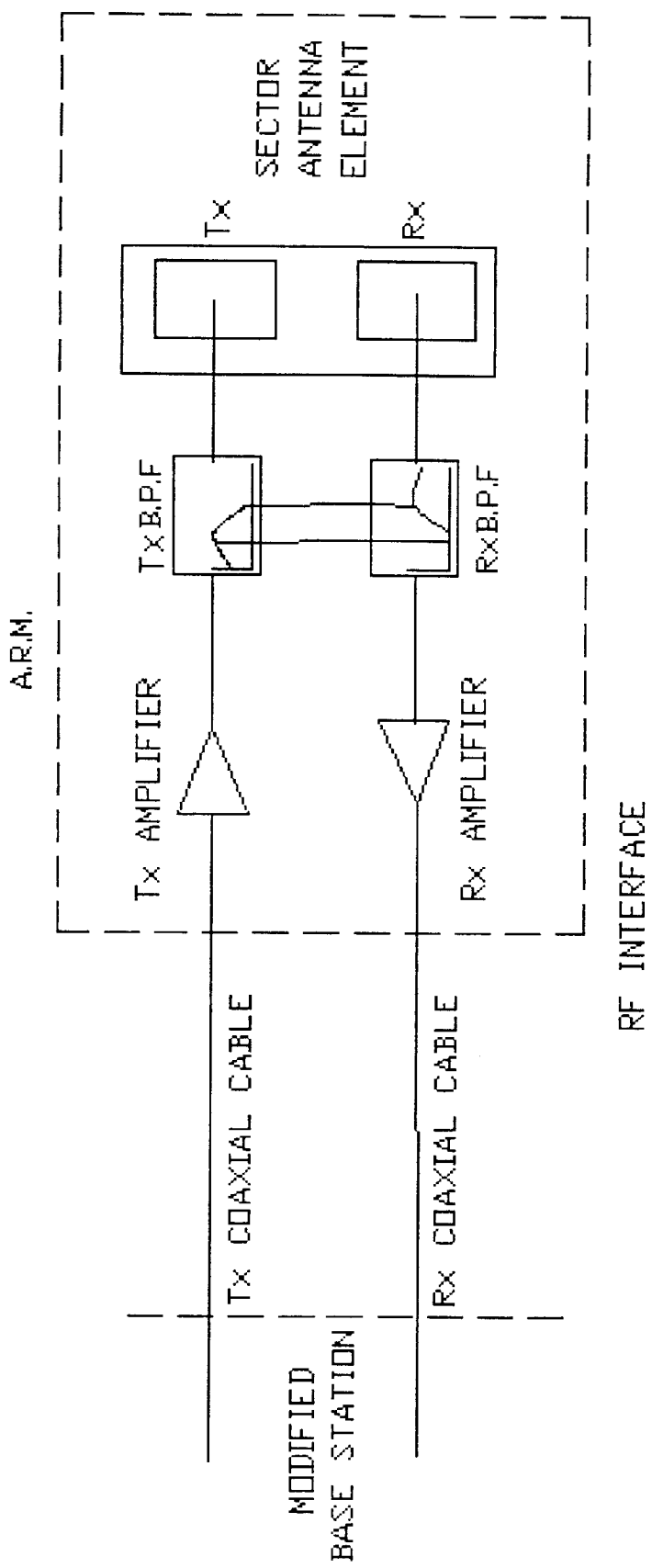
Figure 50:
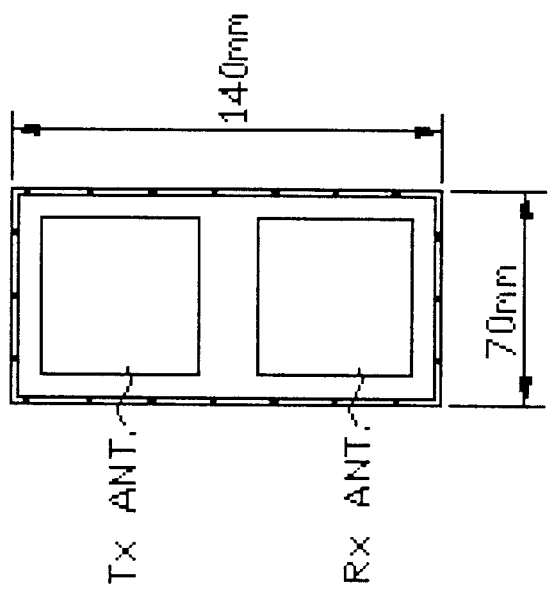
Figure 50:
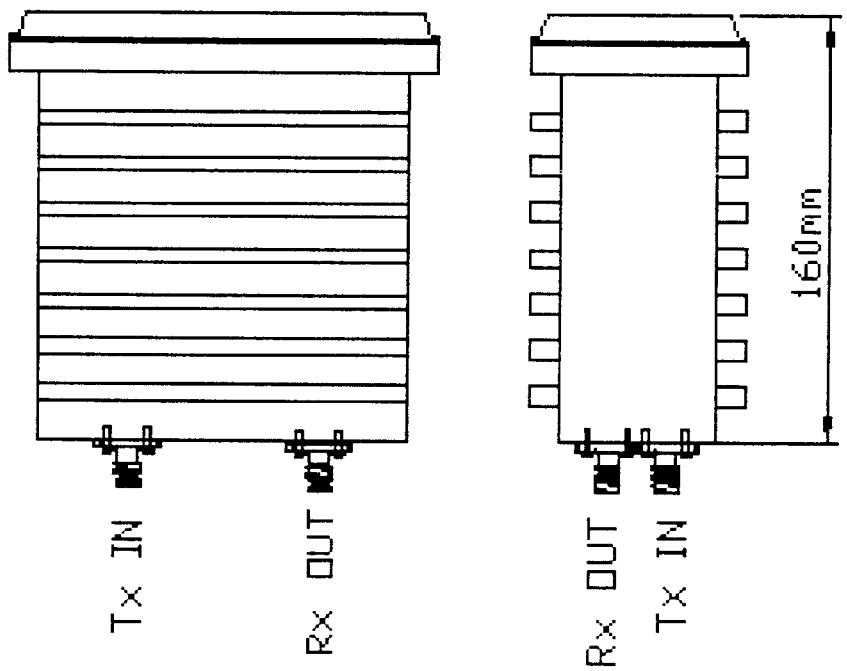

5. Arraying of ARM Units in a Column (FIG. 46)

The height of the ARM face is 140 mm, or $0.93\lambda$ at the highest frequency. The array gain is highest at this spacing, as shown in FIG. 46. The gain advantage over antenna with spacing of $0.7\lambda$ is over 1 dB for arrays with 8 elements.

The large element spacing limits the electronic beam tilting of the array. Whenever this feature is required, the ARM elements are arrayed sideways, distanced only $0.65\lambda$ between the elements.

REPEATERS

INTRODUCTION

A repeater in the cellular system is a device that receives the transmission from the Base Station (the donor side) and retransmits it to the subscribers (the distribution side) with proper amplification. Simultaneously it receives the signals from the subscribers and retransmits it, with proper amplification, to the Base Station. Repeaters are used mainly for the following applications:

Provide RF coverage in areas where the signal received from the Base Station is too week ("Radio Holes")

Extend the cell coverage, e.g. along highways

Extend the coverage into tunnels, buildings or other structures.

A repeater has to offer the following:

It has to be transparent—the grade of service should not be degraded by the introduction of the repeater in the link.

The repeater has to cover the frequency range allocated to the distribution area to be covered. Preferably it is the whole frequency range of the Base Station The repeater has to have alarms, status reporting and controls, to be controlled from the Base Station, either via land lines or via transmissions.

Major features in the evaluation of repeaters:

Amplification

Noise figure

Linearity

Filtering

Transmit power and ERP to the distribution area

ERP on the donor side

Low cost

Outdoors configuration

Low power consumption. This is especially important for repeaters fed by solar power.

Reliability

Flexibility in deployment. The isolation between the donor side and the distribution side has to be much higher than the amplification, and this requires dexterity in the placement of the respective antennas, compatible with the local environment.

The basic constituents of a repeater are:

Donor antenna—high gain, for maximizing ERP and minimizing the interference.

Distribution antenna—designed for coverage. Has to be placed away from the donor antenna, in order to achieve the required isolation between them.

The repeater unit, control unit and power supply.

The separation of the donor and distribution antennas necessitate long connecting cables, the loss in which is a major cause of high noise figure and requirement of high power output in the repeater unit.

THE ARM REPEATERS (FIG. 47)

ARM offers a unique architecture of repeaters that, together with the salient features of the ARM units, introduce a unique family of repeaters for a variety of applications and communications standards.

The ARM unit is an integrated Bidirectional amplifier, including band filters, monitoring and control, and power supply/conditioning unit, encased in a compact outdoors box. This allows the ARM to be located with the donor and distribution antennas, respectively, thus relieving the system from the need for high-quality low-loss cables.

The amplification of the received signals on both the donor and the distribution side—prior to the cable losses, substantially reduces the noise figure of the system and increases the sensitivity.

Inexpensive and thin cables can be used between the donor and the distribution antennas, which offers great flexibility and cost reduction.

The DC power is provided to the units via the RF cables, using built-in bias-T connections. The monitoring and control signals are also riding on the RF cables, as modulations by special modems.

Gain and power are remotely and internally controlled in each unit.

Optional Configurations

High-gain Donor Side

The important parameter on the donor side is the ERP—the product of the power output and antenna gain. The compactness of the ARM unit offers a variety of combinations with high gain antenna.

A very high gain dish antenna (20 to 30 dB) can be fed directly by the ARM with its integrated antennas, thus producing 53 to 63 dBm ERP. No duplexer is needed for this configuration.

The ARM unit can be mechanicaly integrated with a high gain Yagi antenna (15 dB) to produce over 45 dBm ERP.

A variety of other antenna configurations can be offered for specific needs.

Distribution Side

Both the power output and the ERP are important on the distribution side: the first relates to the capacity, while the latter determines the range of fcoverage.

The ARM unit provides 2 Watts of average radiated power. The integrated antennas (separate Rx and Tx antennas) have a nominal gain of over 6.5 dBd for sector illumination. The beamwidth can be shaped from 120° down to 60° by special wings. The ERP thus provided is 39.5 dBm.

Higher power and ERP is obtained by arraying a number of ARM units into a vertical column. A 4-element array provides 8 Watt radiated power, and 51.5 dBm ERP. The redundancy thus obtained increases the reliability of the system by orders of magnitude.

Omnidirectional coverage can be provided by appropriate omnidirectional antennas the replace the sector antennas in the ARM.

Monitoring and Control

The repeater is a stand alone unit, and monitoring and controlling its functions from the base station is an essential requirement.

The monitoring and control unit incorporates a communications channel with each of the ARM units. The communication with the Base station or service personal is done over a choice of channels: Telephone lines, a dedicated land line or via wireless link. An access plug allows for local monitoring and control by a technician equipped with a PC via RS232 standard protocol.

A wireless M&C channel incorporates an additional transceiver, encased with the donor ARM unit or the M&C unit.

THE ARM (FIGS. 48–52)

ARM is a transmit-receive module that incorporates the RF transmit chain—including the power amplifier, air-cavity band filter and an integrated elemental antenna, and the receive chain that includes the integrated receive antenna, air-cavity band filter and a high gain LNA. These are encapsulated in a compact outdoors module that also contains a monitoring-and-control (M&C) circuit that communicates via the Rx RF coax with a remote control unit (IDU), and a power supply/power conditioner. Its 2 Watt output power was designed to match full load of a single RF channel CDMA microcell. The ARM unit has a modular construction, offering a variety of configurations. The ARM units are designed as building blocks of higher EIRP/higher gain radiating systems, as required by various cellular systems.

F1/F2 Repeater

Situations that do not allow for ample isolation between the distribution and the relay antennas require additional filtering, to be provided by communicating in different frequencies on both sides and providing additional filtering between these channels. This is best done in the IF band Both F1 and F2 are assumed to be within the PCS band.

Figure 51:
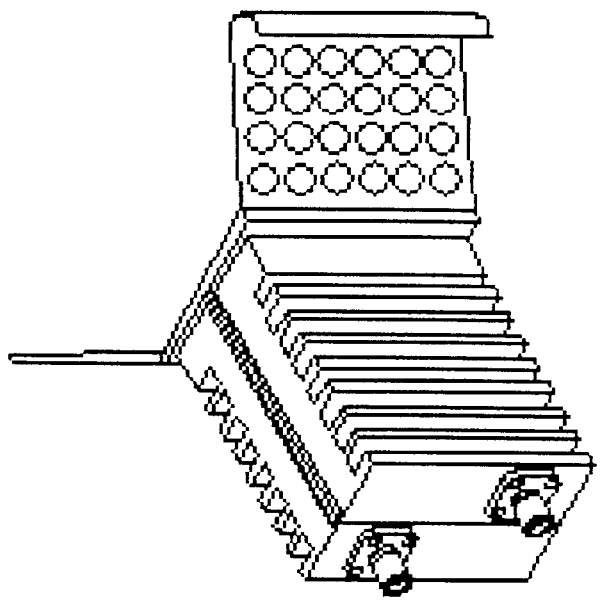
Figure 51:
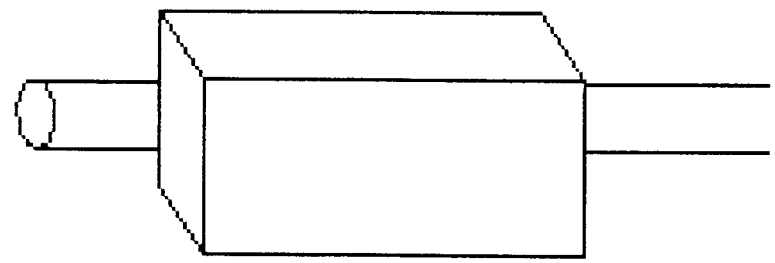
Figure 51:
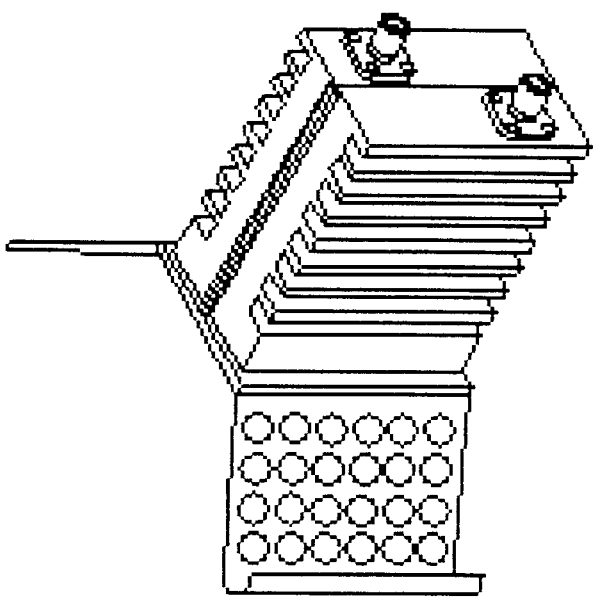

A generic configuration of an F1/F2 repeater is described in FIG. 51. It consists of two ARM units and a translator unit (dimensions similar to those of ARM). An IDU, that provides the remote control to the repeater, may be placed anywhere, and can control up to 12 ARM units (6 or 3 repeaters, depending on the option). The configuration depicted in FIG. 52 allows for directing each ARM to the designated direction (to the distribution area and the relay direction). The beam shaper in each unit can provide a beamwidth ranging between 60° (as in the figure) to over 120°, depending on its tilt. Other configurations are possible, according to the preferred use.

Figure 52:
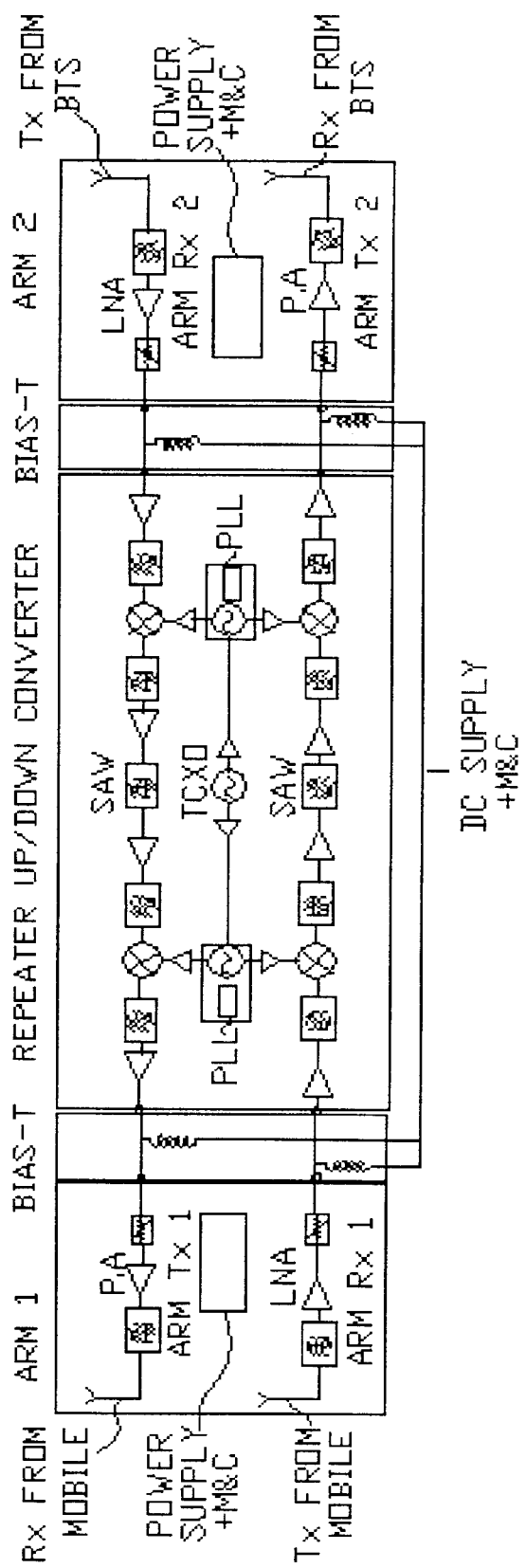
Figure 53:
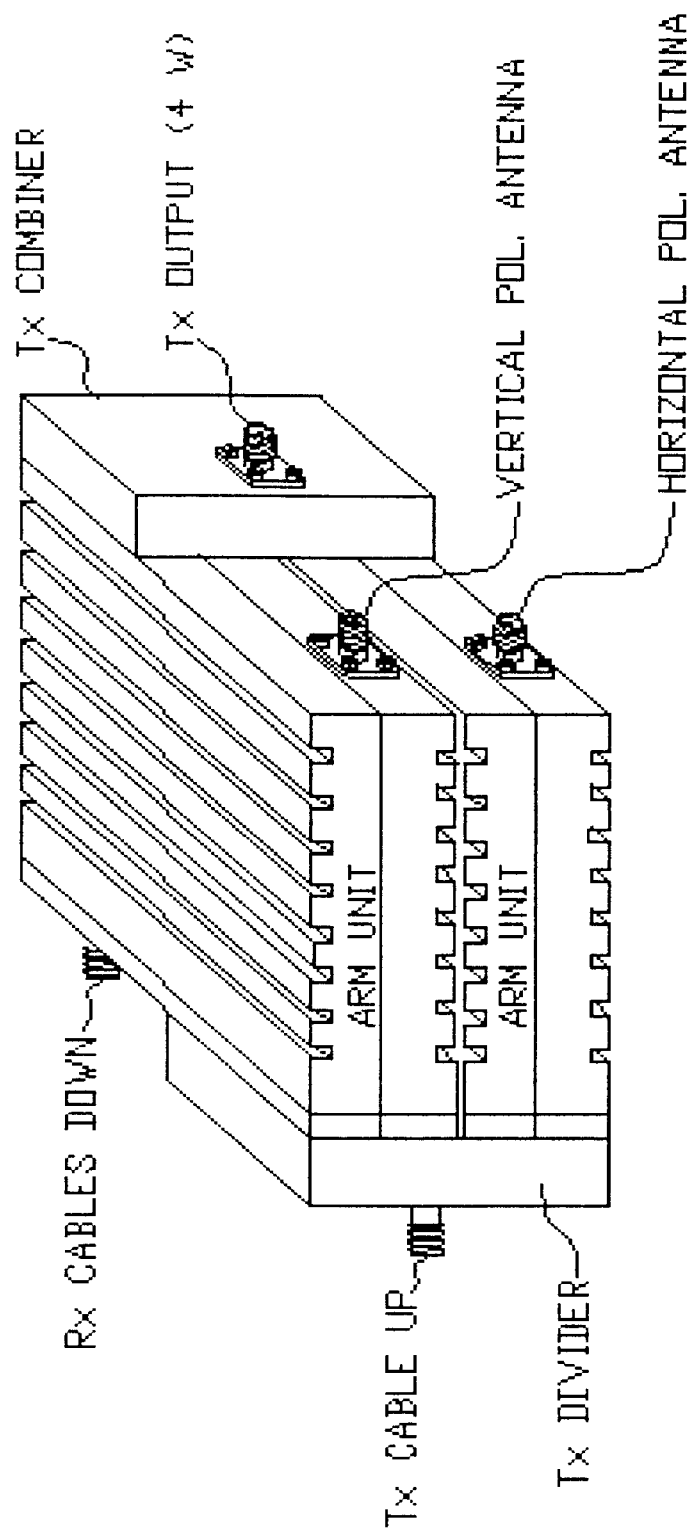
FIGS. 53–56 show an ARM microcell.
Figure 54:
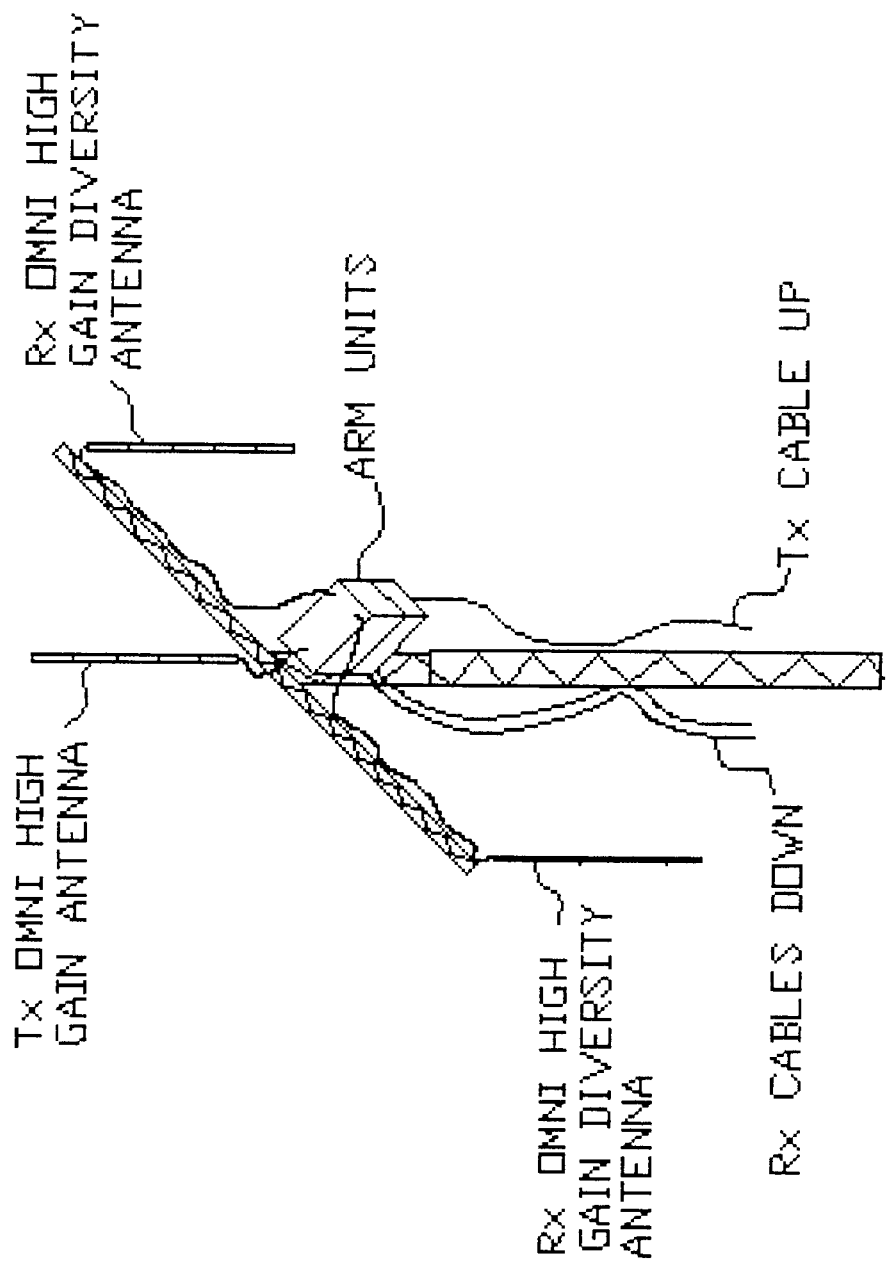
Figure 56:
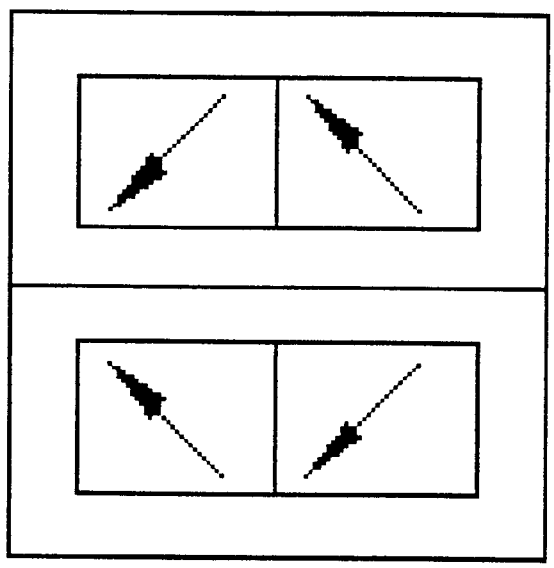
Figure 55:
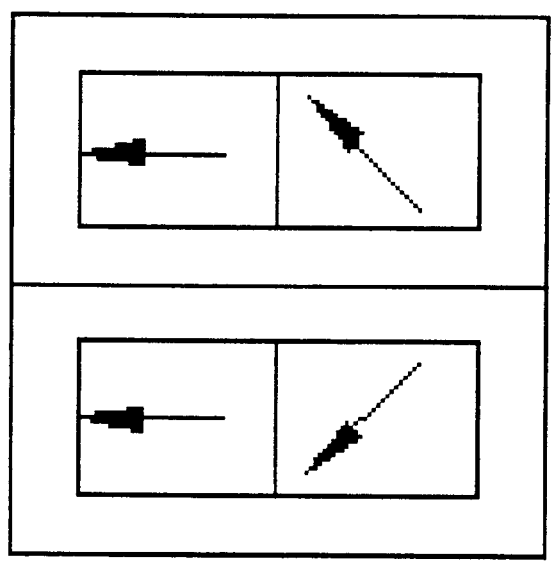

The block diagram of the repeater is described in FIG. 52.

ARM Microcell 4 (FIGS. 53–56)

Introduction

Main features of the microcell are being compact, inexpensive and suitable for installation within the urban area below the roof level. It has to serve handsets at short range.

The ARM microcell 4 features 4 linear Watts and two receive channels.

Options Offered:
External antennas, for high gain antennas operation
Omnidirectional antennas
Sectoral antennas
Dual polarization on receive
Dual polarization diversity on receive, polarization matching on transmit.

Figure 57:
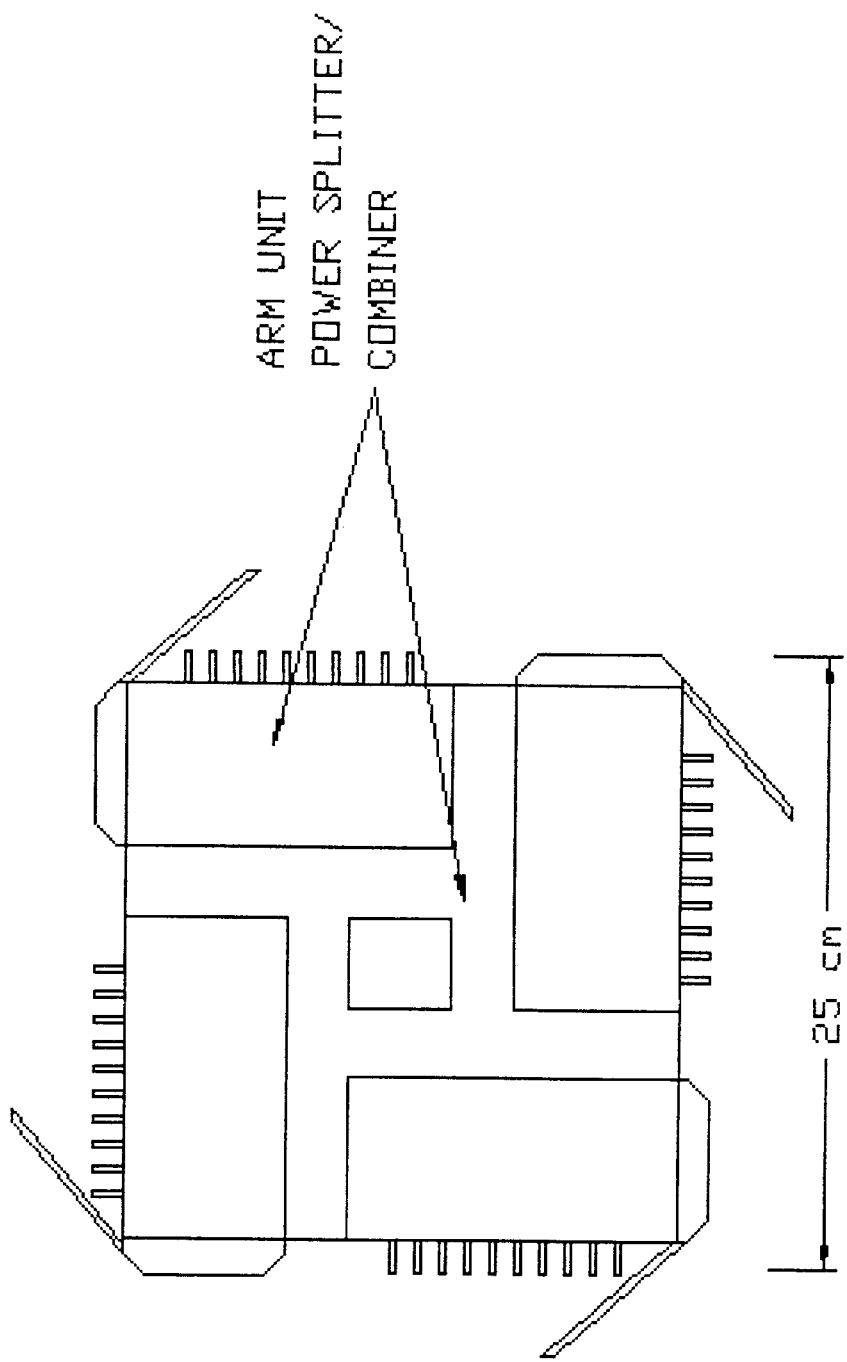
FIG. 57 shows a high power omni-directional cell.

High Power Omnidirectional Cell (FIG. 57)

Multichannel cells may require higher power. This may be achieved by the RingCell, which consists of 4 ARM units in a ring, radiating an omnidirectional pattern.

Figure 58:
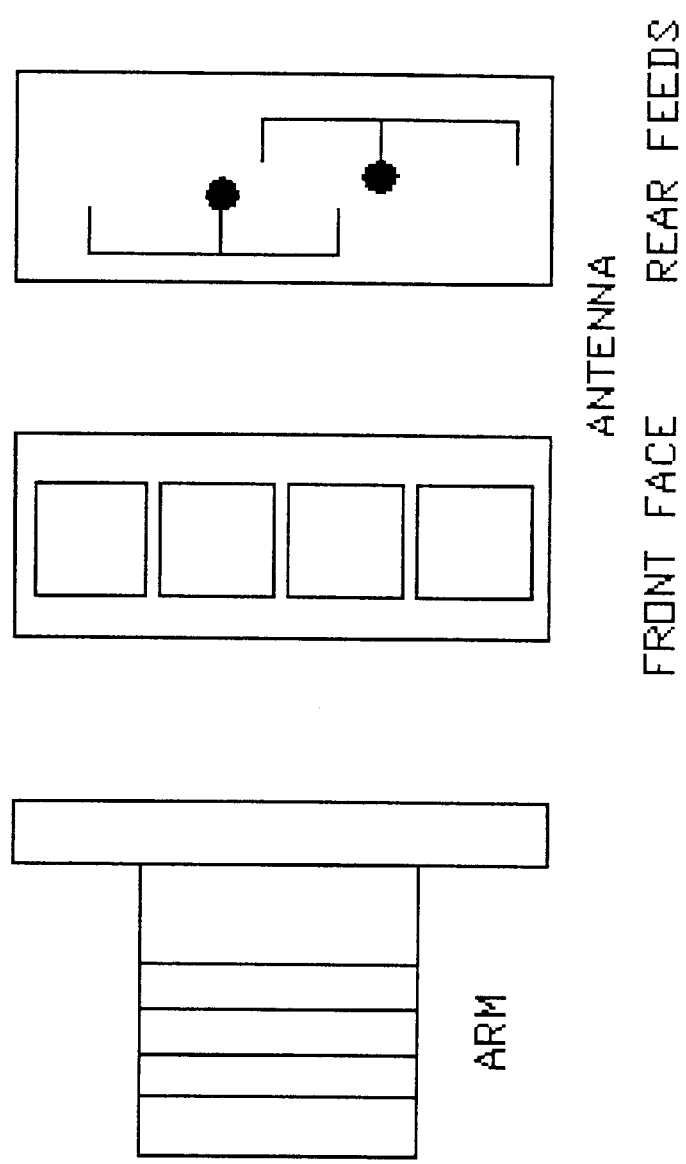
FIG. 58 shows a high gain ARM.

High Gain Arm (FIG. 58)

Introduction

The link budget requirements in the cellular communications rely on both the BS antenna gain, and the radiated power: the first determines the cell capacity while the latter—the range. The balance between the two depends on the technology and on the scenario.

Situations may arise where the required gain is higher for the same transmitted power. This can be accomodated by a high gain antenna for each ARM (FIG. 58).

Figure 59:
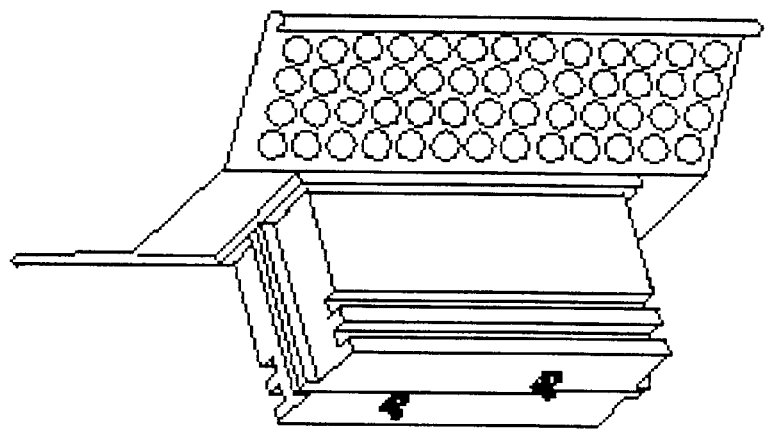
FIG. 59 shows an ARM unit for cellular band.
Figure 59:
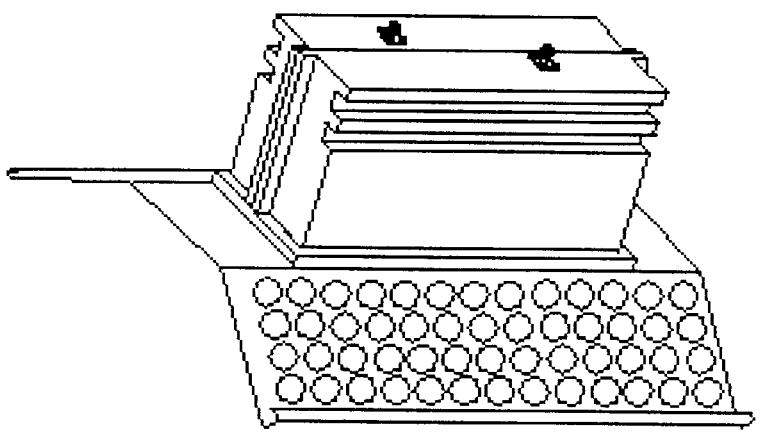

Arm Unit for Cellular Band (FIG. 59)

The ARM for the cellular band is shown in FIG. 59. Its dimensions are: 295 mm high, 151 mm wide, and 125 mm deep.

Single Cellular Arm Unit

The electrical characteristics are similar to those of the PCS band, in its respective band.

It is appreciated that various' features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the present invention is defined only by the claims which follow:

What is claimed is:

1. A modular cellular wireless communication base station comprising a plurality of active radiator modules (ARM's) located at a desired antenna location, each module comprising:
   at least one subscriber antenna for transmitting and receiving, a transmitter comprising a power amplifier, and a receiver;
   a beam forming network controlling relative amplitudes and phases of each of said modules; and
   an RF front end transmitting over a low power link with said plurality of active radiator modules via said beam forming network and receiving over a lower power link via a low noise amplifier.

2. A modular cellular wireless communication base station according to claim 1 and wherein said RF front end is located remote from said plurality of modules.

3. A modular cellular wireless communication base station according to claim 1 and wherein each module is self-enclosed.

4. A modular cellular wireless communication base station according to claim 1 and wherein at least one of said active radiator modules comprises separate transmit and receive antenna elements.

5. A modular cellular wireless communication base station according to claim 4 wherein said transmit and receive antenna elements are isolated from each other by approximately 20 dB.

6. A modular cellular wireless communication base station according to claim 1 and wherein said beam forming network is located adjacent said plurality of active radiator modules, one for transmit and one for receive.

7. A modular cellular wireless communication base station according to claim 1 and comprising a CATV up/down converter module.

8. A modular cellular wireless communication base station according to claim 7 wherein said CATV up/down converter module comprises a coaxial cable connected to a CATV network, said cable carrying a CATV forward link and reverse link.

9. A modular cellular wireless communication base station according to claim 8 comprising a CATV diplexer that separates transmit and receive signals.

10. A modular cellular wireless communication base station according to claim 7 and wherein said converter module comprises a mixer, a phased locked oscillator and a band pass filter, to eliminate image and low frequencies.

11. A modular cellular wireless communication base station according to claim 1 wherein said RF front end communicates with said beam forming network via a fiber optic link.

12. A modular cellular wireless communication base station according to claim 11 comprising at least two separate fibers for separately carrying transmitter and receiver signals.

13. A modular cellular wireless communication base station according to claim 11 comprising one fiber that carries both transmitter and receiver signals, and a splitter and a filter provided to split and filter said signals.

14. A modular cellular wireless communication base station according to claim 1 and wherein said transmitter amplifier comprises a first stage comprising a monolithic silicon gain stage and a second stage comprising a hybrid packaged power amplifier.

15. A modular cellular wireless communication base station according to claim 1 and comprising a transmitter filter that reduces transmitter wide band noise in a receiver band.

16. A modular cellular wireless communication base station according to claim 1 and comprising a transmitter filter that reduces spurious signals that interfere with a receiver channel of a cell.

17. A modular cellular wireless communication base station according to claim 1 and comprising a receiver amplifier and a receiver filter, wherein said receiver filter reduces a transmitter signal to a level wherein interfering intermod products are not generated in a receive chain, and said receiver amplifier is not desensitized by saturation.

18. A modular cellular wireless communication base station according to claim 1 and comprising a receiver filter that reduces interfering signals from sources external to said wireless communication base station.

19. A modular cellular wireless communication base station according to claim 1 and wherein said plurality of active radiator modules are stacked to form an active antenna having desired gain and beam shape determined by said beam forming network.

20. A modular cellular wireless communication base station according to claim 19, wherein said active radiator modules are stacked in a configuration selected from the group consisting of a vertical array, a planar array and a circular array.

21. A modular cellular wireless communication base station according to claim 1 wherein said at least one of said active radiator modules comprises a transmit antenna and first and second receive antenna elements.

22. A modular cellular wireless communication base station according to claim 21 wherein said transmit antenna is a vertically polarized antenna and wherein said first receive antenna is polarized at +45° and said second receive antenna is polarized at −45°.

23. A modular cellular communication base station comprising:
- a plurality of active radiator modules (ARM's) located at a desired antenna location, each module comprising at least one antenna for transmitting and receiving, a transmitter comprising a power amplifier, and a receiver;
- a beam forming network controlling relative amplitudes and phases of each of said modules; and
- an RF front end transmitting over a low power link with said plurality of active radiator modules via said beam forming network and receiving over a lower power link via a low noise amplifier;
- wherein at least one of said active radiator modules comprising a transmit antenna and first and second receive antenna elements; and
- wherein said plurality of active radiator modules are configured for a width less than 0.7 wavelengths, for forming a multitude of beams in a horizontal plane.

24. A modular cellular communication base station comprising:
- a plurality of active radiator modules (ARM's) located at a desired antenna location, each module comprising at least one antenna for transmitting and receiving, a transmitter comprising a power amplifier, and a receiver;
- a beam forming network controlling relative amplitudes and phases of each of said modules; and
- an RF front end transmitting over a low power link with said plurality of active radiator modules via said beam forming network and receiving over a lower power link via a low noise amplifier;
- wherein at least one of said active radiator modules comprising a transmit antenna and first and second receive antenna elements; and
- wherein said plurality of active radiator modules are configured for a height less than 1 wavelength, for forming a broad side radiation from a vertically stacked column of said plurality of active radiator modules.

25. A modular cellular wireless communication base station according to claim 21 further comprising a transmit amplifier coupled to said transmit antenna and a receive amplifier coupled to each of said first and second receive antenna elements.

26. A modular cellular wireless communication base station according to claim 1 wherein said at least one of said active radiator modules comprises a first and second transmit antennas and a receive antenna element.

27. A modular cellular wireless communication base station according to claim 26 wherein said receive antenna is a vertically polarized antenna and wherein said first transmit antenna is polarized at +45° and said second transmit antenna is polarized at −45°.

28. A modular cellular wireless communication base station according to claim 26 and further comprising a transmit amplifier coupled to each of said transmit antennas and a receive amplifier coupled to said receive antenna element.

29. A modular cellular wireless communication base station according to claim 1 and wherein said at least one antenna comprises an intelligent antenna.

30. A modular cellular wireless communication base station according to claim 29 wherein said intelligent antenna comprises multiplex trunking.

31. A modular cellular communication base station comprising:
- a plurality of active radiator modules (ARM's) located at a desired antenna location, each module comprising at least one antenna for transmitting and receiving, a transmitter comprising a power amplifier, and a receiver;
- a beam forming network controlling relative amplitudes and phases of each of said modules; and
- an RF front end transmitting over a low power link with said plurality of active radiator modules via said beam forming network and receiving over a lower power link via a low noise amplifier; and
- wherein at least one of said receiver and said transmitter outputs to a digital sample bus that is sampled by a communications channel card.

32. A modular cellular wireless communication base station according to claim 31 wherein an output of said at least one of said receiver and said transmitter is transformed by a transform circuit and is connected to at least one antenna input in a CDMA base station.

33. A modular cellular wireless communication base station according to claim 32 wherein said transform circuit comprises a Butler matrix.

34. A modular cellular wireless communication base station according to claim 31 wherein a beam of said transmitter is shaped to follow a coverage requirement.

35. A modular cellular wireless communication base station according to claim 31 wherein a beam of said transmitter is enhanced by transmission diversity.

36. A modular wireless communication base station comprising:
- a plurality of active radiator modules located at a desired antenna location, each of said active radiator modules comprising at least one transmit antenna element, a transmit amplifier, at least one receive antenna element, and a receive amplifier; and
- a beamforming network coupled to said active radiator modules;
- wherein said beamforming network transforms transmit signals into a form suitable for producing a radiation pattern by said at least one transmit antenna element of said active radiator modules; and
- wherein said beamforming network transforms receive signals generated by said at least one receive antenna element of said active radiator module, in response to receiving a radiation pattern, into a form suitable for processing.

37. The modular wireless communication base station of claim 36, wherein said active radiator modules comprise filters to provide isolation between said at least one transmit antenna element and said at least one receive antenna element.

38. The modular wireless communication base station of claim 37, wherein said filters comprise a transmit filter configured to perform at least one of reducing transmitter wideband noise and reducing spurious interference signals.

39. The modular wireless communication base station of claim 38, wherein said filters comprises a receive filter configured to perform at least one of reducing interference signals and intermodulation signals.

40. The modular wireless communication base station of claim 39, wherein said transmit amplifier comprises a low power amplifier and said receive amplifier comprises a low noise amplifier.

41. The modular wireless communication base station of claim 40, further including a plurality of transceivers configured to generate and process said transmit and receive signals, said transceivers being coupled to said beamforming network and remotely situated from said active radiator modules.

42. The modular wireless communication base station of claim 41, wherein said transceivers are coupled to said beamforming network via a fiber-optic link comprising at least one optical fiber configured to support said transmit signals and at least one optical fiber configured to support said receive signals.

43. The modular wireless communication base station of claim 41, wherein said transceivers are coupled to said beamforming network via a fiber-optic link comprising one optical fiber configured to support both said transmit and receive signals, a splitter to separate said transmit and receive signals, and a filter to isolate said transmit and receive signals.

44. The modular wireless communication base station of claim 41, wherein said beamforming network comprises a transmit portion for transforming said transmit signals and a receive portion for transforming said receive signals.

45. The modular wireless communication base station of claim 41, wherein said active radiator modules are arranged in an array configuration comprising at least one of a vertical array, a planar array, a horizontal array, and a circular array.

46. The modular wireless communication base station of claim 45, wherein said array configuration of said active radiator modules comprises an intelligent antenna capable of forming a plurality of radiated beams and wherein said beamforming network implements at least one of phase control and amplitude control to determine attributes of said radiated beams.

47. The modular wireless communication base station of claim 46, wherein said transceivers communicate with said beamforming network via a multiplexed trunking scheme.

48. The modular wireless communication base station of claim 47, wherein a delay is introduced in at least one of said beamforming network and said active radiator modules to provide transmission diversity.

49. The modular wireless communication base station of claim 48, wherein said delay comprises a duration greater than a CDMA chip interval.

50. The modular wireless communication base station of claim 47, wherein said active radiator modules are configured to provide at least one of transmit polarization diversity and receive polarization diversity.

51. The modular wireless communication base station of claim 50, wherein said active radiator modules includes a vertically-polarized transmit antenna element, a first slant-polarized receive antenna element at +45°, and a second slant-polarized receive antenna element at −45° to achieve said receive polarization diversity.

52. The modular wireless communication base station of claim 50, wherein said active radiator modules includes a vertically-polarized receive antenna element, a first slant-polarized transmit antenna element at +45°, and a second slant-polarized transmit antenna element at −45° to achieve said transmit polarization diversity.

53. The modular wireless communication base station of claim 45, further including,
- a CATV up/down converter module coupled to said active radiator modules and comprising a mixer, a phase-locked oscillator, a band pass filter,
- a cable coupled to a CATV network and configured to support CATV forward and reverse link signals, and
- a CATV diplexer coupled to said CATV up/down converter module and said cable and configured to separate said CATV forward and reverse link signals.

* * * * *